US 9,916,072 B2

(12) United States Patent
Song et al.

(10) Patent No.: US 9,916,072 B2
(45) Date of Patent: Mar. 13, 2018

(54) APPLICATION AND NOTIFICATION WINDOW DISPLAY MANAGEMENT IN A MOBILE TERMINAL

(71) Applicant: LG ELECTRONICS INC., Seoul (KR)

(72) Inventors: Yoomee Song, Seoul (KR); Juhyun Jung, Seoul (KR); Hojae Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 722 days.

(21) Appl. No.: 14/185,383

(22) Filed: Feb. 20, 2014

(65) Prior Publication Data
US 2014/0237420 A1 Aug. 21, 2014

(30) Foreign Application Priority Data

Feb. 20, 2013 (KR) .................. 10-2013-0017949
May 10, 2013 (KR) .................. 10-2013-0053102
Aug. 2, 2013 (KR) .................. 10-2013-0091992

(51) Int. Cl.
G06F 3/048 (2013.01)
G06F 3/0484 (2013.01)
G06F 3/0481 (2013.01)
G06F 3/0488 (2013.01)

(52) U.S. Cl.
CPC ........ G06F 3/04845 (2013.01); G06F 3/0481 (2013.01); G06F 3/0488 (2013.01); G06F 3/04817 (2013.01); G06F 3/04883 (2013.01)

(58) Field of Classification Search
CPC .. G09G 5/14; G09G 2370/027; G06F 9/4443; G06F 17/30905
USPC .......................... 715/790, 788, 795
See application file for complete search history.

(56) References Cited

U.S. PATENT DOCUMENTS

| 6,133,918 A * | 10/2000 | Conrad ................. G06F 3/0481 715/804 |
| 2006/0112349 A1* | 5/2006 | Clow ................... G06F 3/0481 715/780 |
| 2013/0076595 A1* | 3/2013 | Sirpal .................. G06F 3/1438 345/1.3 |
| 2013/0145295 A1* | 6/2013 | Bocking ................ G06F 3/017 715/764 |
| 2013/0159941 A1* | 6/2013 | Langlois ............... G06F 3/017 715/863 |
| 2013/0239063 A1* | 9/2013 | Ubillos ................. H04L 51/24 715/838 |
| 2013/0268875 A1* | 10/2013 | Han ..................... G06F 3/0481 715/769 |

* cited by examiner

Primary Examiner — Joy M Weber
(74) Attorney, Agent, or Firm — KED & Associates LLP

(57) ABSTRACT

A mobile terminal and controlling method thereof are disclosed. The present disclosure includes a touchscreen configured to display a window of an application and a controller, when the window is shifted into a specific region of the touchscreen, reducing and transforming the window into an icon and controlling the touchscreen to display the icon within the specific region. Accordingly, after a window of an application has been displayed on a screen, when the window is shifted into a specific region within the screen, the screen is displayed in a manner of being reduced and transformed into an icon.

24 Claims, 54 Drawing Sheets

FIG. 5
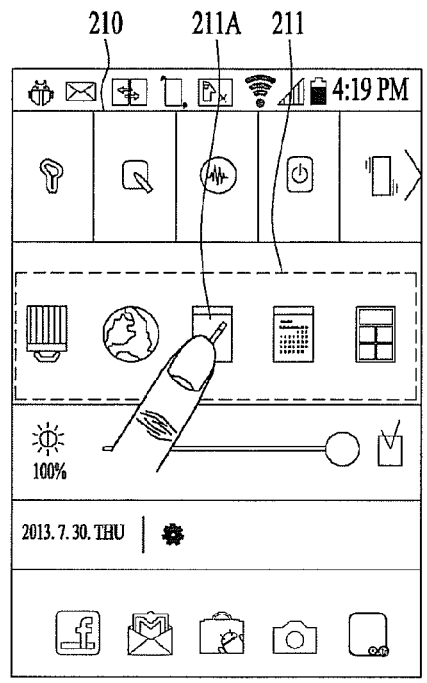
(a)
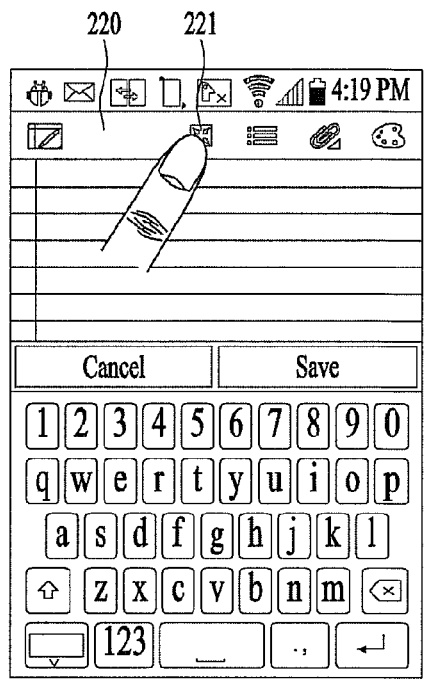
(b)
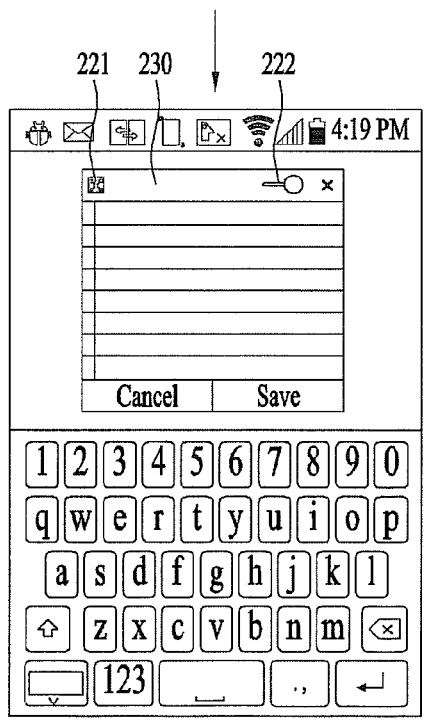
(c)

FIG. 7
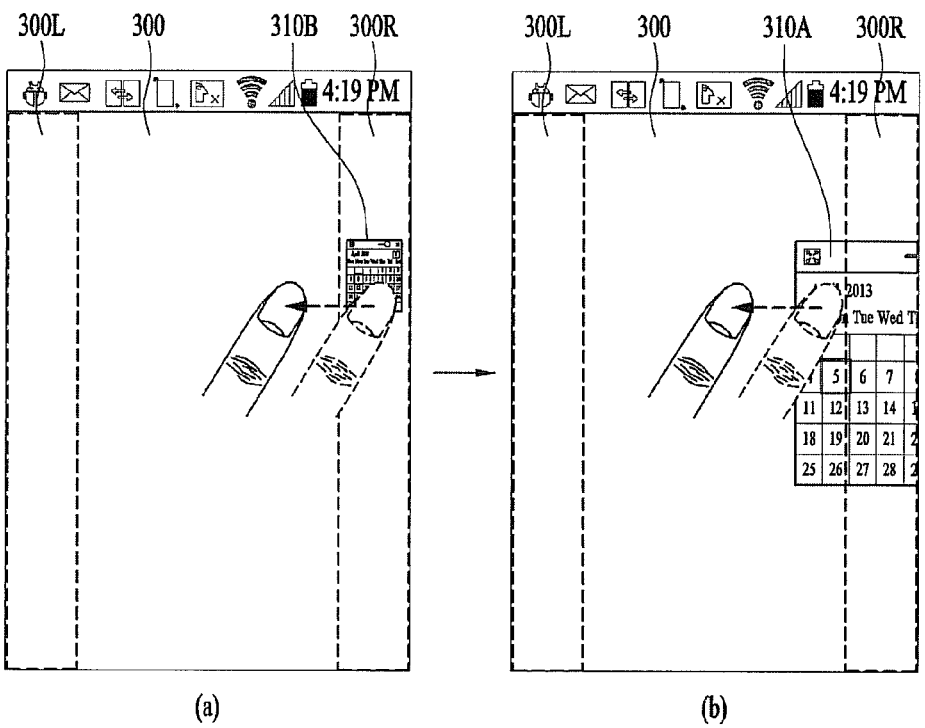
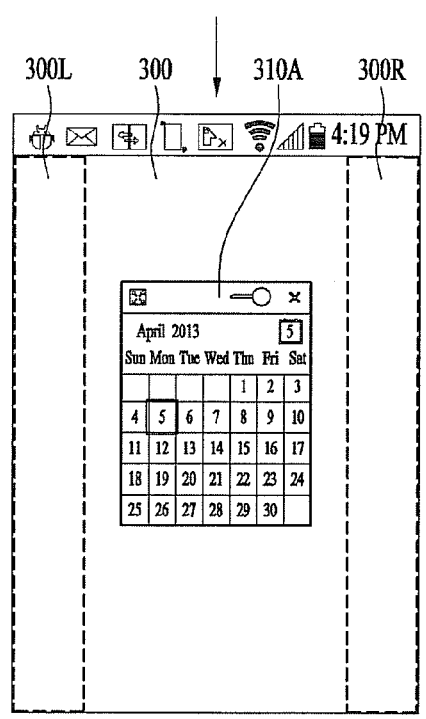

FIG. 12
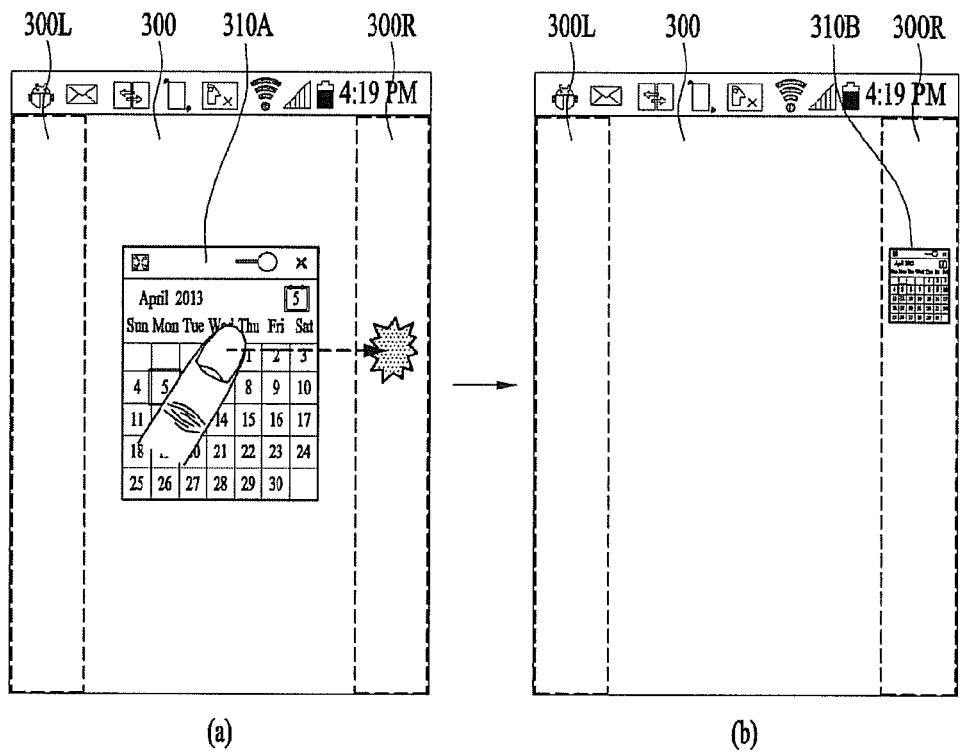
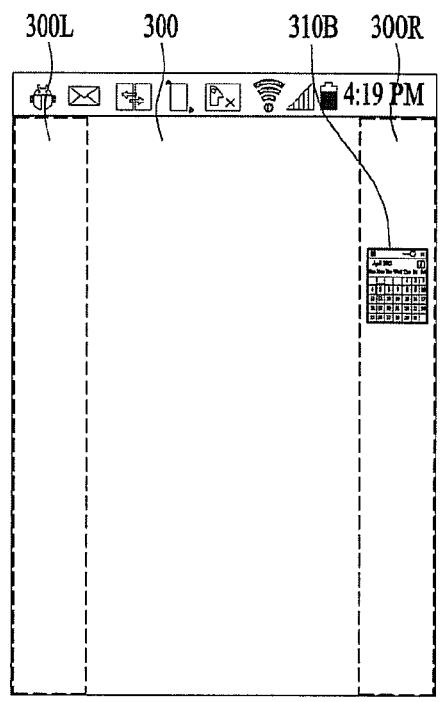
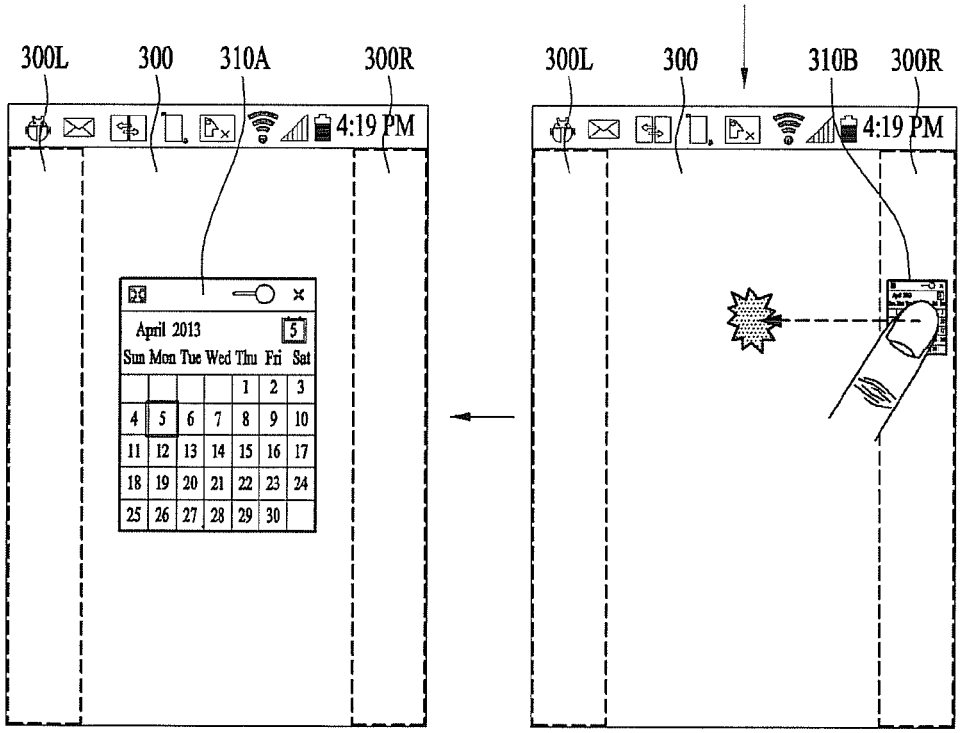

FIG. 13
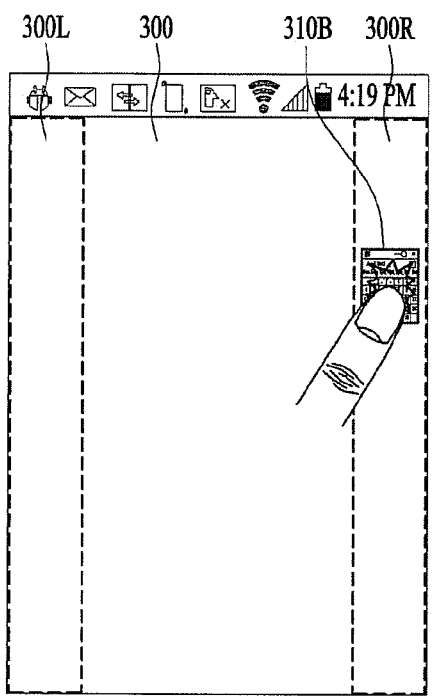
(a)
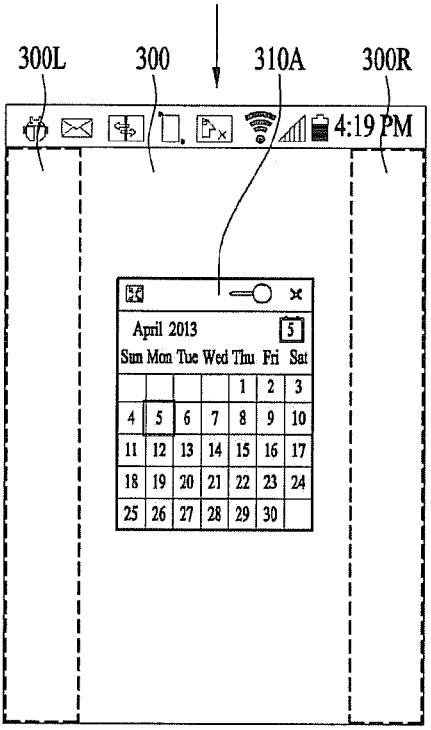
(b)

FIG. 14
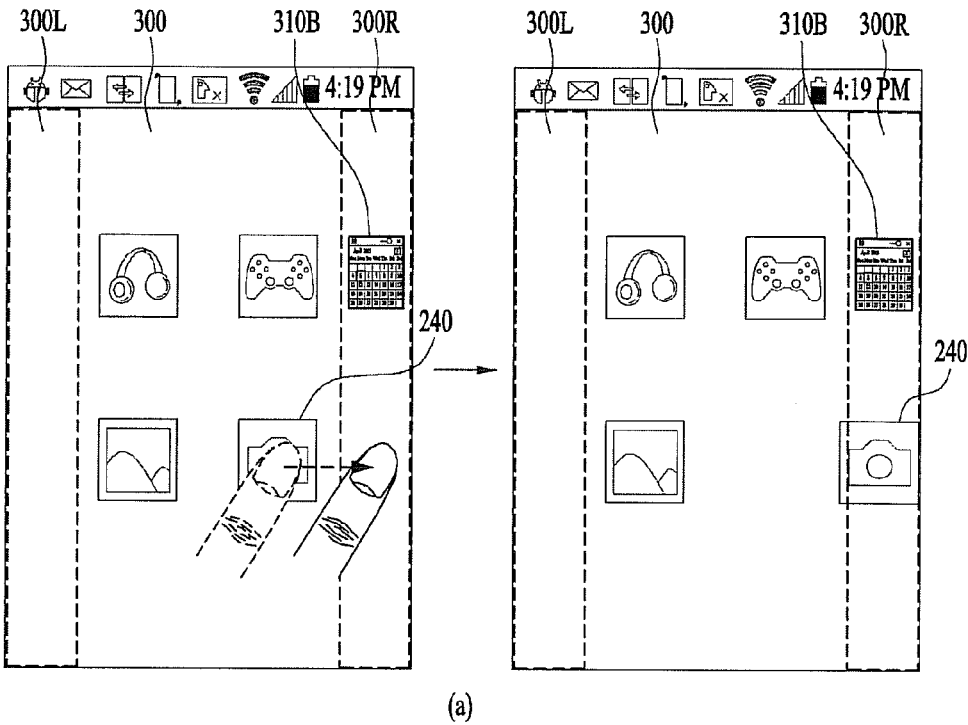
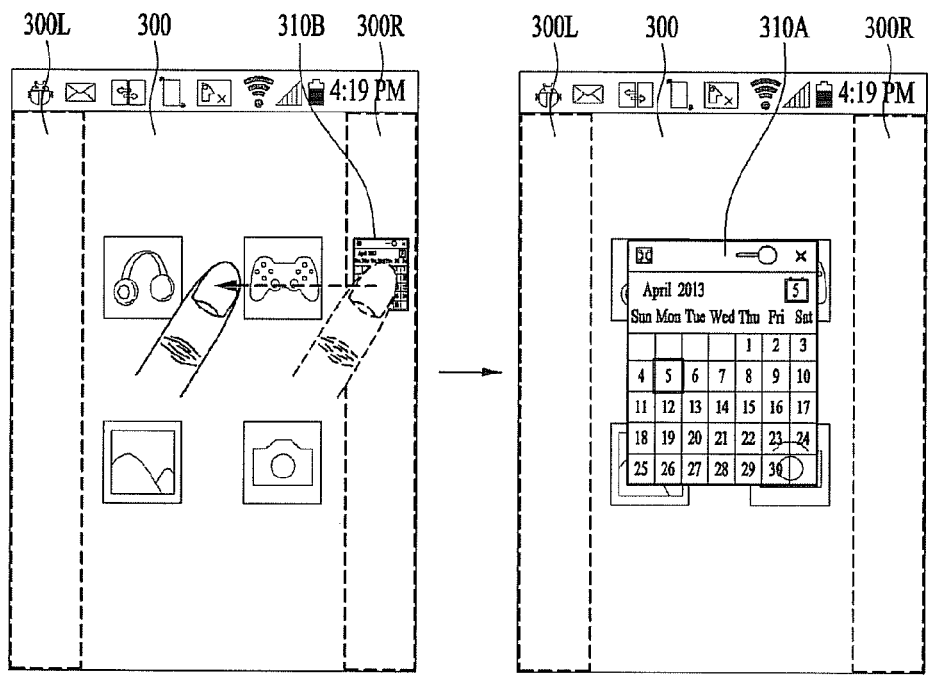

FIG. 15
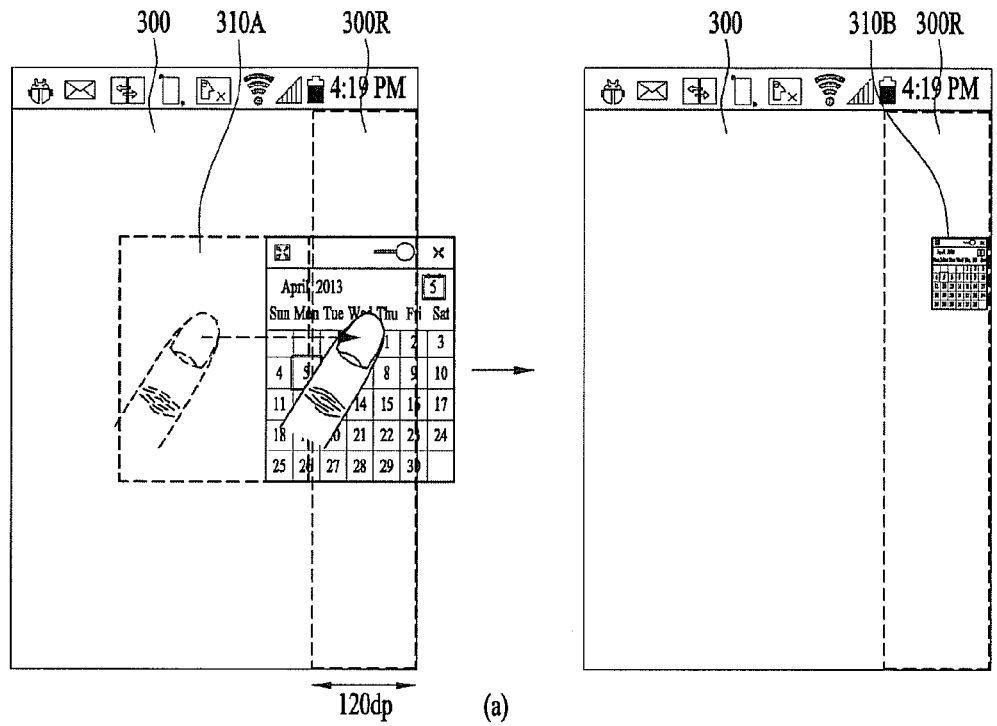
(a)
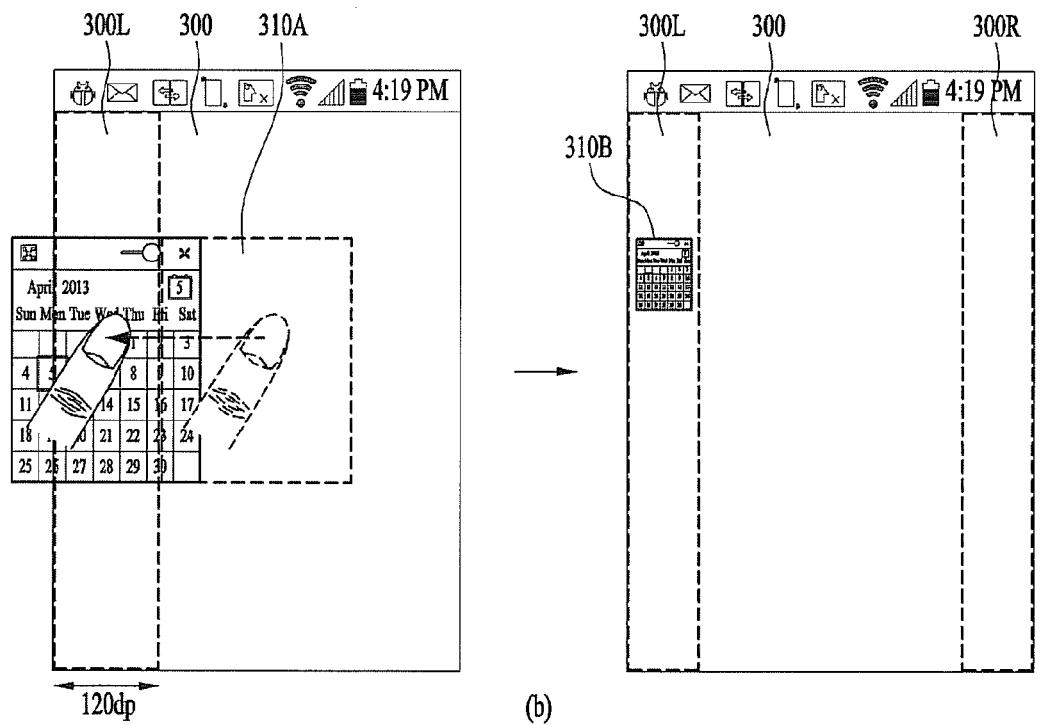
(b)

FIG. 16
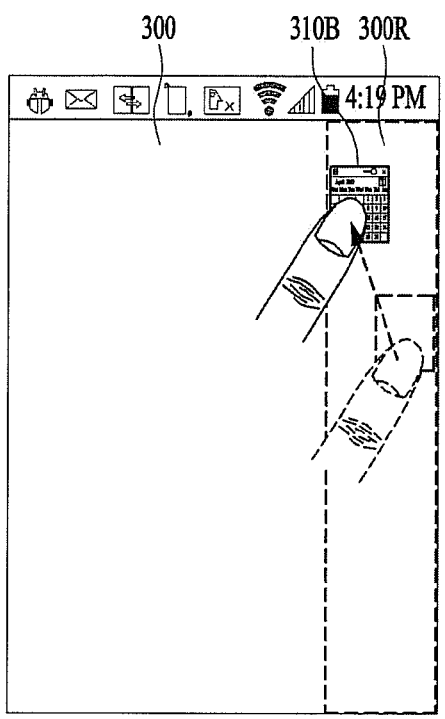
(a)
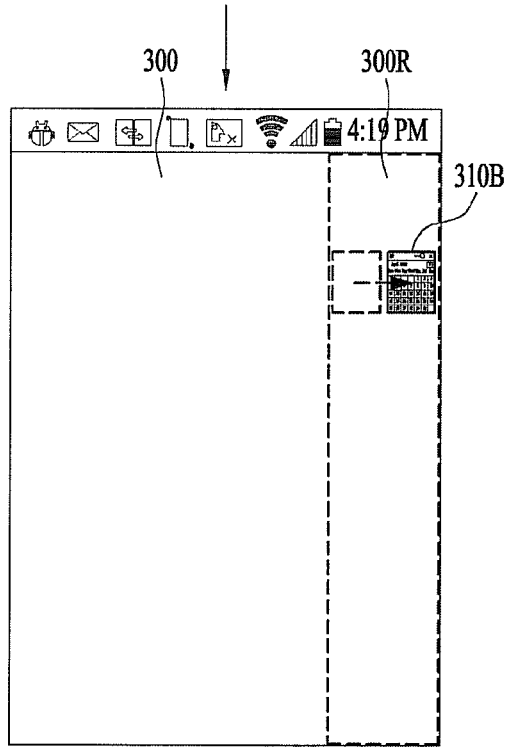
(b)

FIG. 19
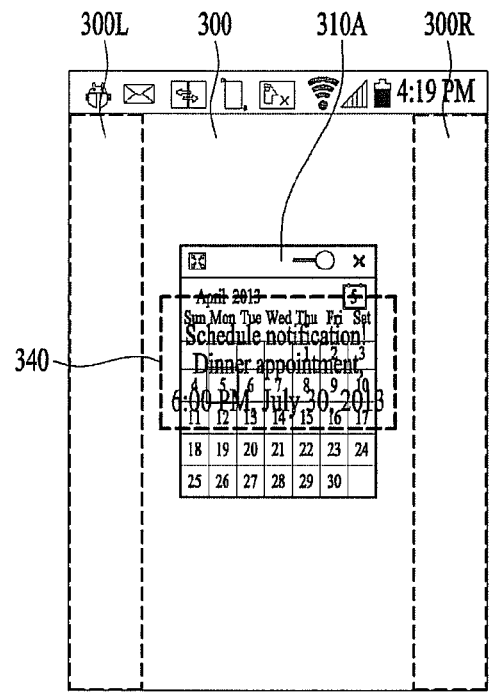
(a)
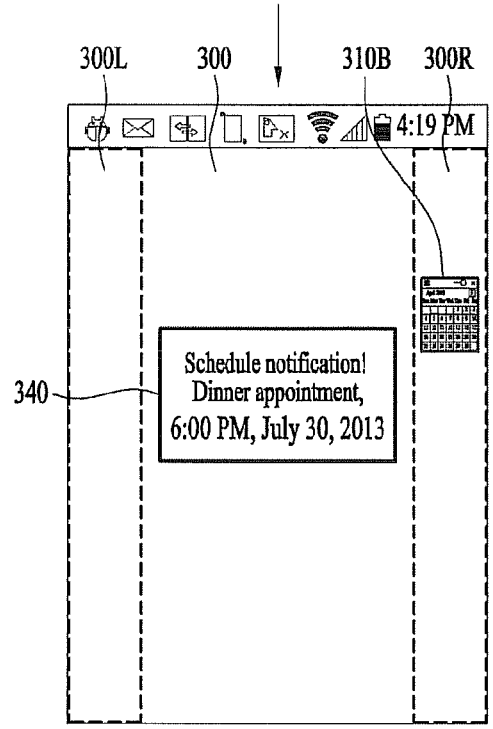
(b)

| Item | | Details |
|---|---|---|
| 511 | ‖‖ | Drag window |
| 512 | i1 | Memo mode ↔ Floating memo mode (Toggle) |
| 513 | i2 | Eraser ↔ Pen(Toggle) |
| 514 | —○ | Adjust transparency |
| 515 | ✕ | Close memo window |
| 516 | ◢ | Adjust memo window size |

FIG. 26
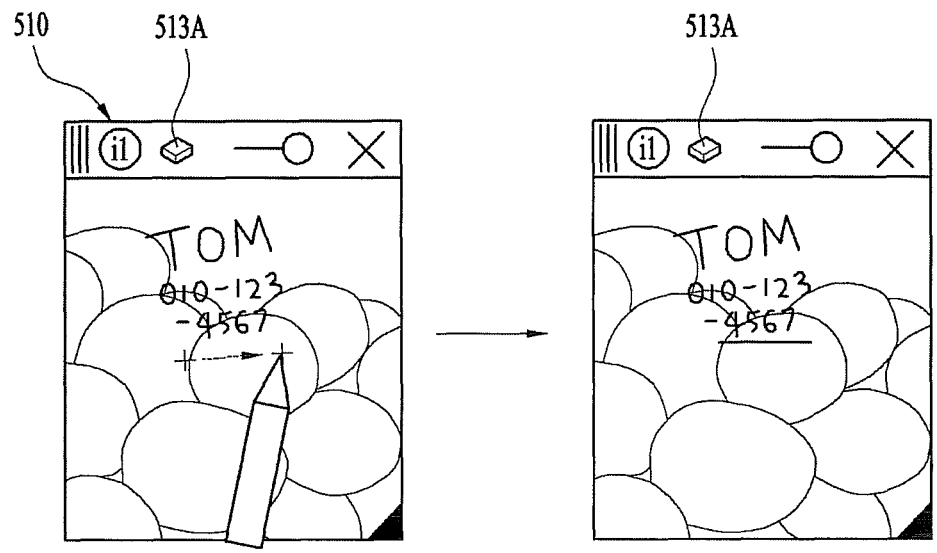
(a)
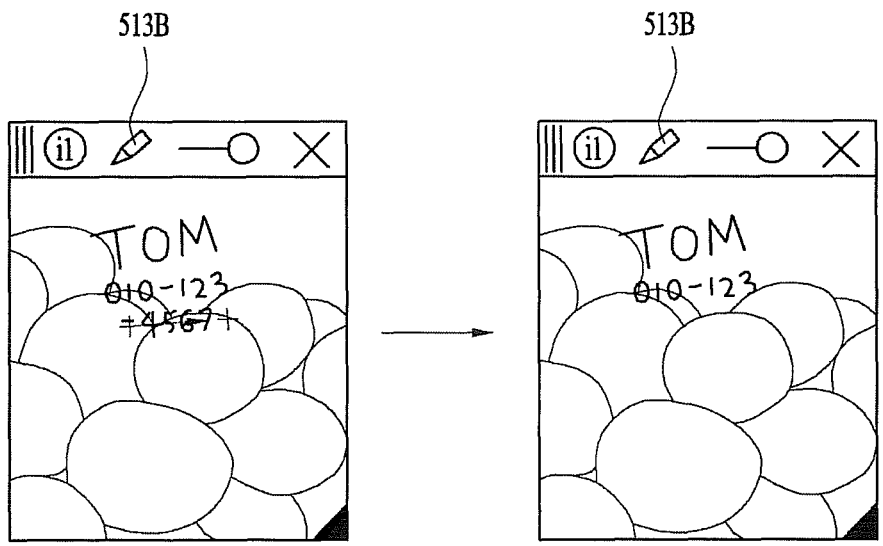
(b)

FIG. 33
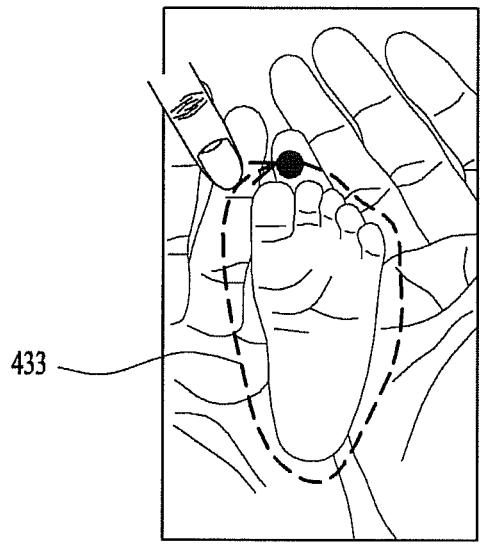
(a)
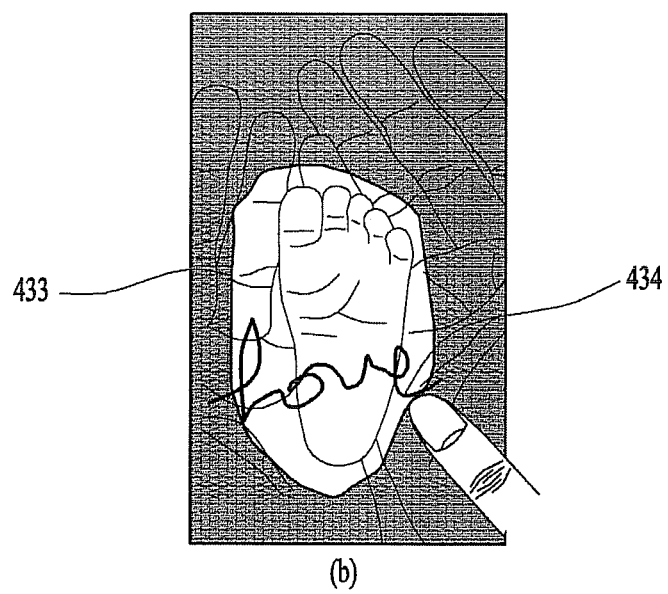
(b)

FIG. 34
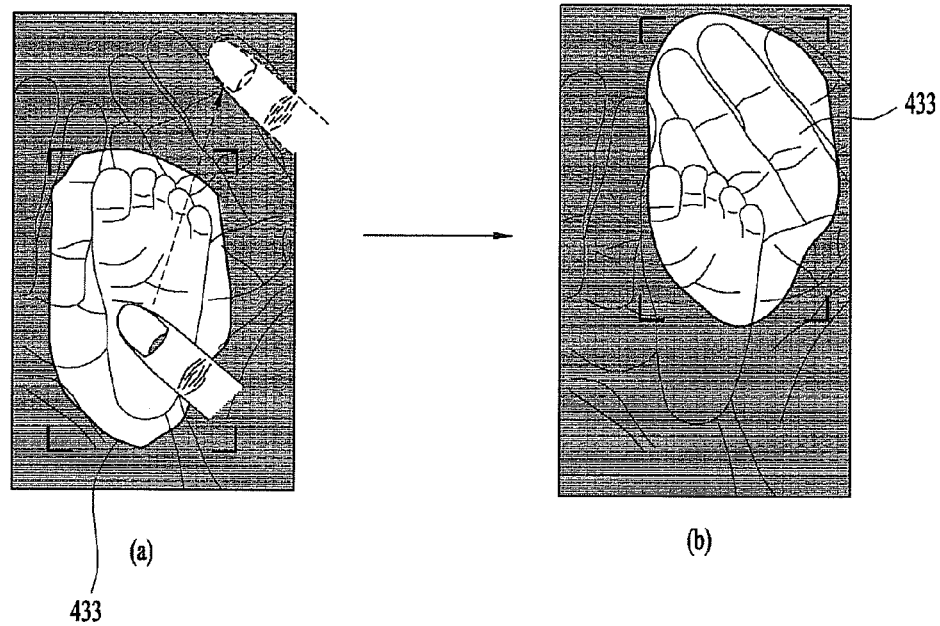
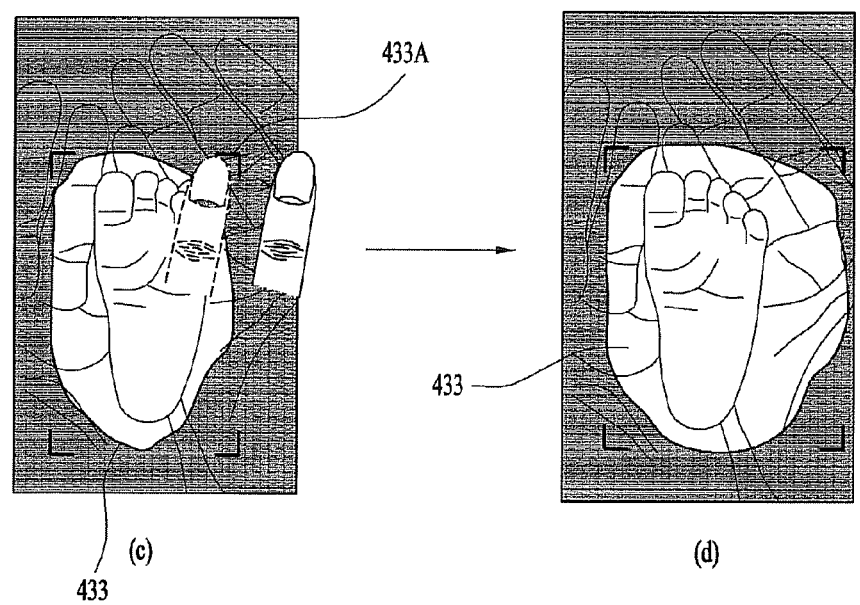

FIG. 35
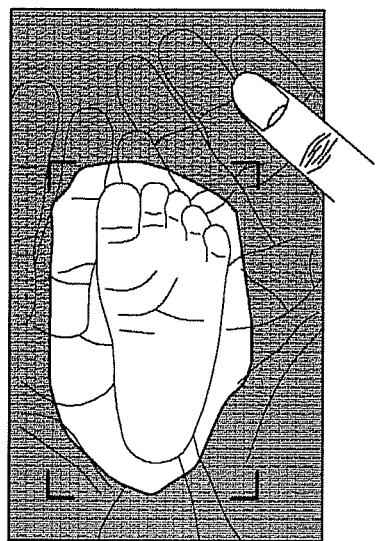
(a)
433
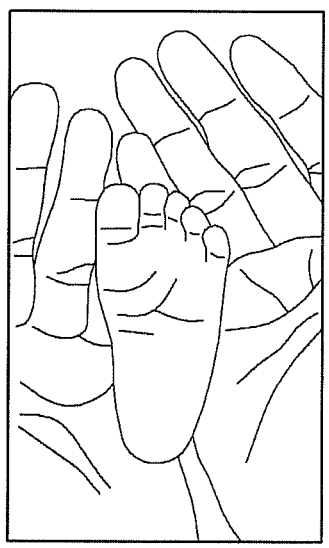
(b)

FIG. 39
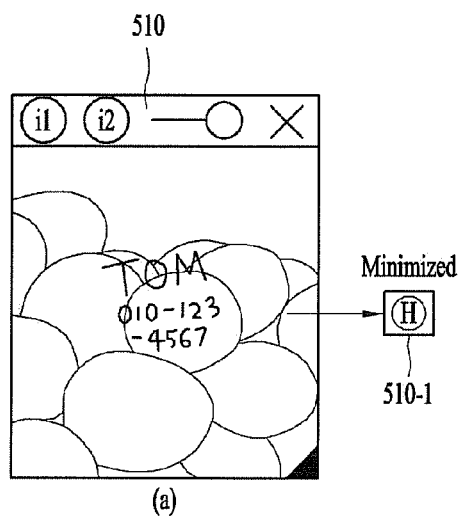
(a)
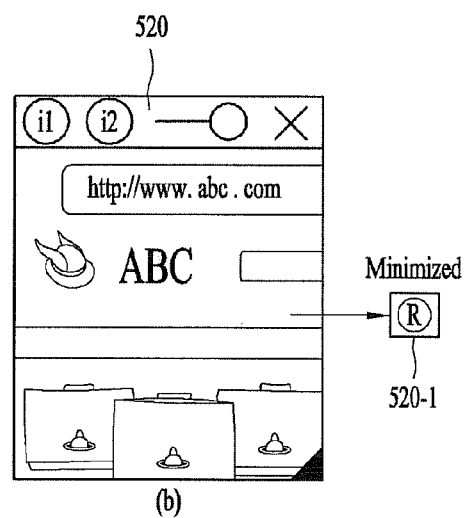
(b)
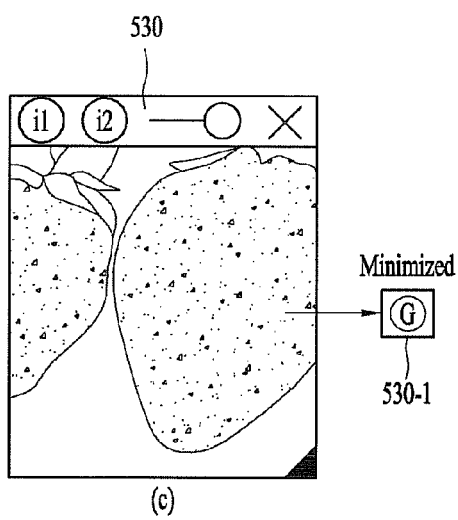
(c)

FIG. 40
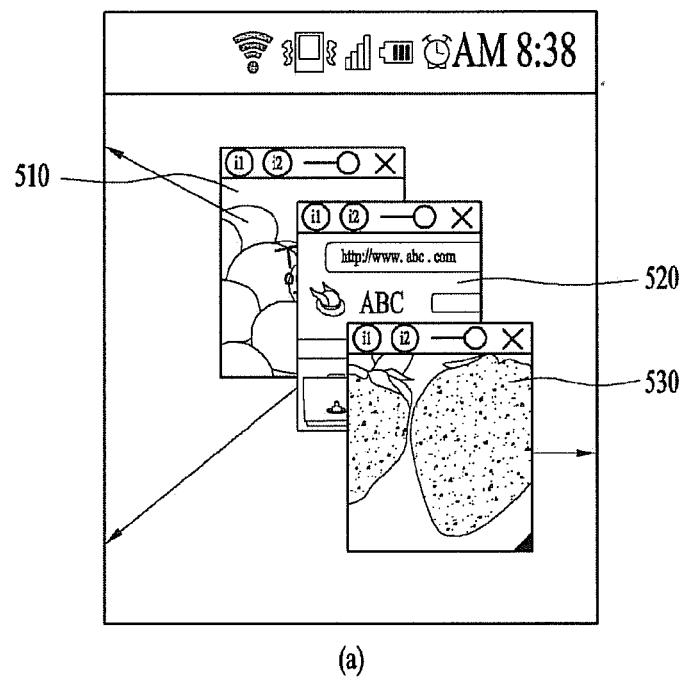
(a)
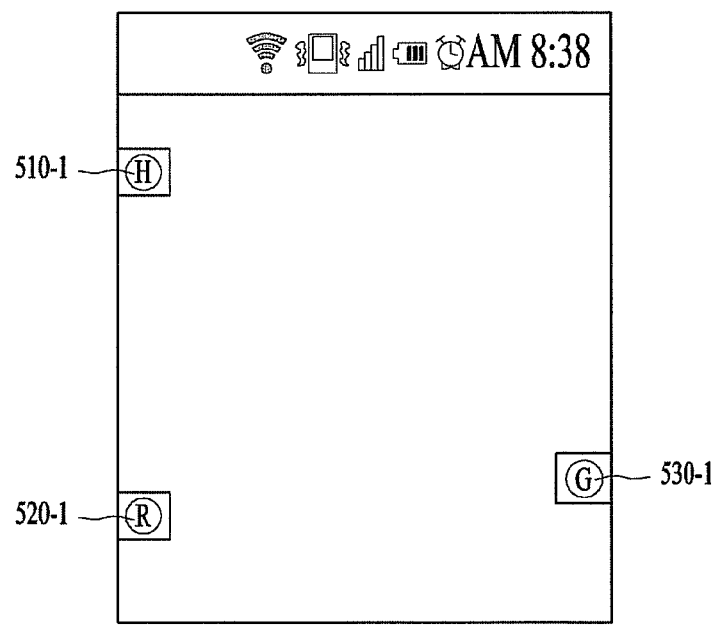
(b)

FIG. 41
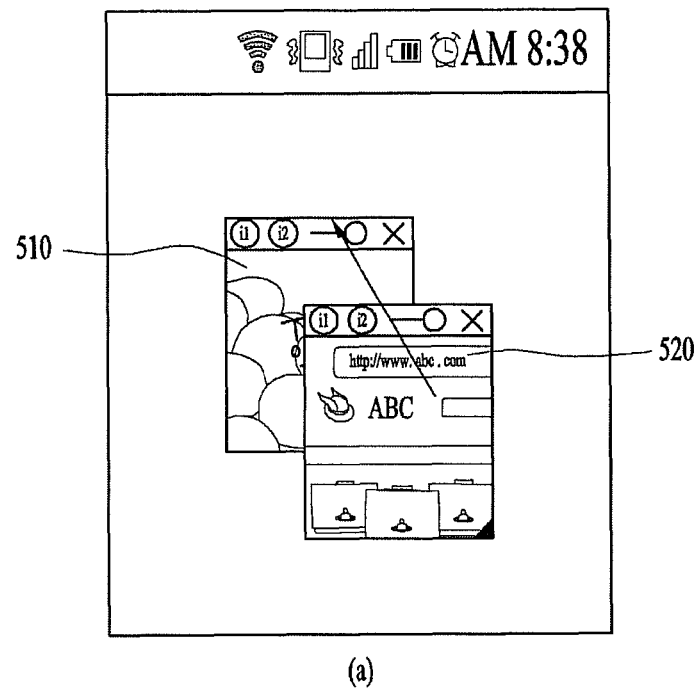
(a)
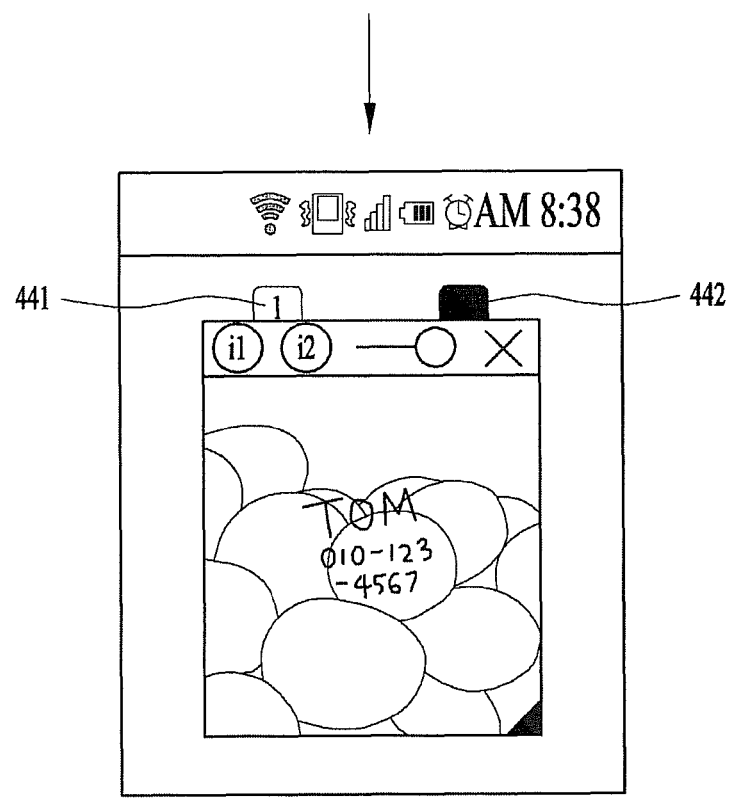
(b)

FIG. 42
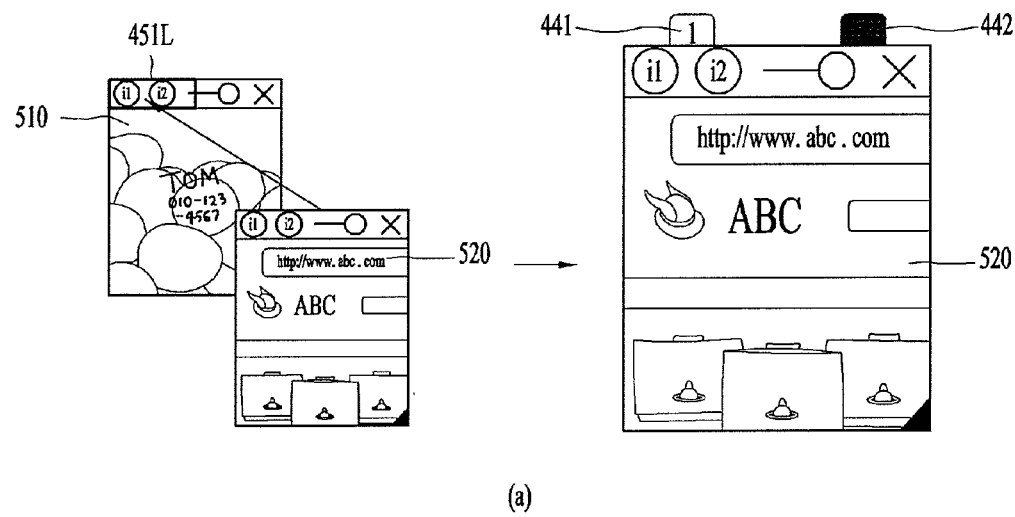
(a)
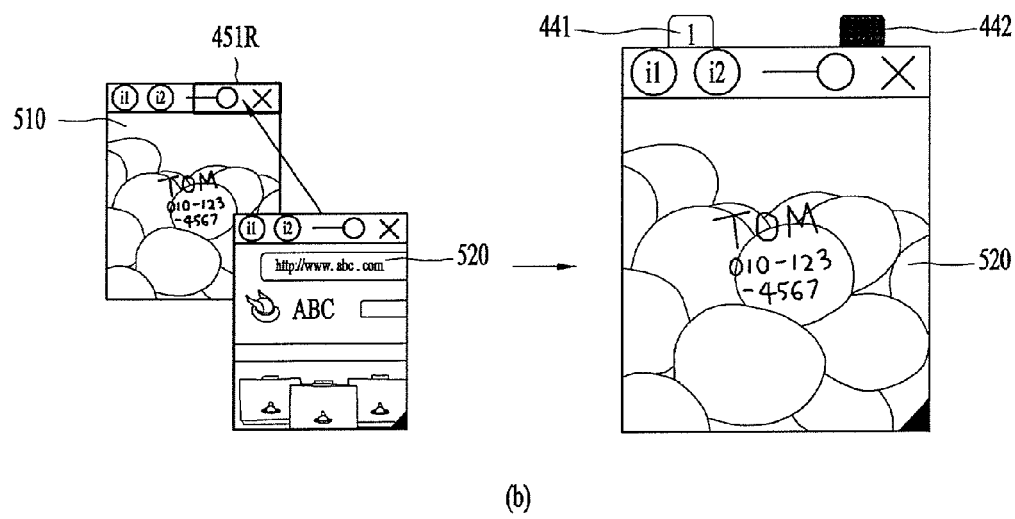
(b)

FIG. 43
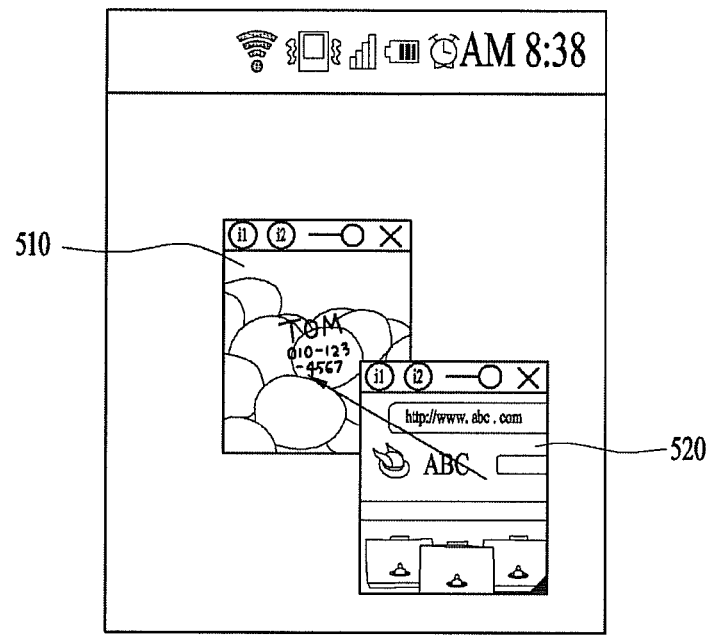
(a)
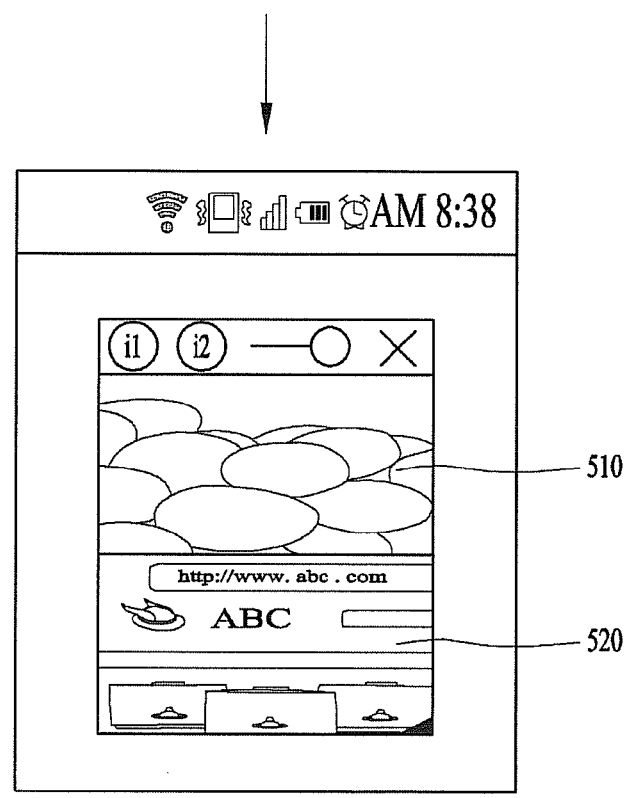
(b)

FIG. 44
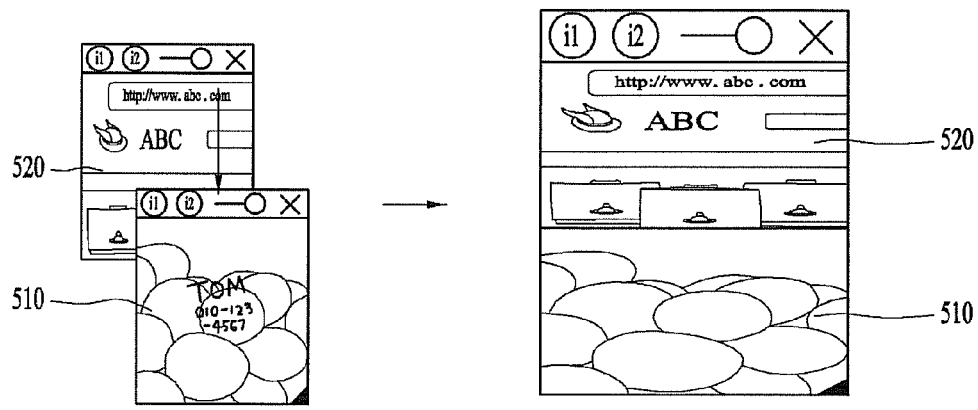
(a)
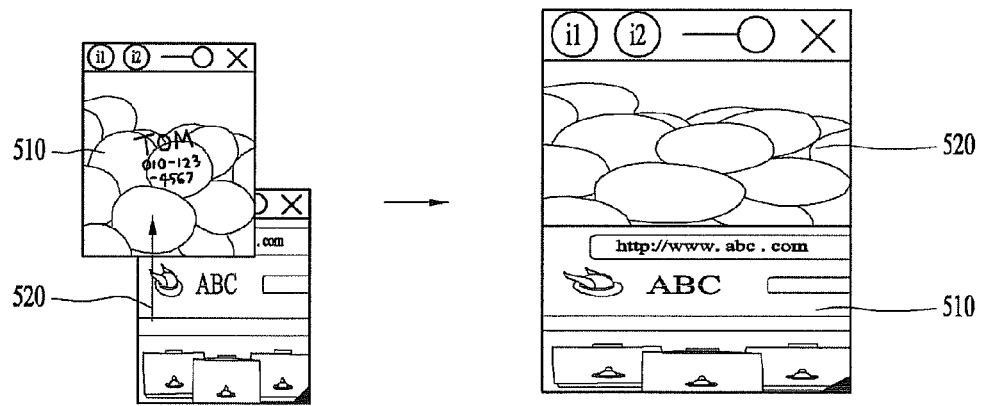
(b)

FIG. 45
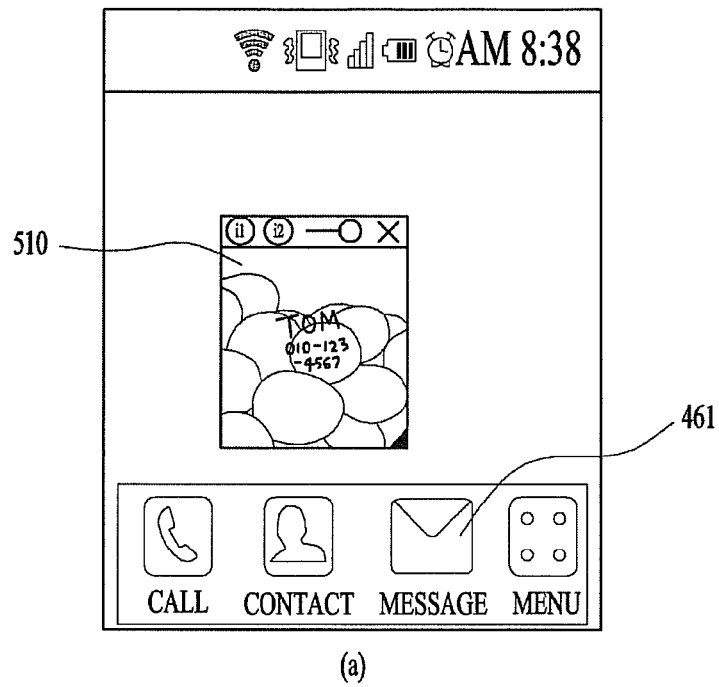
(a)
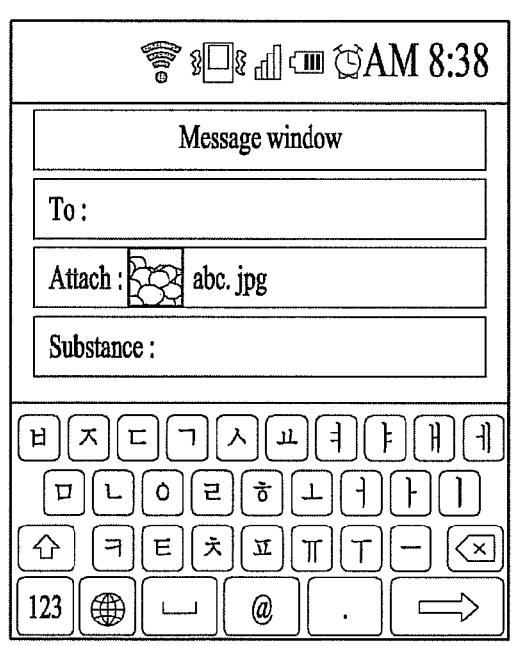
(b)

FIG. 50
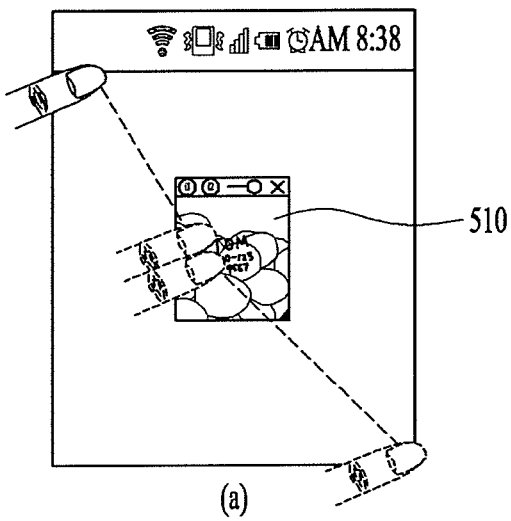
(a)
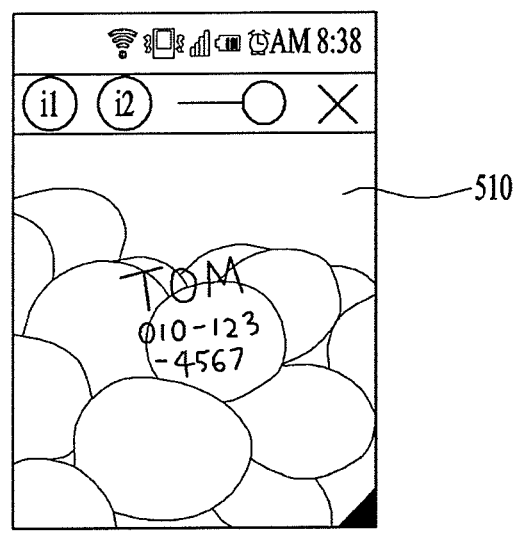
(b)

FIG. 51
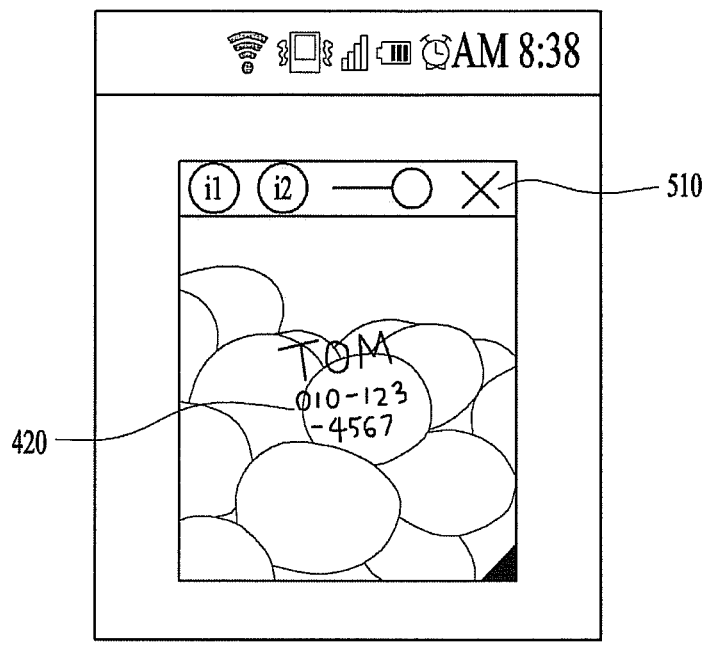
(a)
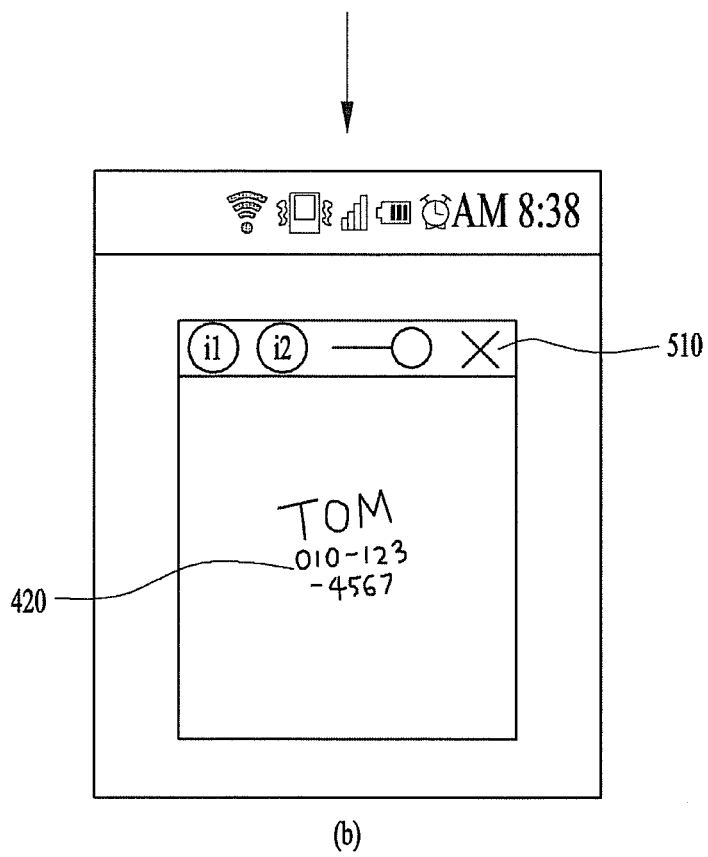
(b)

FIG. 52
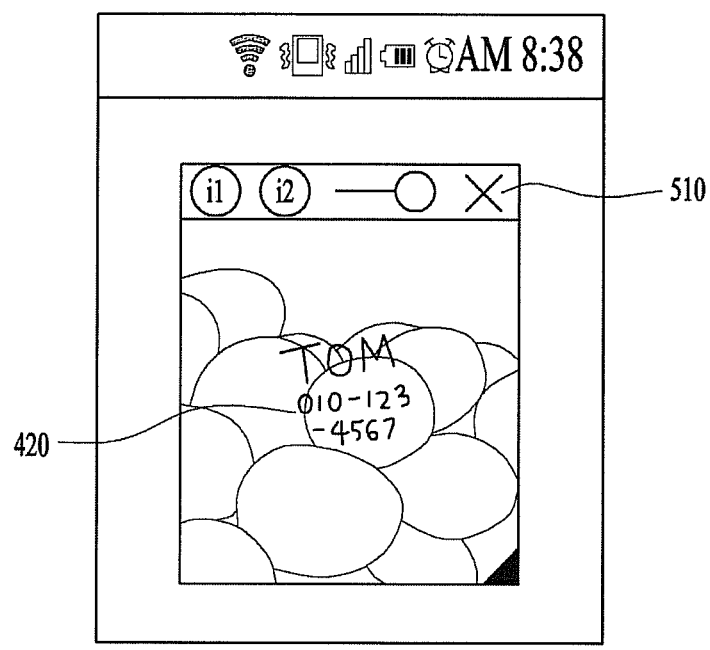
(a)
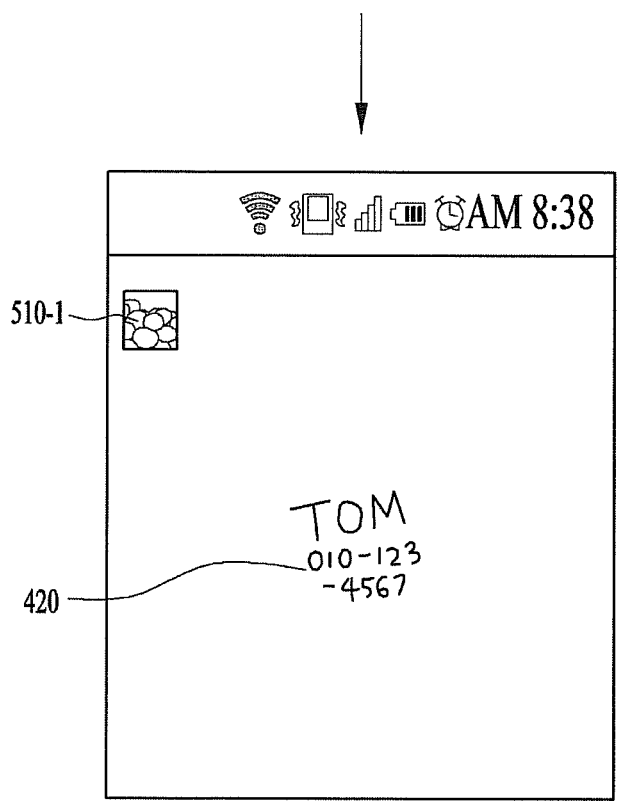
(b)

APPLICATION AND NOTIFICATION WINDOW DISPLAY MANAGEMENT IN A MOBILE TERMINAL

CROSS-REFERENCE TO RELATED APPLICATION(S)

This application claims priority under 35 U.S.C. § 119 to Korean Application Nos. 10-2013-0017949, filed on Feb. 20, 2013, 10-2013-0053102, filed on May 10, 2013 and 10-2013-0091992, filed on Aug. 2, 2013, whose entire disclosures are hereby incorporated by reference.

BACKGROUND

1. Field

The present disclosure relates to a mobile terminal, and more particularly, to a mobile terminal and a method of controlling the mobile terminal.

2. Background

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Currently, a mobile terminal provides various functions to a user through applications.

In particular, if a user inputs a command for executing a specific application, a mobile terminal executes the specific application and displays an executed screen of the executed specific application.

However, when the executed screen of the specific application is displayed, in order to watch a home screen or an executed screen of another executed application, the user stops displaying the executed screen of the currently displayed application and then selects a screen to watch, or performs a manipulation in a manner of switching the executed screen of the currently displayed application to a screen to watch one by one each time.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIGS. 5 to 22 are diagrams to describe a method of controlling a mobile terminal according to a $1^{st}$ embodiment of the present disclosure;

FIGS. 24 to 54 are diagrams to describe a method of controlling a mobile terminal according to a $2^{nd}$ embodiment of the present disclosure.

DETAILED DESCRIPTION

In the following detailed description, reference is made to the accompanying drawing figures which form a part hereof, and which show by way of illustration specific embodiments of the disclosure. It is to be understood by those of ordinary skill in this technological field that other embodiments may be utilized, and structural, electrical, as well as procedural changes may be made without departing from the scope of the present disclosure. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present disclosure can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
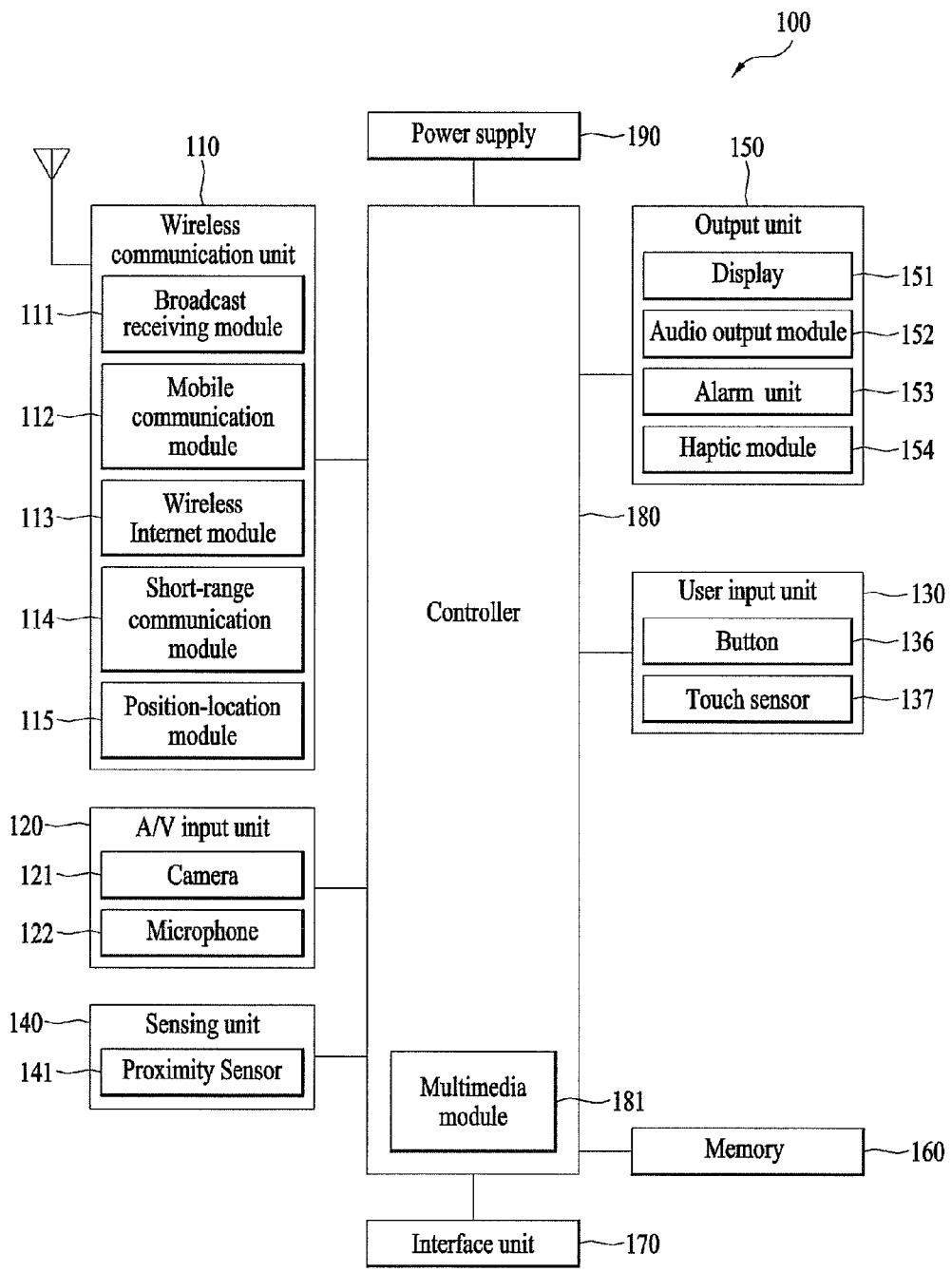
FIG. 1 is a block diagram of a mobile terminal according to one embodiment of the present disclosure.

FIG. 1 is a block diagram of a mobile terminal 100 in accordance with an embodiment of the present disclosure. FIG. 1 shows the mobile terminal 100 according to one embodiment of the present disclosure includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-information module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (NV) input unit 120 is configured to provide audio or video signal input to the mobile terminal 100. As shown, the NV input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
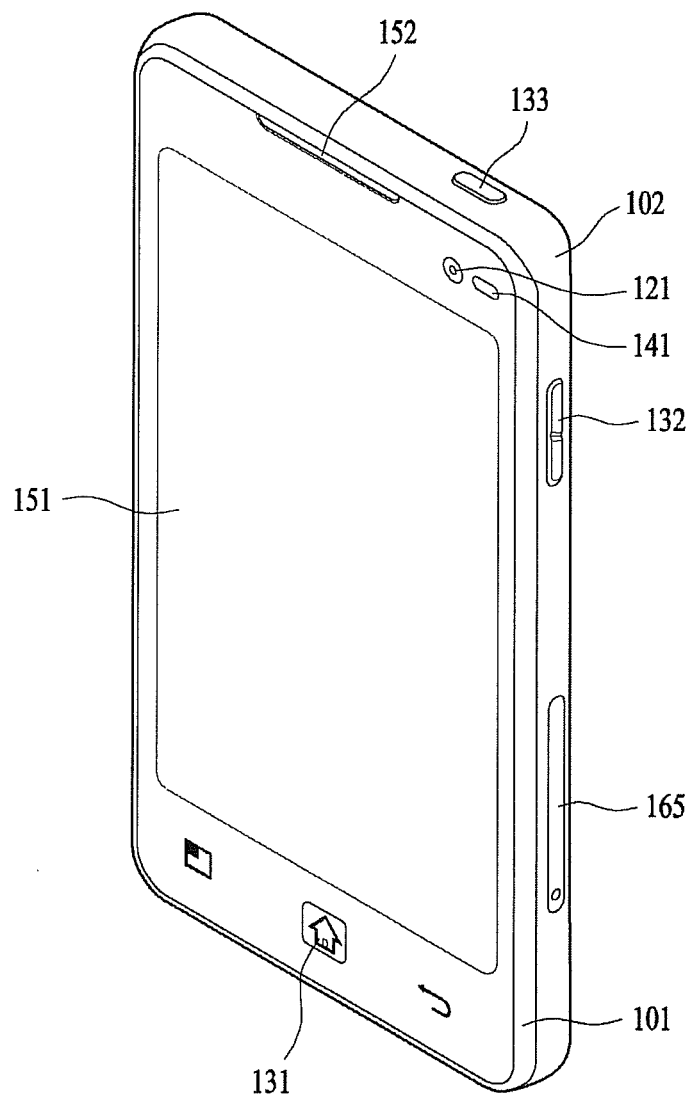
FIG. 2 is a front perspective diagram of a mobile terminal according to one embodiment of the present disclosure.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present disclosure.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
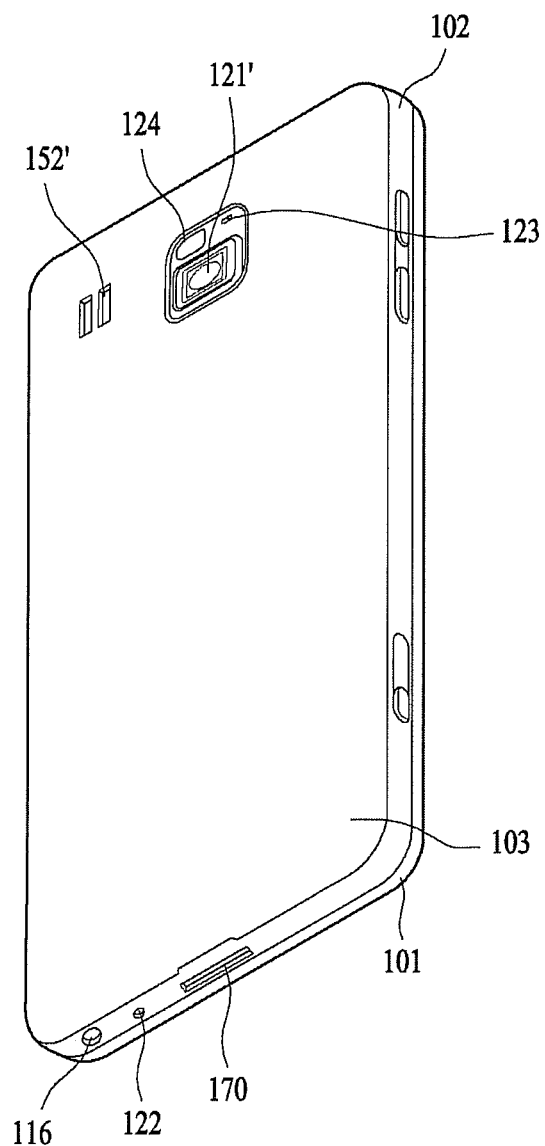
FIG. 3 is a rear perspective diagram of a mobile terminal according to one embodiment of the present disclosure.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 3 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Meanwhile, according to an embodiment of the present disclosure, a user's touch action means a touch gesture implemented in a manner of performing a contact touch or a proximity touch on the display unit 151 of the touchscreen type. And, a touch input means an input received in response to the touch gesture.

The touch gesture may be categorized into one of a tapping, a touch & drag, a flicking, a press, a multi-touch, a pinch-in, a pinch out and the like in accordance with an action.

In particular, the tapping includes an action of lightly pressing and depressing the display unit 151 once and means a touch gesture such as a lock of a mouse of a normal personal computer.

The touch & drag is an action of touching the display unit, then moving the touch to a specific point by maintaining the touch to the display unit 151, and then releasing the touch from the display unit 151. When an object is dragged, the corresponding object can be displayed in a manner of moving continuously in a drag direction.

The flicking means an action of touching the display unit 151 and then performing a stroke in a specific direction (e.g., top direction, bottom direction, right direction, left direction, diagonal direction, etc.) at a specific speed (or strength). If a touch input of flicking is received, the mobile terminal 100 processes a specific operation based on a flicking direction, a flicking speed and the like.

The press means an action of touching the display unit 151 and then continuing the touch for preset duration at least.

The multi-touch means an action of simultaneously touching a plurality of points on the display unit 151.

The pinch-in means an action of dragging a plurality of pointers currently multi-touching the display unit 151 in an approaching direction. In particular, the pinch-in means a drag performed in a manner of starting with at least one of a plurality of points multi-touched on the display unit 151 and then progressing in a direction having a plurality of the multi-touched points get closer to each other.

The pinch-out means an action of dragging a plurality of pointers currently multi-touching the display unit 151 in a moving-away direction. In particular, the pinch-out means a drag performed in a manner of starting with at least one of a plurality of points multi-touched on the display unit 151 and then progressing in a direction having a plurality of the multi-touched points move away from each other.

The present disclosure is described in detail with reference to FIGS. 4 to 54 as follows.

First of all, a following process is described in detail with reference to FIGS. 4 to 22. In particular, according to a $1^{st}$ embodiment of the present disclosure, a window for displaying an executed screen of an application is displayed on a screen. If the window is shifted into a preset region within the screen, the window is displayed within the preset region in a manner of being reduced and transformed into an icon. If the icon is shifted output of the preset region, the icon is displayed in a manner of being transformed into the window previous to the reduction and transformation.

<1st Embodiment>

In the following description of a $1^{st}$ embodiment of the present disclosure, an executed window of an application displayed on a screen of the touchscreen 151 by having a size smaller than the screen may be named 'floating window'. An operating mode, in which an executed (or activated) screen of a currently executing application is displayed on the floating window, may be named 'floating mode'. And, an operating mode, in which the executed window of the currently executing application is displayed on the touchscreen 151 by pull-up, may be named 'normal mode'.

Figure 4:
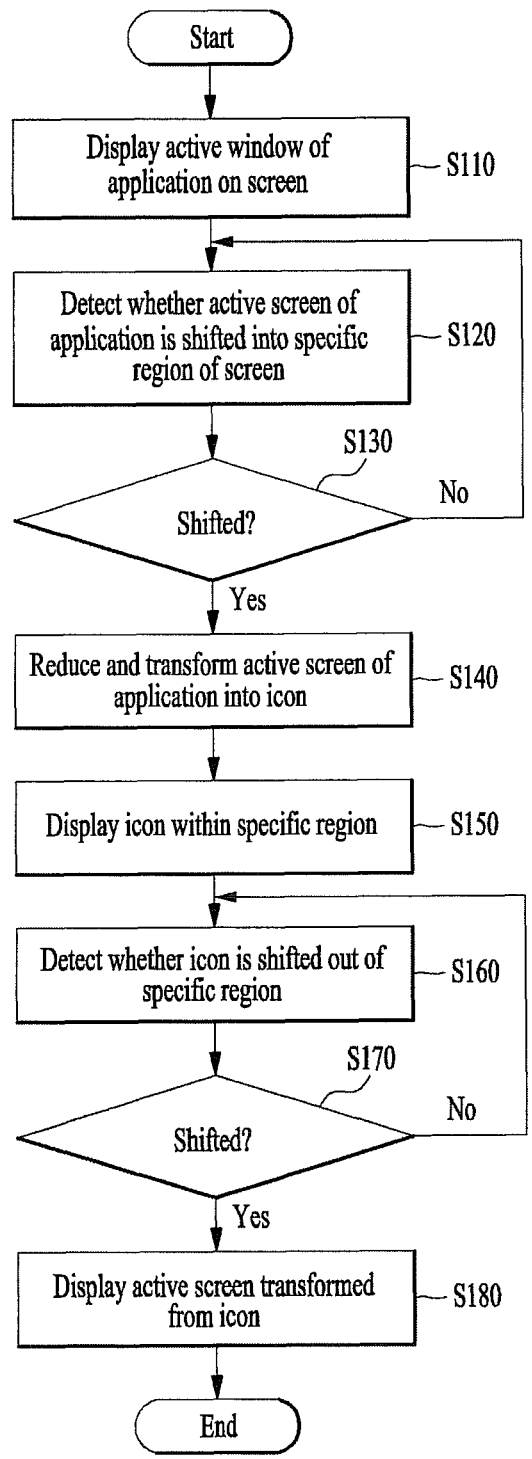
FIG. 4 is a flowchart for a method of controlling a mobile terminal according to a $1^{st}$ embodiment of the present disclosure.

FIG. 4 is a flowchart for a method of controlling a mobile terminal according to a $1^{st}$ embodiment of the present disclosure.

FIGS. 5 to 22 are diagrams that illustrate a method of controlling a mobile terminal according to a $1^{st}$ embodiment of the present disclosure.

Referring to FIGS. 4 to 22, if a command for executing a specific application in the floating mode is inputted, the controller 180 of the mobile terminal 100 executes the specific application and controls an image according to an executed window of the executed application to be displayed on the floating window [S110].

In this case, the floating window, on which the executed window of the application is displayed, can be shifted or adjust its size by a user's touch action on a screen (display screen). Although information displayed on the screen is changed, the floating window is always displayed in a floating sate on the screen until the user stops displaying the floating window.

In doing so, the floating window displayed screen can include at least one of a home screen, a menu screen, a standby screen, an executed screen of a specific function and an executed screen of a prescribed application different from the specific application.

For instance, FIG. 5 (a) shows that icons 211 of at least two applications executable in a floating mode are displayed within a notification window 210 of the mobile terminal 100.

In this case, the notification window is the window displayed when a notification bar located at a top end of the screen is touched and dragged in a bottom direction by a user. And, the notification window provides various operating states of the mobile terminal 100, an event (e.g., a message reception, an application update report, an alarm, etc.) currently occurring in the mobile terminal 100, various function setting user interfaces (e.g., Wi-Fi on/off, Bluetooth on/off, GPS on/off, etc.) of the mobile terminal 100, and the like.

If an icon 'Memo' 211A of a specific application among the icons 211 is touched, referring to FIG. 5 (c), the controller 180 executes the touched application and displays an executed screen of the executed application on the floating window 230.

In doing so, the $1^{st}$ user interface (UI) 221 within the floating window 230 is the UI configured to toggle a switching between a normal mode and a floating mode for an operating mode of the specific application 'Memo'. Each time the $1^{st}$ UI 221 is touched, the controller 180 toggles the switching between the normal mode and the floating mode.

The $2^{nd}$ UI 222 within the floating window 230 is provided to adjust transparency of the floating window 230. If the transparency is adjusted through the $2^{nd}$ window 222, the controller 180 displays the floating window 230 by reflecting the adjusted transparency thereon.

For another instance, FIG. 5 (b) shows that the specific application 'Memo' is displayed in the normal mode.

In doing so, if the $1^{st}$ UI 221 included in an executed screen 220 of the application 'Memo' is touched, referring to FIG. 5 (c), the controller 180 switches the normal mode to the floating mode and displays the executed screen of the application on the floating window 230.

Referring now to FIG. 4, the controller 180 detects whether the floating window is shifted into a specific region within the screen of the touchscreen 151 [S120].

In this case, the specific region includes a predetermined region of at least one of 4 sides of the screen. For instance, the specific region can include a left side region and a right side region of the screen.

If the floating window is shifted into the specific region [S130], the controller 180 reduces and transforms the floating window into an icon [S140] and then displays the corresponding icon within the specific region [S150].

In doing so, the controller 180 controls an information, which indicates at least one of a function and name of the application displayed on the floating window, and/or an icon shape corresponding to the application to be displayed within the icon.

Meanwhile, the floating window can be shifted into the specific region by a user's touch action. For instance, the floating window can be shifted into the specific region by a user's drag touch action or a user's flocking touch action.

The icon is displayed in a manner of being attached to a side included in the specific region. For instance, if the specific region includes a left/right side, the icon is displayed in a manner of being attached to the left/right side.

A location of the icon can be shifted within the specific region by a user's touch action. After the icon has been shifted within the specific region by a user's drag touch action, if the user's touch is released, the icon is displayed in a manner of being attached to a side next to the shifted location within the specific region.

If a whole area of the floating window is shifted into the specific region, the controller 180 can reduce and transform the floating window into the icon. If at least one portion of the floating window, of which size is equal to or greater than a preset area, is shifted into the specific region, the controller 180 can reduce and transform the floating window into the icon. If the floating window is shifted proximately to the specific region, the controller 180 can reduce and transform the floating window into the icon.

Once the floating window is shifted into the specific region, the controller 180 controls an icon corresponding to the floating window to be displayed at a position of a height occupied within the specific region by the shifted floating window. In particular, if the floating window is shifted into the specific region horizontally, a top height of the floating window is equal to a top height of the icon.

If the floating window is reduced and transformed into the icon, the controller 180 can control an operation of the application displayed through the floating window to pause entirely or in part.

For instance, if the application provides an image (e.g., a document slide show, a video without audio, etc.) only, the controller 180 can control the image play to pause. For another instance, if the application provides an audio (e.g., a music, a radio, a voice call, etc.) only, the controller 180 can keep playing the audio without controlling an audio play operation of the application to pause. For another instance, if the application provides a content (e.g., a movie, a broadcast, a video, etc.) including an audio and an image, the controller 180 can control an image play operation of the application to pause without controlling an audio play operation to pause.

If the floating window is reduced and transformed into the icon, the controller 180 controls a focus, which was displayed on the floating window before the floating window is reduced and transformed into the icon, to be shifted to the screen. In this case, the focus means a visual effect that indicates a state for enabling a user to input a touch command currently. For instance, when the screen includes a home screen, if the floating window is reduced and transformed into the icon, the focus, which was in the floating window before the floating window is reduced and transformed into the icon, is shifted to the home screen.

While the floating window is reduced and transformed into the icon, the controller 180 detects whether the icon is shifted out of the specific region by a user's touch action [S160]. If the icon is shifted out of the specific region [S170], the controller 180 transforms the icon into the floating window having the size previous to the corresponding reduction and transformation and then displays the corresponding floating window [S180].

In particular, if a whole area of the icon is shifted out of the specific region, the controller 180 can display the floating window by transforming the icon into the floating window. If at least one portion of the icon, of which size is equal to or greater than a preset area, is shifted out of the specific region, controller 180 can display the floating window by transforming the icon into the floating window. If the icon is shifted proximately in an outer direction of the specific region, controller 180 can display the floating window by transforming the icon into the floating window. If the icon is shifted to a central region of the screen outside the specific region, controller 180 can display the floating window by transforming the icon into the floating window.

Moreover, if the icon is transformed into the floating window, the controller 180 resumes the operation by starting with the part that has paused in reducing and transforming the floating window into the icon.

In the following description, the process shown in FIG. 4 is explained in detail with reference to FIGS. 6 to 22.

First of all, for instance, FIGS. 6 to 9 show that an application displayed within a floating window 310A is 'Calendar'. And, the specific region includes a left side region 300L and a right side region 300R within a screen 300.

Figure 6:
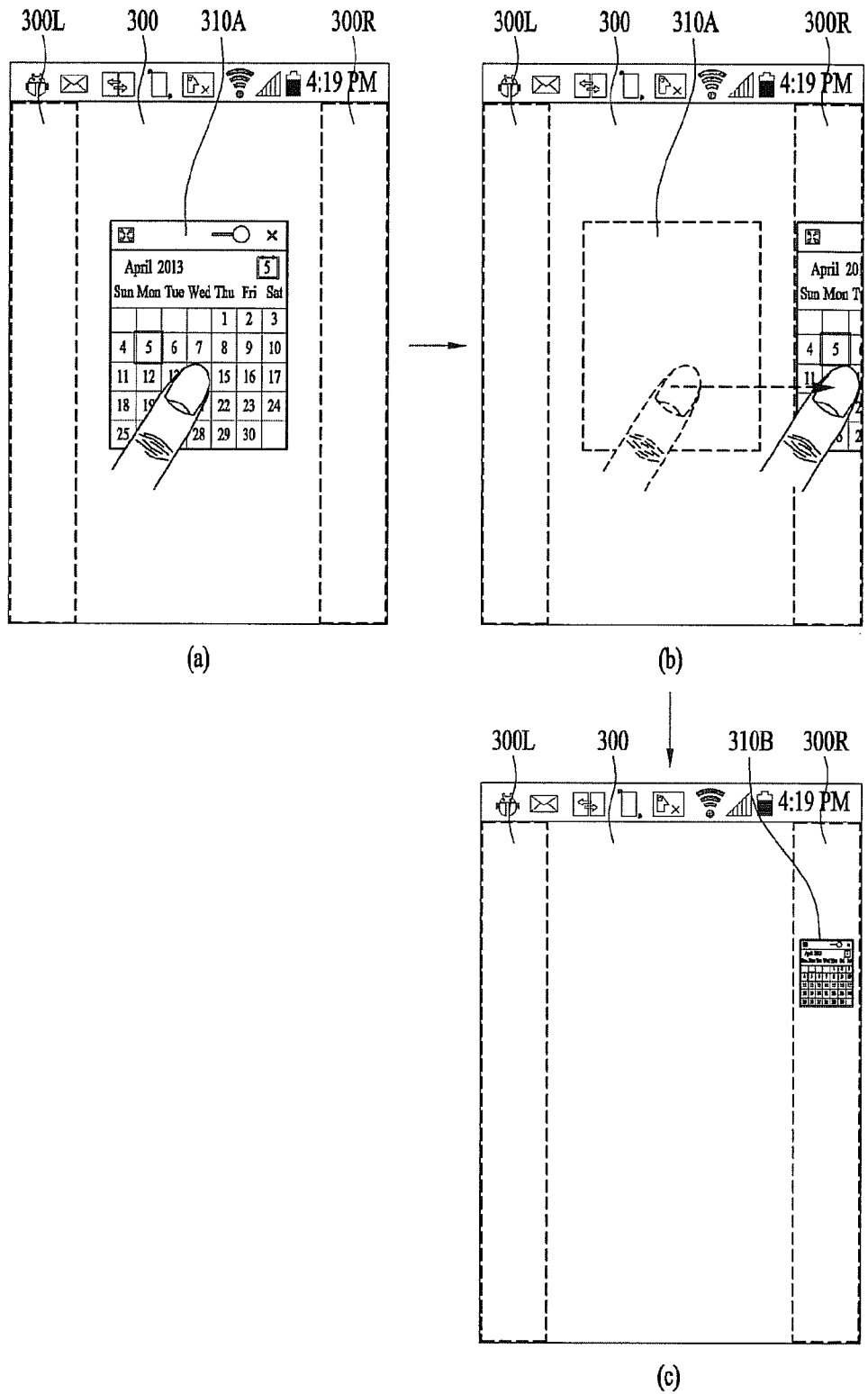

In particular, referring to FIG. 6, after the floating window 310A has been touched [FIG. 6 (*a*)], if the floating window 310A is shifted by being dragged to the right side region 300R [FIG. 6 (*b*)], the controller 180 reduces and transforms the floating window 310A into an icon 310B indicating 'Calendar' and then controls the icon 310B to be displayed in a manner of being attached to a right side of the right side region 300R [FIG. 6 (*c*)].

Subsequently, referring to FIG. 7, when the icon 310B transformed from the floating window 310A is displayed on the right side region 300R, if the icon 310B is touched and dragged out of the right side region 300R [FIG. 7 (*a*), FIG. 7 (*b*)], the controller 180 transforms the icon 310B into the floating window 310A having the size previous to the reduction and transformation and then displays the corresponding floating window 310A [FIG. 7 (*c*)].

In doing so, if the icon 310B is shifted gradually output of the right side region 300R by a user's drag touch action, the controller 180 controls the icon 310B to be gradually changed into a shape of the floating window 310A in order to be displayed.

Figure 8:
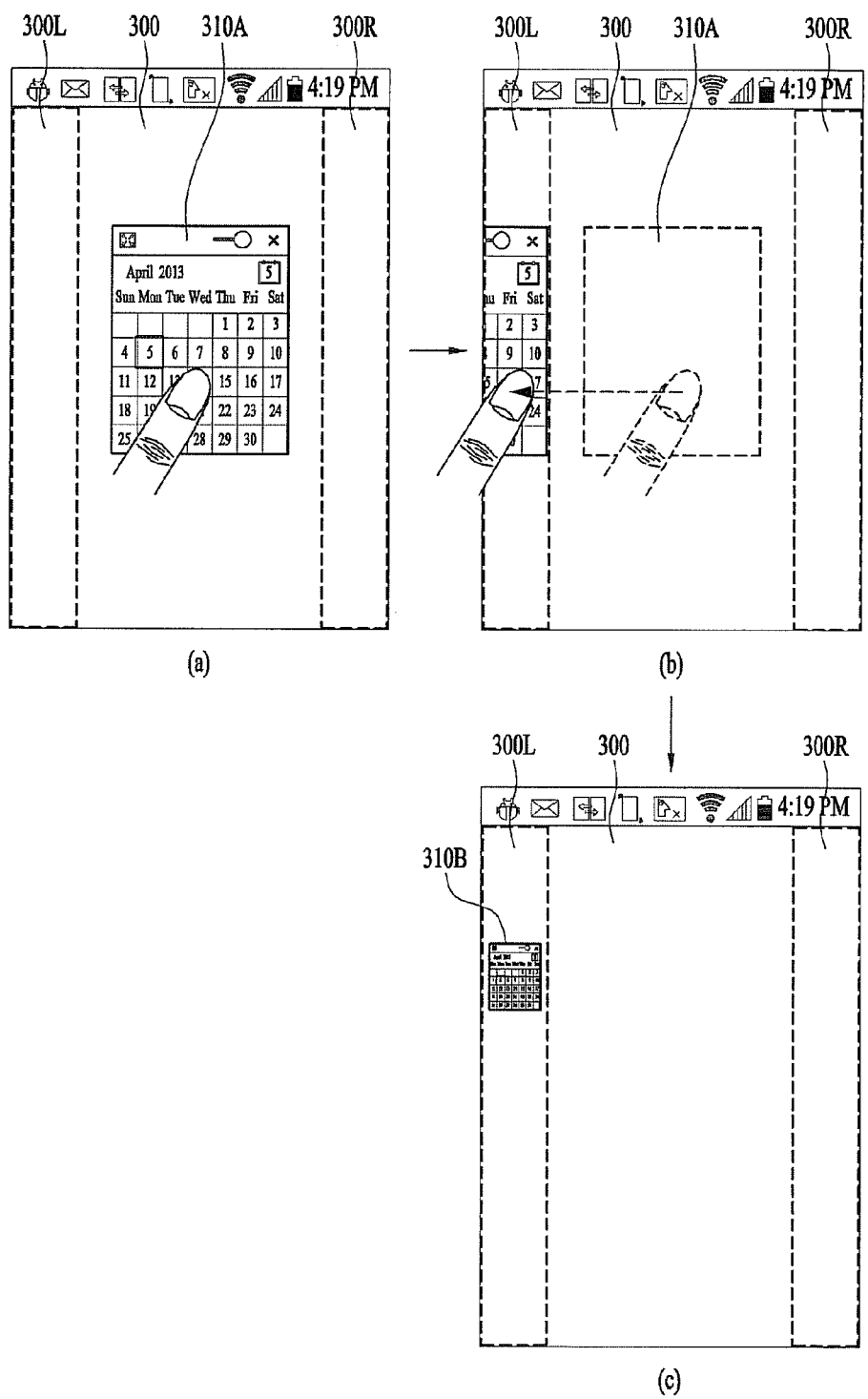

Subsequently, referring to FIG. 8, after the floating window 310A has been touched [FIG. 8 (*a*)], if the floating window 310A is shifted by being dragged to the left side region 300L [FIG. 8 (*b*)], the controller 180 reduces and transforms the floating window 310A into the icon 310B indicating 'Calendar' and controls the icon 3108 to be displayed in a manner of being attached to a right side of the left side region 300L [FIG. 8 (*c*)].

Figure 9:
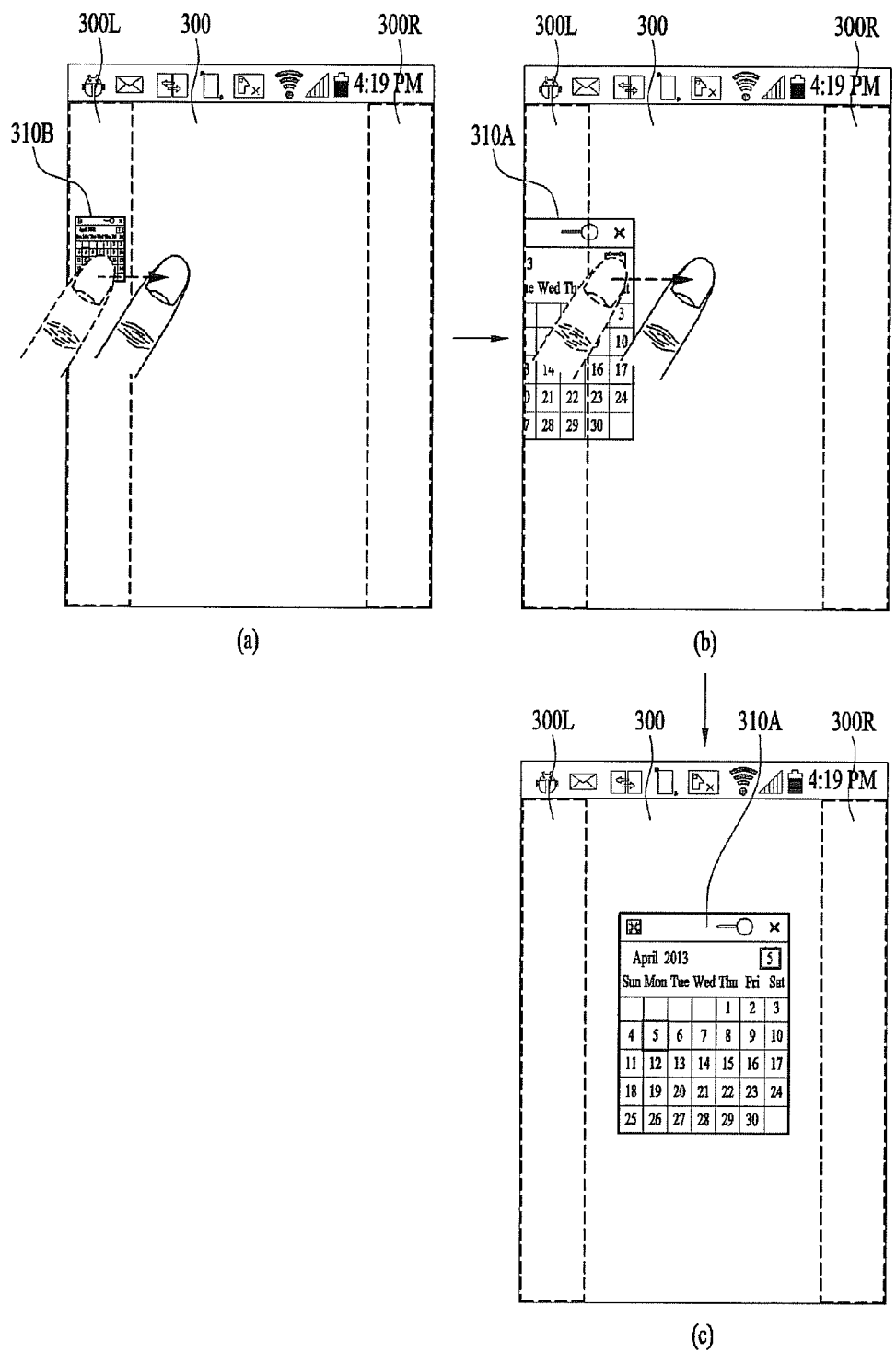

Subsequently, referring to FIG. 9, when the icon 310B transformed from the floating window 310A is displayed on the left side region 300L, if the icon 310B is touched and dragged out of the left side region 300L [FIG. 9 (*a*), FIG. 9 (*b*)], the controller 180 transforms the icon 310B into the floating window 310A having the size previous to the reduction and transformation and then displays the corresponding floating window 310A [FIG. 9 (*c*)].

Figure 10:
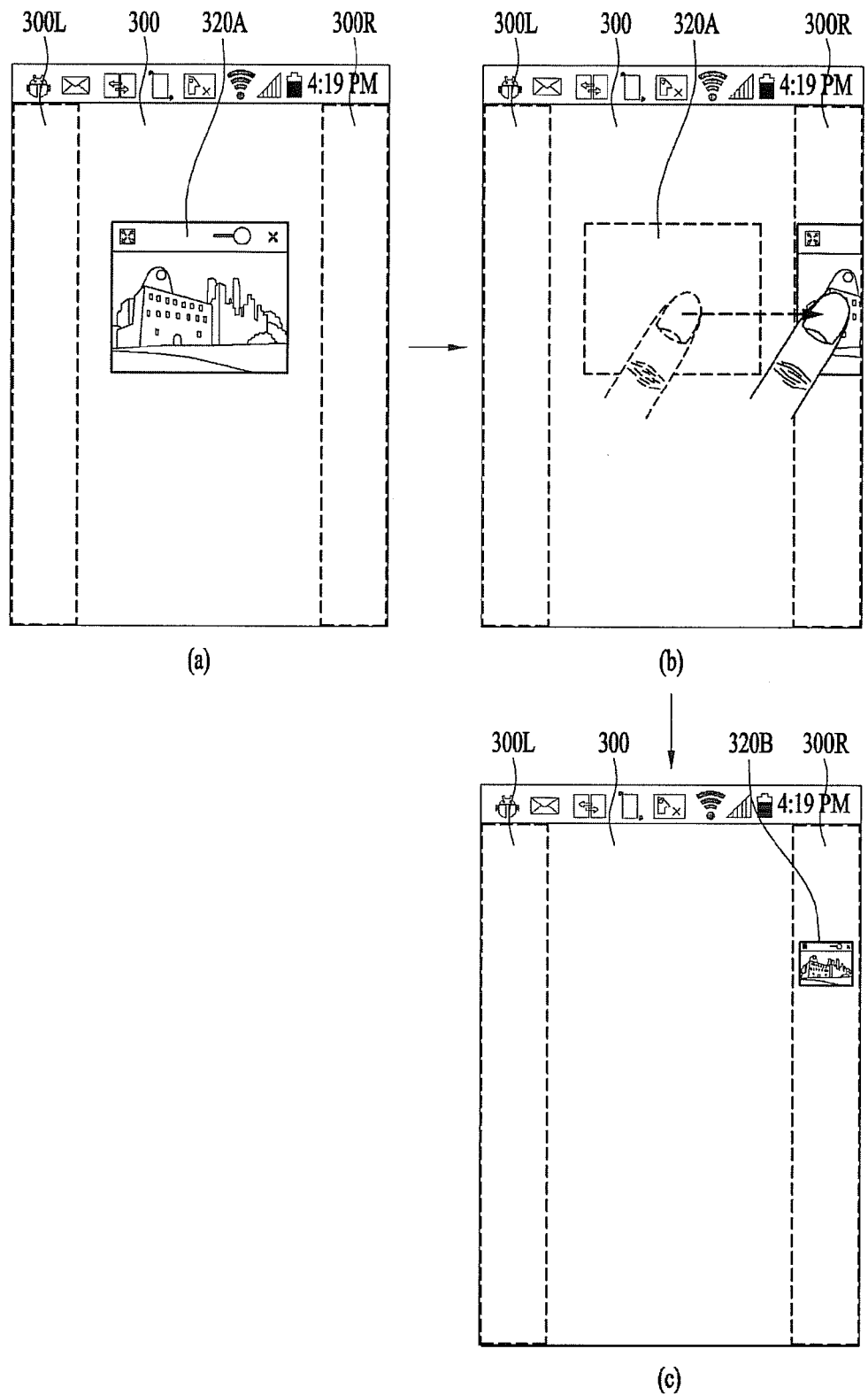
Figure 11:
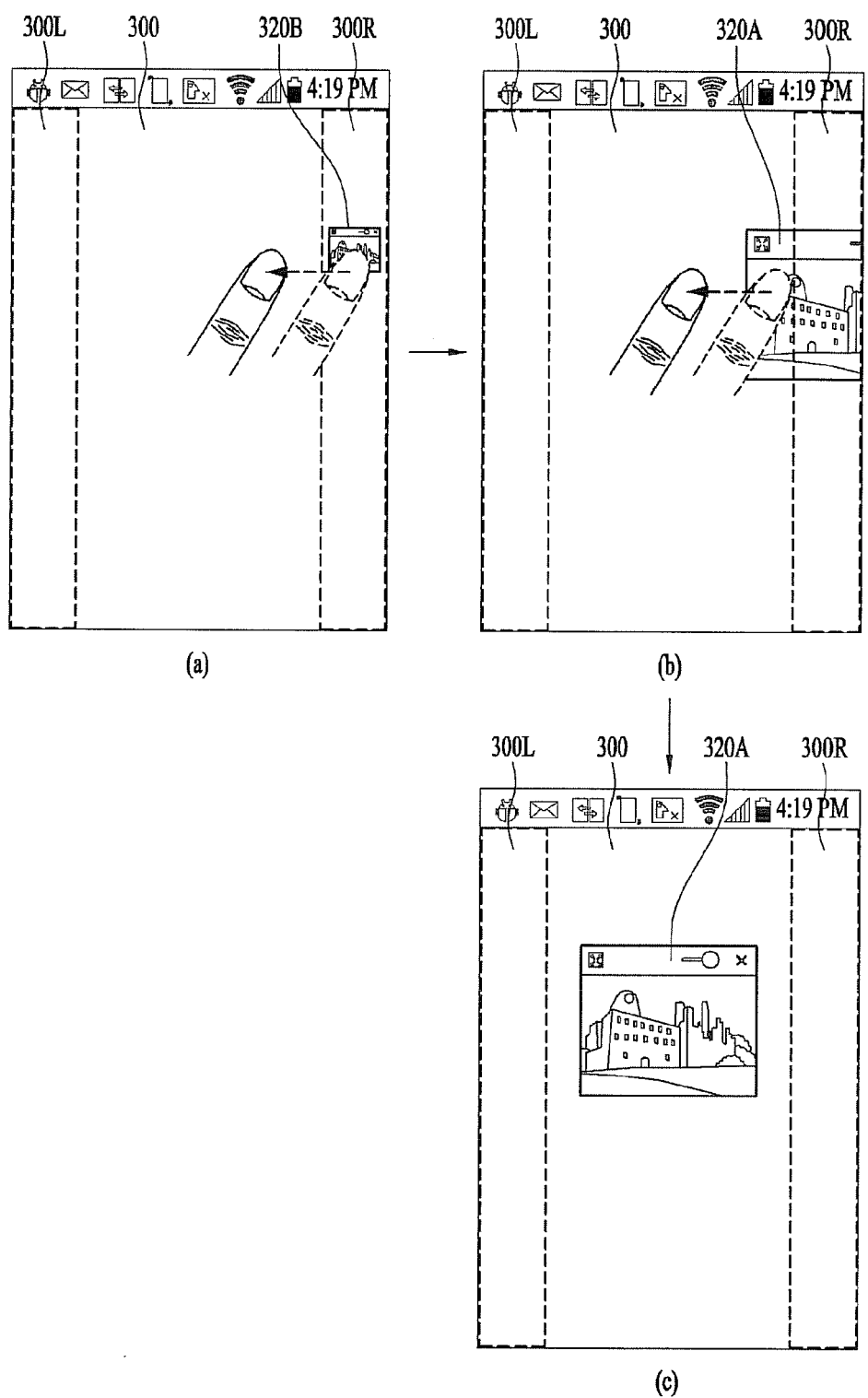

For another instance, FIG. 10 and FIG. 11 show that an application displayed within a floating window 320A is 'Media Player'. And, the specific region includes a left side region 300L and a right side region 300R within a screen 300.

In particular, referring to FIG. 10, after the floating window 320A has been touched [FIG. 10 (*a*)], if the floating window 320A is shifted by being dragged to the right side region 300R [FIG. 10 (*b*)], the controller 180 reduces and transforms the floating window 320A into an icon 320B indicating 'Media Player' and then controls the icon 320B to be displayed in a manner of being attached to a right side of the right side region 300R [FIG. 10 (*c*)].

Subsequently, referring to FIG. 11, when the icon 320B transformed from the floating window 320A is displayed on the right side region 300R, if the icon 320B is touched and dragged out of the right side region 300R [FIG. 11 (*a*), FIG. 11 (*b*)], the controller 180 transforms the icon 320B into the floating window 320A having the size previous to the reduction and transformation and then displays the corresponding floating window 320A [FIG. 11 (*c*)].

Referring to FIG. 12, if a floating window is flicking-touched at a speed equal to or greater than a preset speed in a direction toward the specific region, the controller 180 transforms the floating window into the icon and then displays the icon within the specific region. If the icon is flicking-touched at a speed equal to or greater than a preset speed in a direction toward an outside of the specific region, the controller 180 transforms the icon into the floating window and then displays the corresponding floating window.

For instance, if a floating window 310A having 'Calendar' displayed thereon is flicking-touched at a speed equal or greater than a preset speed in a direction toward a right side region 300R [FIG. 12 (*a*)], the controller 180 reduces and transforms the floating window 310A into an icon 310B indicating 'Calendar' and controls the icon 310B to be displayed in a manner of being attached to a right side of the right side region 300R [FIG. 12 (*b*)].

Subsequently, if the icon 310B is flicking-touched at a speed equal to or greater than a preset speed in a direction toward an outside of the right side region 300R [FIG. 12 (*c*)], the controller 180 transforms the icon 310B into the floating window 310A having the size previous to the reduction and transformation and then displays the corresponding floating window 310A [FIG. 12 (d)].

Referring to FIG. 13, while the icon reduced and transformed from the floating window is displayed within the specific region, if the icon is selected, the controller 180 transforms the icon into the floating window and then displays the corresponding floating window.

For instance, after a floating window 310A having 'Calendar' displayed thereon has been reduced and transformed into an icon indicating 'Calendar', when the icon 310B is displayed in a manner of being attached to a right side of the right side region 300R, if the icon 310B is tapping-touched [FIG. 13 (a)], the controller 180 transforms the icon 310B into the floating window 310A having the size previous to the reduction and transformation and then displays the corresponding floating window 310A [FIG. 13 (b)].

Thus, according to the present disclosure, a reduced and transformed icon is provided with a function of changing its shape into the floating window unlike an existing icon displayed on a screen of a related art.

In particular, FIG. 14 shows that icons of a plurality of general applications and an icon 310B generated from reducing and transforming a floating window 310A by a method according to the present disclosure are displayed within a screen 300.

Referring to FIG. 14 (a), each of the icons of the applications can be shifted to another location within the screen in response to a user's drag touch action. For instance, a location of a camera icon 240 is shifted in response to a user's drag touch action.

Yet, each of the icons of the general applications is not transformed into a corresponding floating window despite being shifted into a specific region (e.g., a left side region 300L, a right side region 300R, etc.) of the present disclosure. And, each of the icons of the general applications located within the specific region is not transformed into a corresponding floating window despite being shifted out of the specific region. Thus, a function of executing the corresponding application is assigned to each of the icons of the general applications.

On the other hand, referring to FIG. 14 (b), a function of transforming the icon 310B, which was generated from reducing and transforming the floating window 310A by the method according to the present disclosure, into the corresponding floating window 310A on shifting the icon 310B out of the specific region is assigned to the icon 310B. Hence, the icon 310B of the present disclosure differs from the icons of the general applications in usages and operations.

Meanwhile, referring to FIG. 15, a size of the specific region is set as a default in the mobile terminal 100 or can be changed by user's settings.

Referring to FIG. 15 (a), for instance, a size of a right side region 300R is set as a default '120 dp (display pixel) and can be changed by user's settings.

As a floating window 310A is shifted into the right side region 300R by a user's drag touch action, if a size of a remaining part of the floating window 310A not shifted into the right side region 300R is greater than the size '120 dp', the controller 180 does not reduce and transform the floating window 310A into an icon 310B until the size of the remaining part of the floating window 310A gets smaller than the size '120 dp'.

Referring to FIG. 15 (b), for instance, a size of a left side region 300L is set as a default '120 dp (display pixel) and can be changed by user's settings.

As a floating window 310A is shifted into the left side region 300L by a user's drag touch action, if a size of a remaining part of the floating window 310A not shifted into the left side region 300L is greater than the size '120 dp', the controller 180 does not reduce and transform the floating window 310A into an icon 310B until the size of the remaining part of the floating window 310A gets smaller than the size '120 dp'.

Referring to FIG. 16, after an icon 310B has been shifted to a specific location within a specific region 300R by a user's drag touch action [FIG. 16 (a)], if the touch is released from the icon 310B, the controller 180 controls the icon 310B to be displayed in a manner of being attached to a size next to the specific location [FIG. 16 (b)]. For example, the icon 310B may be automatically aligned to a grid or the like.

In particular, although the icon 310B of the present disclosure is shifted to a prescribed location within the specific region, it is displayed in a manner of being attached to a size next to the prescribed location instead of being displayed at the prescribed location.

Figure 17:
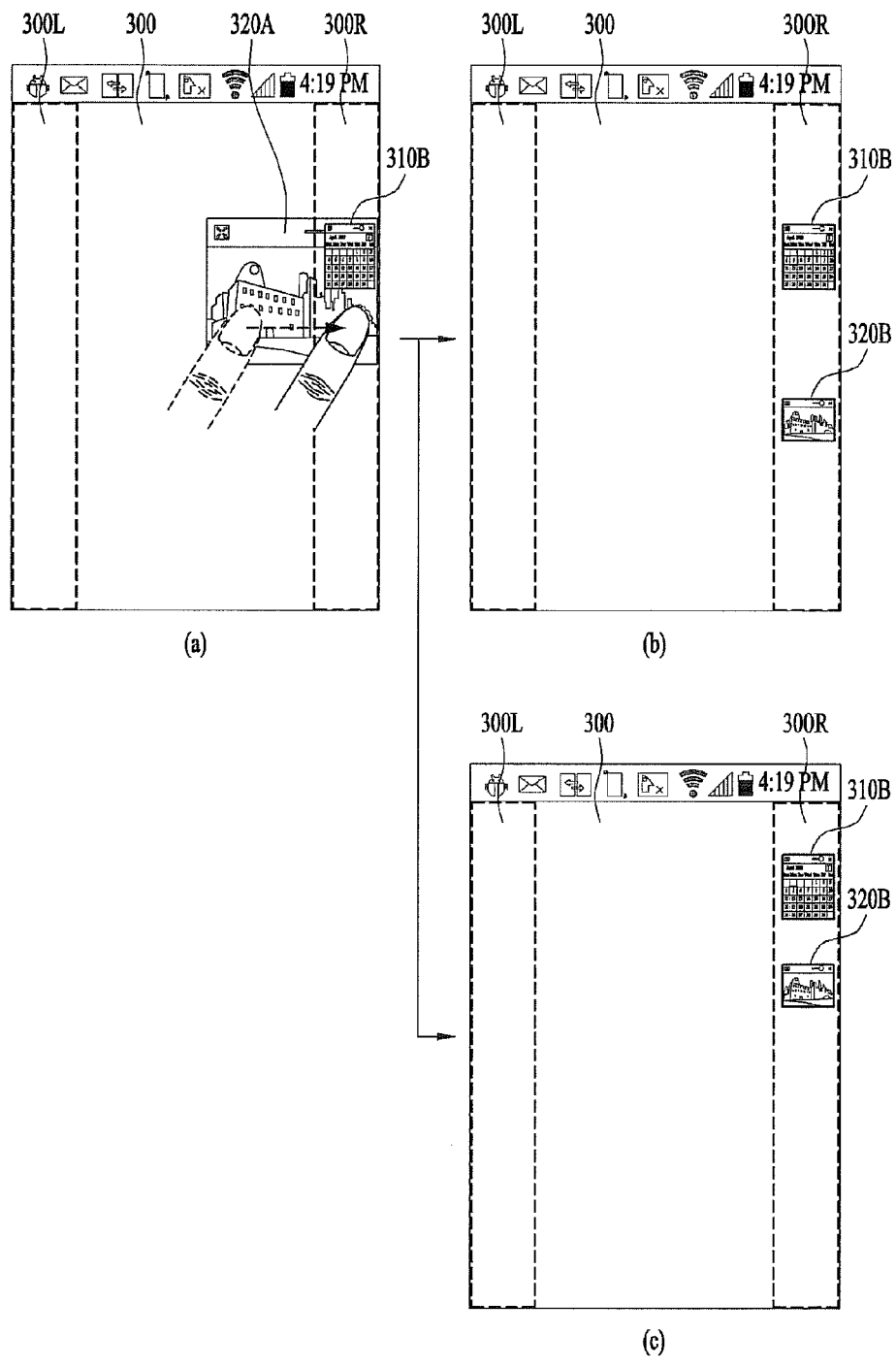

Referring to FIG. 17, when a $1^{st}$ icon 310B generated from reducing and transforming a $1^{st}$ floating window 310A by the method described with reference to FIGS. 4 to 16 is displayed within the specific region, if a $2^{nd}$ floating window 320A on a screen 300 is shifted to a location at which the $1^{st}$ icon 310B is displayed within the specific region, in order to prevent the $1^{st}$ icon 310B and a $2^{nd}$ icon 320B, which will be generated from reducing and transforming the $2^{nd}$ floating window 320A, from being displayed within the specific region by overlaying each other, the controller 180 changes display locations of the $1^{st}$ icon 310B and the $2^{nd}$ icon 320B.

In particular, referring to FIG. 17 (a), when the $1^{st}$ icon 310B is displayed on the right side region 300R, if the $2^{nd}$ floating window 320A displayed on the screen 300 is shifted to a location at which the $1^{st}$ icon 310B is displayed within the right side region 300R, the controller 180 reduces and transforms the $2^{nd}$ floating window 320A into the $2^{nd}$ icon 320B. Referring to FIG. 17 (b) or FIG. 17 (c), the controller 180 changes the display location of the $1^{st}$ icon 3108 or the $2^{nd}$ icon 320B in order to prevent for the $1^{st}$ icon 310B and the $2^{nd}$ icon 320B from being displayed within the right region 300R by overlaying each other.

For instance, in order to prevent for the $1^{st}$ icon 310B and the $2^{nd}$ icon 320B from being displayed within the right region 300R by overlaying each other, FIG. 17 (b) shows that the controller changes the display location of the $2^{nd}$ icon 320B. For another instance, in order to prevent for the $1^{st}$ icon 3108 and the $2^{nd}$ icon 320B from being displayed within the right region 300R by overlaying each other, FIG. 17 (c) shows that the controller 180 changes the display location of the $1^{st}$ icon 310B. It should be appreciated that the feature of automatic grid positioning or automatic alignment to prevent overlap may be turned off to enable manual positioning of the icons.

Figure 18:
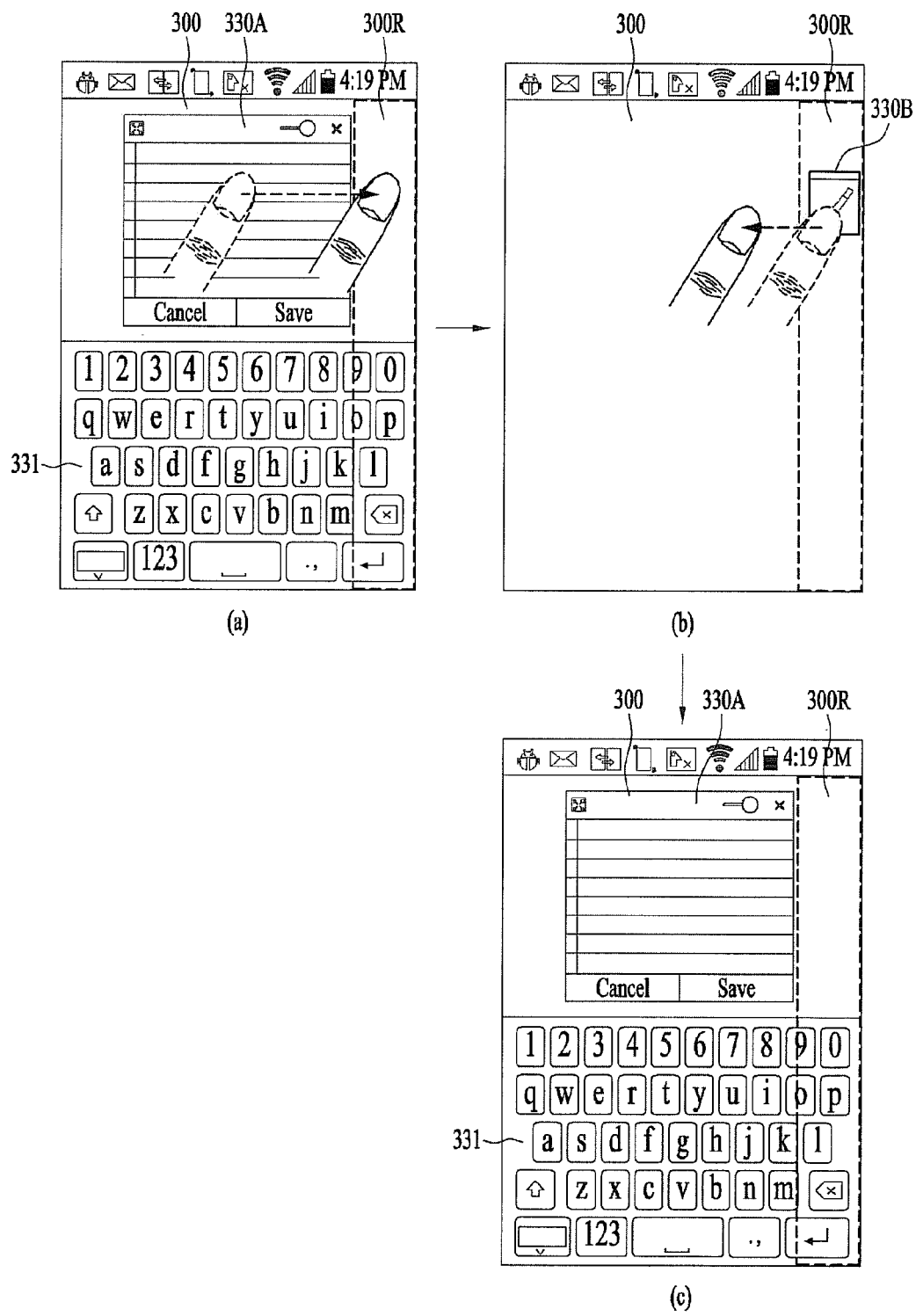

Referring to FIG. 18, when a floating window 330A and a keypad 331 associated with an application displayed through the floating window 330A are displayed on a screen 300, if the floating window 330A is reduced and transformed into an icon 330B, the controller 180 does not display the keypad 331 on the screen 300. If the icon 330B is transformed into the floating window 330A again and then corresponding floating window 330A is displayed, the controller 180 controls the keypad 331 to be displayed on the screen 300 again.

For instance, referring to FIG. 18, the application associated with the keypad 331 is 'Memo'. Of course, the application associated with the keypad 331 may be non-limited by 'Memo'. In particular, the application associated with the keypad 331 can include any application (e.g., Schedule, Webpage, Document, etc.) capable of providing a function of inputting a text through the keypad 331.

If a floating window 330A is shifted to a right side region 300R by being dragged [FIG. 18 (a)], the controller 180 reduces and transforms the floating window 330A into an icon 330B indicating 'Memo', controls the icon 330B to be displayed in a manner of being attached to a right side of the right side region 300R, and stops displaying the keypad 331 [FIG. 18 (b)].

If the icon 330B is shifted out of the right side region 330R by being dragged [FIG. 18 (b)], the controller 180 transforms the icon 330B into the floating window 330A again, displays the corresponding floating window 330A, and displays the keypad 331 again [FIG. 18 (c)].

Referring to FIG. 19, when a floating window 310A is displayed on a screen, a window 340 different from the floating window 310A is displayed on the screen. If the different window 340 overlays the floating window 310A by a size equal to or greater than a preset size, the controller 180 reduces and transforms the floating window 310A into an icon 310B automatically and then displays the icon 310B within the specific region.

In this case, the different window 340 may include a popup window configured to indicate or notify at least one of a specific information, a specific state of the mobile terminal 100, a warning, an event (e.g., a message reception, a schedule output, an alarm output, a call reception, etc.) occurring in the mobile terminal 100 and the like.

For instance, FIG. 19 (a) shows that a schedule notification window 340 is displayed at a location, at which the floating window 310A is displayed, in a manner of overlaying the floating window 310A in part.

In doing so, if the schedule notification window 340 overlays the floating window 310A by a size equal to or greater than a preset size, referring to FIG. 19 (b), the controller 180 reduces and transforms the floating window 310A into the icon 310B automatically and displays the icon 310B within the specific region.

Thereafter, as a display duration time of the schedule notification window 340 expires, if the schedule notification window 340 disappears from the screen 300, the controller 180 transforms the icon 310B into the floating window 310A again and then displays the corresponding floating window 310A.

Figure 20:
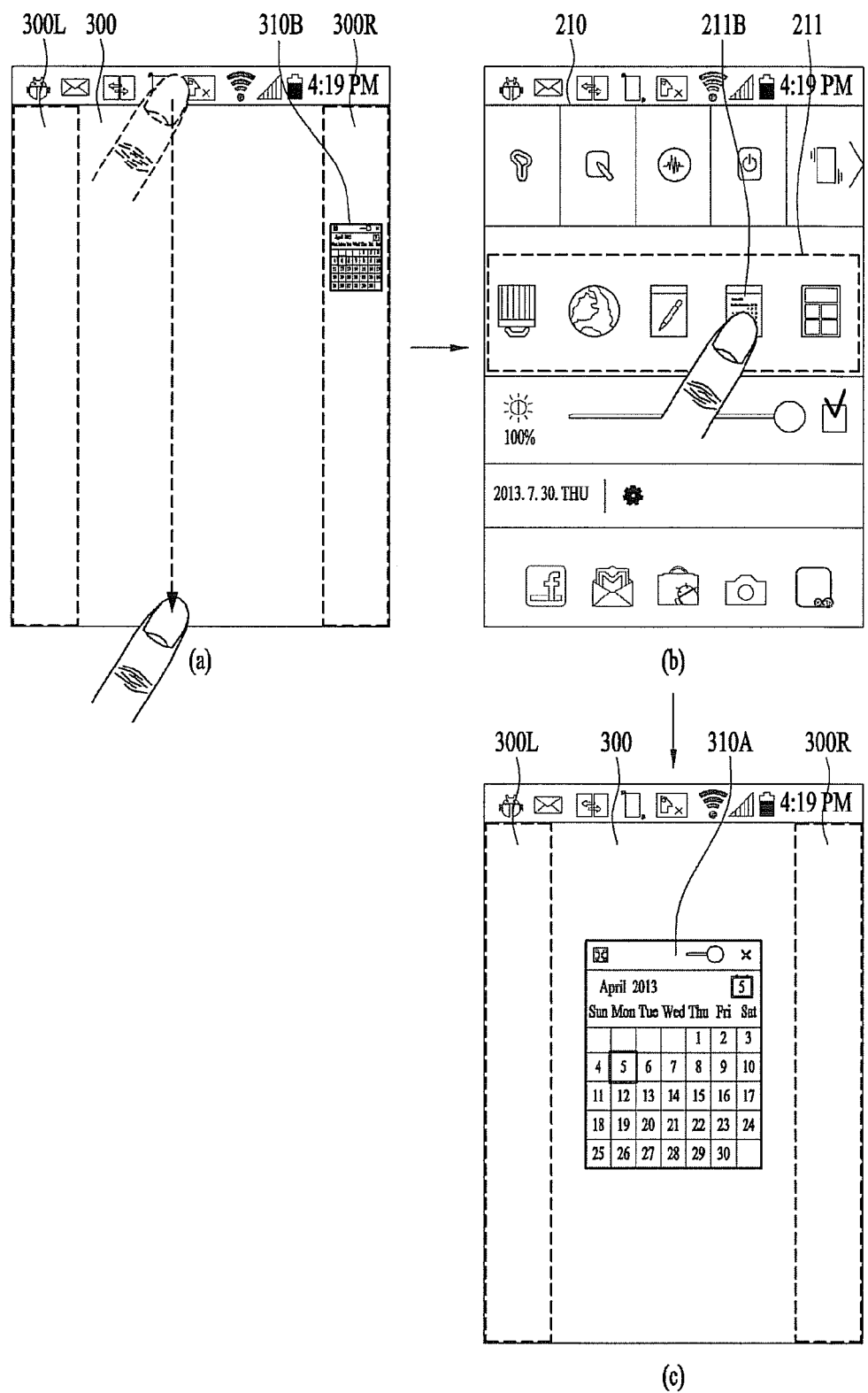

Referring to FIG. 20, after the controller 180 has reduced and transformed a floating window 310A into an icon 310B, when the controller 180 displays the icon 310B on the specific region, if an icon 211B corresponding to the floating window 310A is selected from icons of at least two applications executable in floating mode displayed within the notification window 210 shown in FIG. 5 (a), the controller 180 automatically transforms the icon 310B into the floating window 310A and then displays the corresponding floating window 310A.

As the icon 310B generated from reducing and transforming the floating window 310A is displayed on a right side region 300R, if a notification bar of a screen 300 (cf. FIG. 5 (a)) is dragged in a bottom direction of the screen 300 by a user's drag touch [FIG. 20 (a)], the controller 180 displays the notification window 210 including the icons of the at least two applications executable in the floating mode [FIG. 20 (b)].

If the icon 211B corresponding to the floating window 310A is selected from the icons of the at least two applications executable in the floating mode within the notification window 210, referring to FIG. 20 (c), the controller 180 automatically transforms the icon 310B into the floating window 310A and then displays the corresponding floating window 310A.

Figure 21:
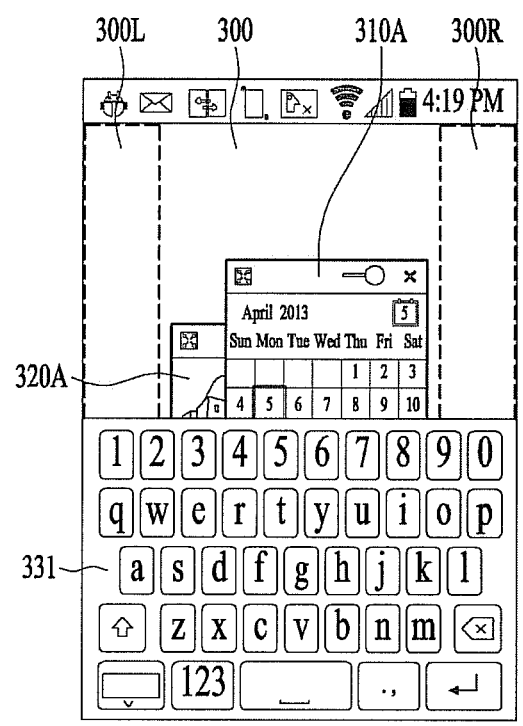

Referring to FIG. 21, a $1^{st}$ floating window 310A having a history of being reduced and transformed into an icon 310B is displayed on a screen 300 by having a layer over that of a $2^{nd}$ floating window 320A having no history of being reduced and transformed into an icon. And, a keypad 331 is displayed on the screen 300 by having a layer higher than that of the $1^{st}$ floating window 310A.

Figure 22:
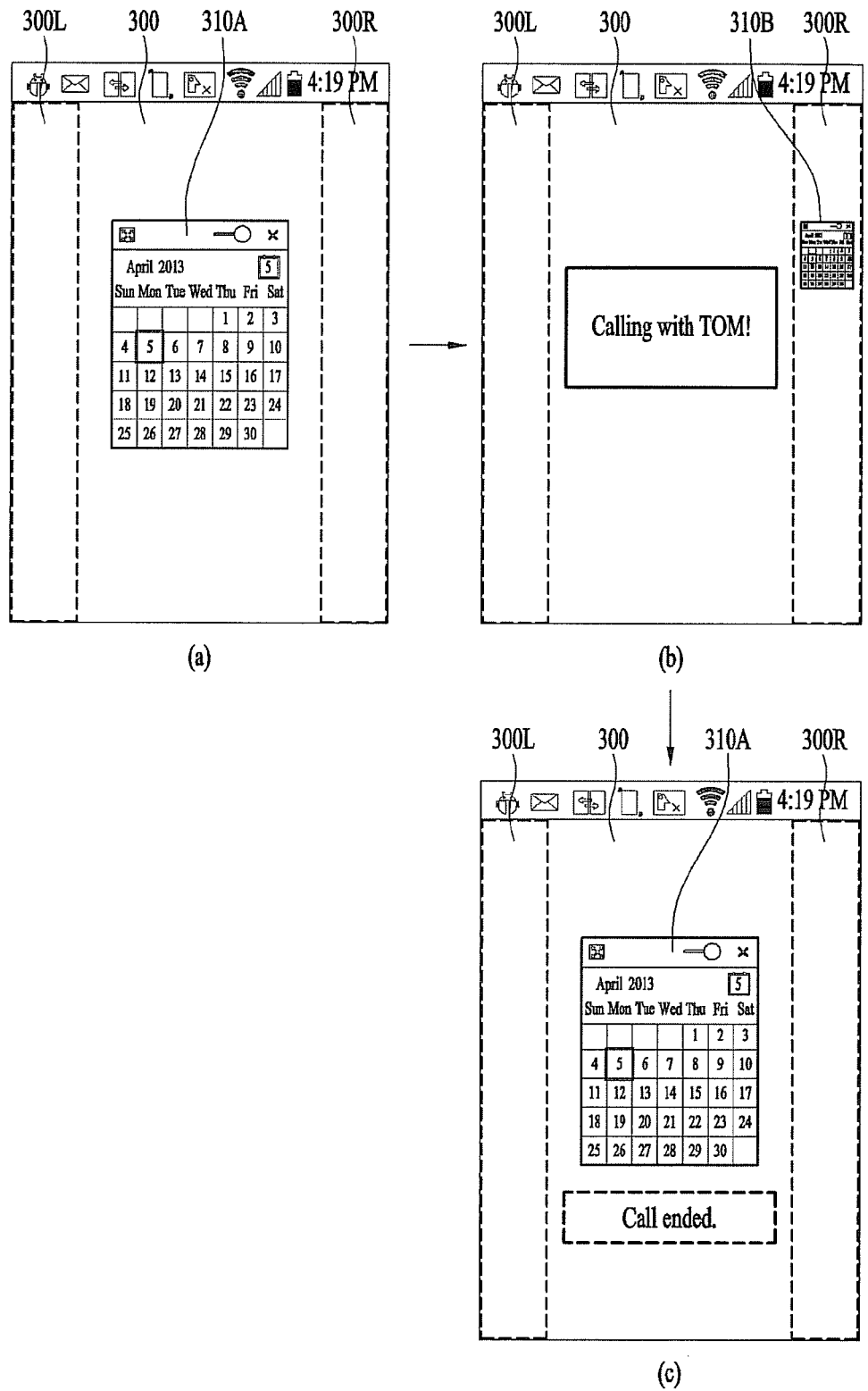

Finally, referring to FIG. 22, when a floating window 310A is displayed on a screen, if a call is received from or connected to a specific counterpart terminal, the controller 180 automatically reduces and transforms into an icon 310B and then displays the icon 310B within the specific region.

For instance, when the floating window 310A is displayed on a screen 300 [FIG. 22 (a)], if a call for a call connection is received from the specific counterpart terminal through the wireless communication unit 110, a call is sent to the specific counterpart terminal in response to a user's request, or a call is connected to the specific counterpart terminal, the controller 180 reduces and transforms the floating window 310A into the icon 310B automatically and then displays the corresponding icon 310B within the right side region 300R [FIG. 22 (b)].

Thereafter, referring to FIG. 22 (c), if the call with the specific counterpart terminal is ended, the controller 180 transforms the icon 310B into the floating window 310A and then displays the corresponding floating window 310A.

So far, the $1^{st}$ embodiment of the present disclosure is described in detail with reference to FIGS. 4 to 22.

According to the $1^{st}$ embodiment of the present disclosure, after an executed window of an application has been displayed on a screen, if the executed window is shifted into a specific region within the screen, the executed window is displayed in a manner of being reduced and transformed into an icon. Therefore, the $1^{st}$ embodiment of the present disclosure enables a user to use a function of the application within the current screen together with other functions without the need for screen switching.

In the following description, a process according to a $2^{nd}$ embodiment of the present disclosure is explained in detail with reference to FIGS. 23 to 54. According to the $2^{nd}$ embodiment of the present disclosure, if a memo substance is inputted to a screen having a specific information displayed thereon, an image of the specific information containing the memo substance is displayed as a new memo window on the screen. Even if information displayed on the screen is changed, the memo window may continue to be displayed on the screen. Herein, the memo substance may be referred to as a memo or memo text, and the specific information may be referred to as a displayed object.

<$2^{nd}$ Embodiment>

In the following description of a $2^{nd}$ embodiment of the present disclosure, when a specific information is displayed on a screen of the touchscreen 151, an operating mode for inputting a memo onto the specific information may be named 'memo mode'. A mode of the present disclosure for displaying a memo substance inputted in the memo mode as a new memo window on the screen may be named 'floating memo mode'. And, the new memo window for displaying the memo substance thereon may be named 'floating window'.

Figure 23:
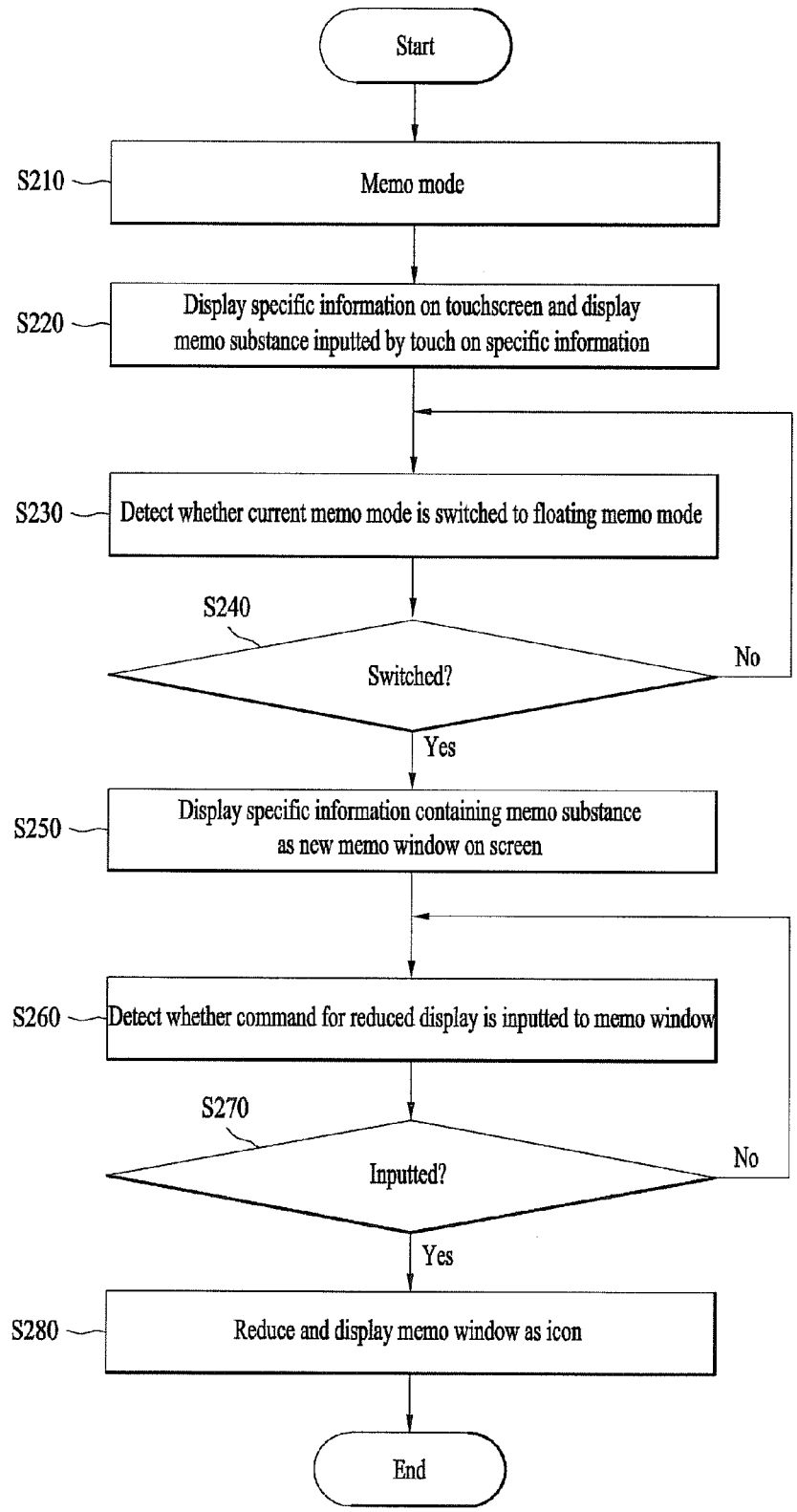
FIG. 23 is a flowchart for a method of controlling a mobile terminal according to a $2^{nd}$ embodiment of the present disclosure.

FIG. 23 is a flowchart for a method of controlling a mobile terminal according to a $2^{nd}$ embodiment of the present disclosure.

FIGS. 24 to 54 are diagrams that illustrate a method of controlling a mobile terminal according to a $2^{nd}$ embodiment of the present disclosure.

Referring to FIGS. 23 to 54, the controller 180 of the mobile terminal 100 controls a specific information selected by a user to be displayed on a screen of the touchscreen 151 in memo mode [S210]. And, the controller 180 controls a memo substance, which is inputted by a user's touch, to be displayed in a manner of overlaying the specific information [S220].

In this case, the memo mode is the mode for inputting such a user-desired content as a text, a drawing pattern and the like onto an image displayed on a screen. In particular, a user is able to input a desired memo substance onto the image displayed on the screen using a user's finger, a touch pen or the like.

And, the specific information may include such a screen image displayable in a mobile terminal as an executed screen image of a specific content, an executed screen image of a specific application, an image viewer screen image, a broadcast play screen image, a video play screen image, an internet web browser screen image, a calendar screen image, a calculator screen image, a call screen image and the like.

The controller 180 detects whether a current memo mode is switched to a floating memo mode of the present disclosure [S230]. If the current memo mode is switched to the floating memo mode [S240], the controller 180 displays a floating window, which displays an image of the specific information containing the memo substance, on the screen [S250].

In doing so, the floating window has a size smaller than that of the specific information displayed region on the screen. A size of the floating window is changeable on the screen. The floating window can be shifted within the screen. And, the floating window keeps being displayed even if information displayed on the screen is changed.

Therefore, after an image of a specific information containing a memo substance inputted in memo mode has been displayed on a floating window, a user freely uses a specific function on a screen and is also able to consistently check the memo content through the floating window.

Figure 24:
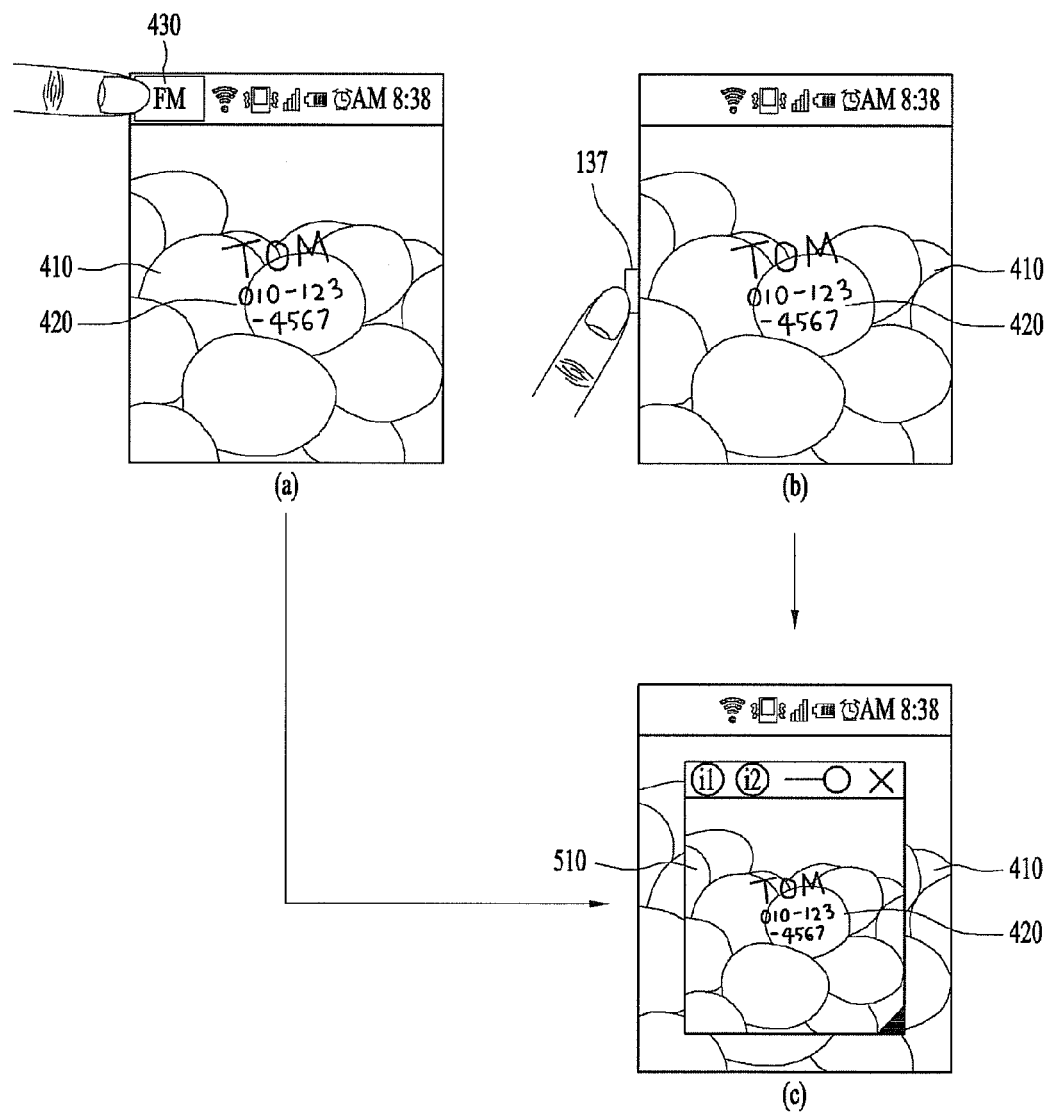

FIG. 24 shows the steps S230 to S250 shown in FIG. 23.

Referring to FIG. 24 (a), a specific information 410 containing a memo substance 420 inputted by a user is displayed on a screen of the touchscreen. And, a switch touch button 430 for switching the memo mode to the floating memo mode is displayed on the screen as well.

If the switch touch button 430 is touched by the user [FIG. 24 (a)], the controller 180 displays a floating window 510 including an image of the specific information 410 containing the memo substance 420 on the screen [FIG. 24 (c)].

In this case, the switch touch button 430 includes a touch button for toggling a switching between the memo mode and the floating memo mode. When the floating window 510 is displayed on the screen, if the switch touch button 430 is touched again, the floating window 510 stops being displayed and a current floating memo mode can be switched to a previous memo mode again.

If a key 137 for switching the memo mode to the floating memo mode among hardware keys provided to the user input unit 130 is inputted [FIG. 24 (b)], the controller 180 displays a floating window 510 including an image of the specific information 410 containing the memo substance 420 on the screen [FIG. 24 (c)].

In this case, the key 137 includes a key for toggling a switching between the memo mode and the floating memo mode. When the floating window 510 is displayed on the screen, if the key 137 is touched again, the floating window 510 stops being displayed and a current floating memo mode can be switched to a previous memo mode again.

Figure 25:
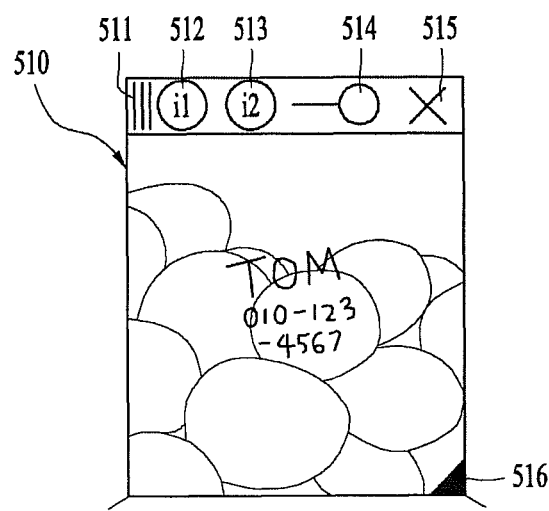

FIG. 25 shows a configuration of a floating window according to the present disclosure.

Referring to FIG. 25, the floating window 510 may include UIs 511 to 516 configured to provide various functions associated with a memo function.

The $1^{st}$ UI 511 is provided to shift the floating window 510 onto a screen in a manner that a user touches and drags a region, on which the $1^{st}$ UI 511 is displayed, in a specific direction.

The $2^{nd}$ UI 512 is provided to toggle a switching between a memo mode and a floating memo mode. Each time the $2^{nd}$ UI 512 is touched, the controller 180 toggles the switching between the memo mode and the floating memo mode.

The $3^{rd}$ UI 513 is provided to toggles a switching between a memo input mode and a memo erase mode on the floating window 510. If the $3^{rd}$ UI 513 is selected, the controller 180 executes the memo input mode on the floating window 510 and then displays a memo substance inputted by a user on the floating window 510. If the $3^{rd}$ UI 513 is selected again, the controller 180 switches the memo input mode to the memo erase mode. If at least one portion of the memo substance 420 displayed on the floating window 510 is selected, the controller 180 erases the selected portion from the floating window 510.

For instance, referring to FIG. 26 (a), if a current mode for the floating window 510 is the memo input mode, the controller 180 displays a $1^{st}$ icon 513A for switching the memo input mode to the memo erase mode on the floating window 510.

Referring to FIG. 26 (b), if the $1^{st}$ icon 513A is selected, the controller 180 switches the current memo input mode to the memo erase mode. If at least one portion of the memo substance 420 displayed on the floating window 510 is selected or designated, the controller 180 erases the selected or designated portion from the floating window 510. And, the controller 180 displays a $2^{nd}$ icon 513B for switching the memo erase mode to the memo input mode on the floating window 510.

Referring now to FIG. 25, the $4^{th}$ UI 514 is provided to adjust a transparency of the floating window 510. If the transparency is adjusted through the $4^{th}$ UI 514, the controller 180 controls the adjusted transparency to be reflected by the floating window 510.

The $5^{th}$ UI 515 is provided to close the floating window 510 on the screen. If the $5^{th}$ UI 515 is selected, the controller 180 closes the floating window 510 on the screen.

The $6^{th}$ UI 516 is provided to adjust a size of the floating window 510. If the $6^{th}$ UI 516 is touched and dragged in a specific direction, the controller 180 increases or decreases a size of the floating window 510 to correspond to the touch & drag.

Meanwhile, the controller 180 can display a whole image of a specific information containing a memo substance currently displayed on a screen in the steps S230 to S250 shown in FIG. 23. And, the controller 180 can display a memo substance included in a region set on a screen by a user on the floating window 510, as shown in FIG. 27.

Figure 27:
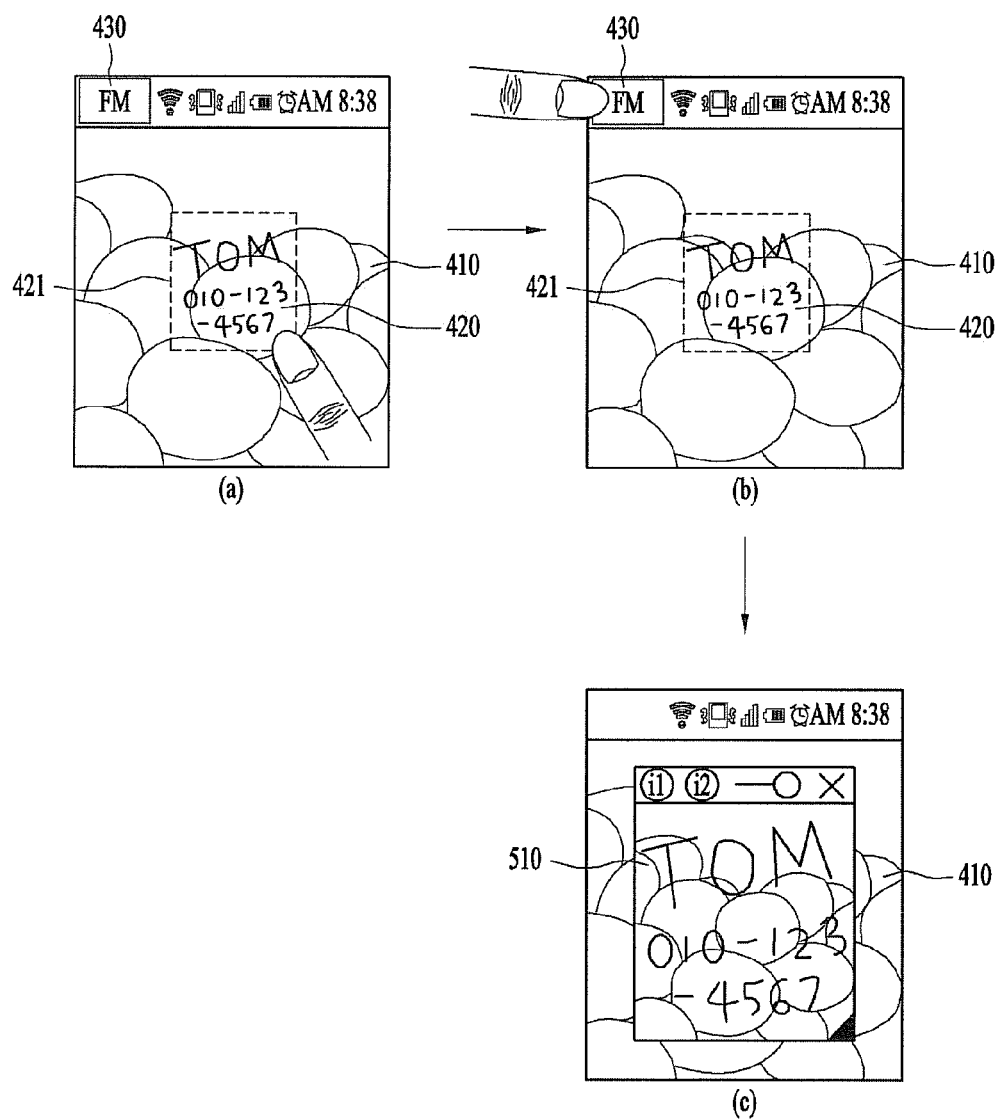

In particular, referring to FIG. 27, while an image of a specific information 410 displayed on a screen and a memo substance 420 is inputted onto the image of the specific information 410 by a user's touch, a specific region 421 including at least one portion of the memo substance 420 is designated [FIG. 27 (a)]. If the switch touch button 430 described with reference to FIG. 24 is inputted as a command for displaying the designated specific region as a floating window 510 is inputted [FIG. 27 (b)], an image displayed on the designated specific region 421 is cropped and the floating window 510 including the cropped image is displayed on the screen [FIG. 27 (c)].

Preferably, according to the present disclosure, a slice tool UI (user interface) 232 for enabling a user to freely designate a desired region on an image displayed on a screen is provided [FIGS. 28 to 35].

In particular, the user can designate a desired region on the image of the specific information 410 as the specific region 421 using the slice tool UI. Alternatively, the user can designate a region including at least one portion of the memo substance 420 on the image of the specific information 410 as the specific region 421 using the slice tool UI.

Figure 28:
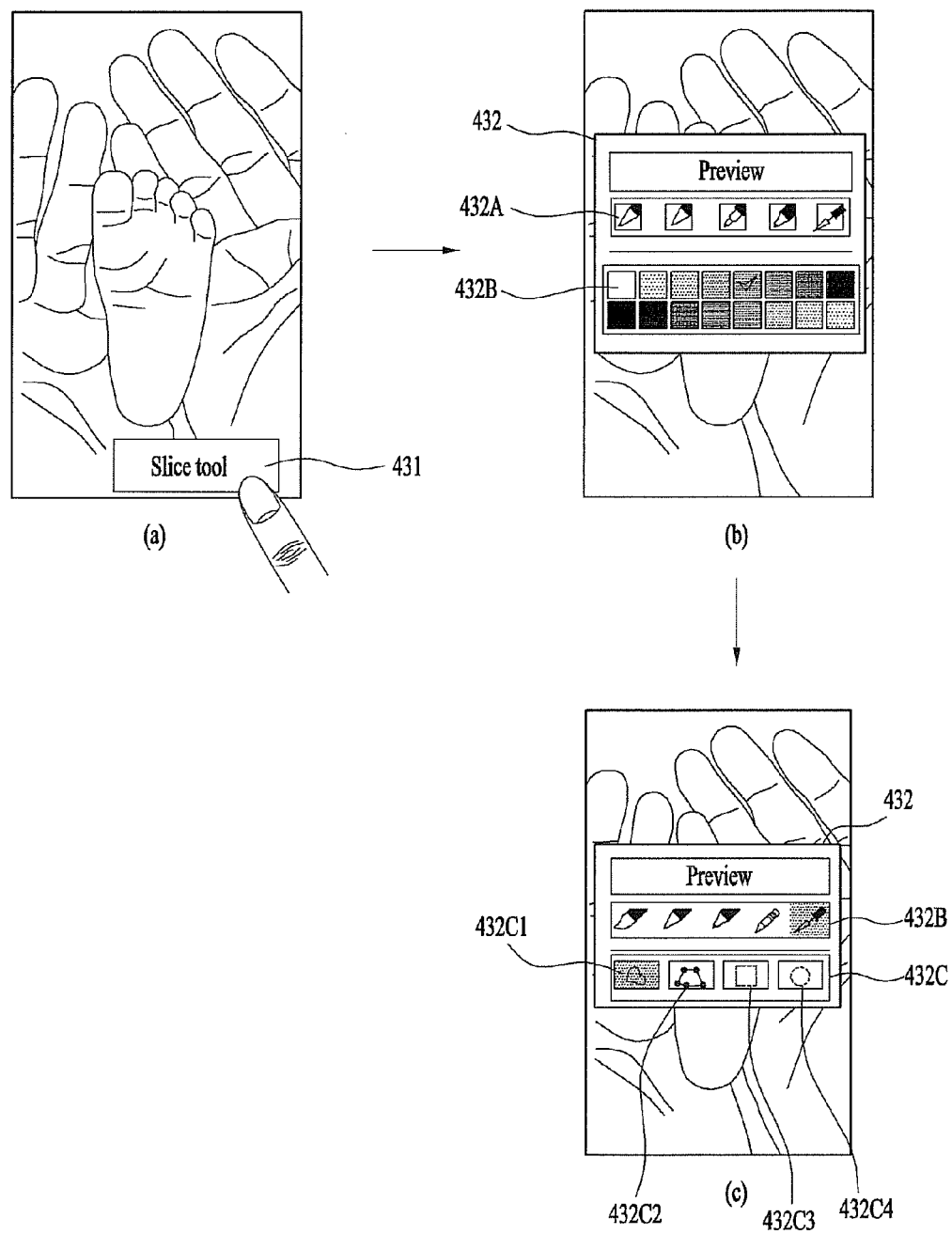

Referring to FIG. 28, while a specific image is displayed on the screen, if an icon 431 for executing the slice tool UI 432 is selected [FIG. 28 (a)], the controller 180 controls the slice tool UI 432 to be displayed on the screen [FIG. 28 (b)].

In this case, the slice tool UI 432 may include a pen setting window 432A for designating a specific region within the displayed image and a color setting window 432B for setting a color of a boundary line of a region designated by a pen (or finger) set up through the pen setting window 432A.

Referring to FIG. 28 (c), if a specific pen 432B is set in the pen setting window 432, the slice tool UI 432 may include a designation type setting window 432C for setting one of designation types including at least two different designation types 432C1, 432C2, 432C3 and 432C4.

In this case, the $1^{st}$ designation type 432C1 included in the designation type setting window 432C of the slice tool UI 432 includes a lasso tool designation type for a user to freely draw a desired region using one of a finger, a pen and the like.

The $2^{nd}$ designation type 432C2 includes a polygonal lasso tool designation type for designating a desired region by continuing to connect a start point and an end point to each other. The $3^{rd}$ designation type 432C3 includes a rectangular marquee tool designation type for designating a desired region in a rectangular shape. And, the $4^{th}$ designation type 432C4 includes an elliptical marquee tool designation type for designating a desired region in an elliptical shape.

Figure 29:
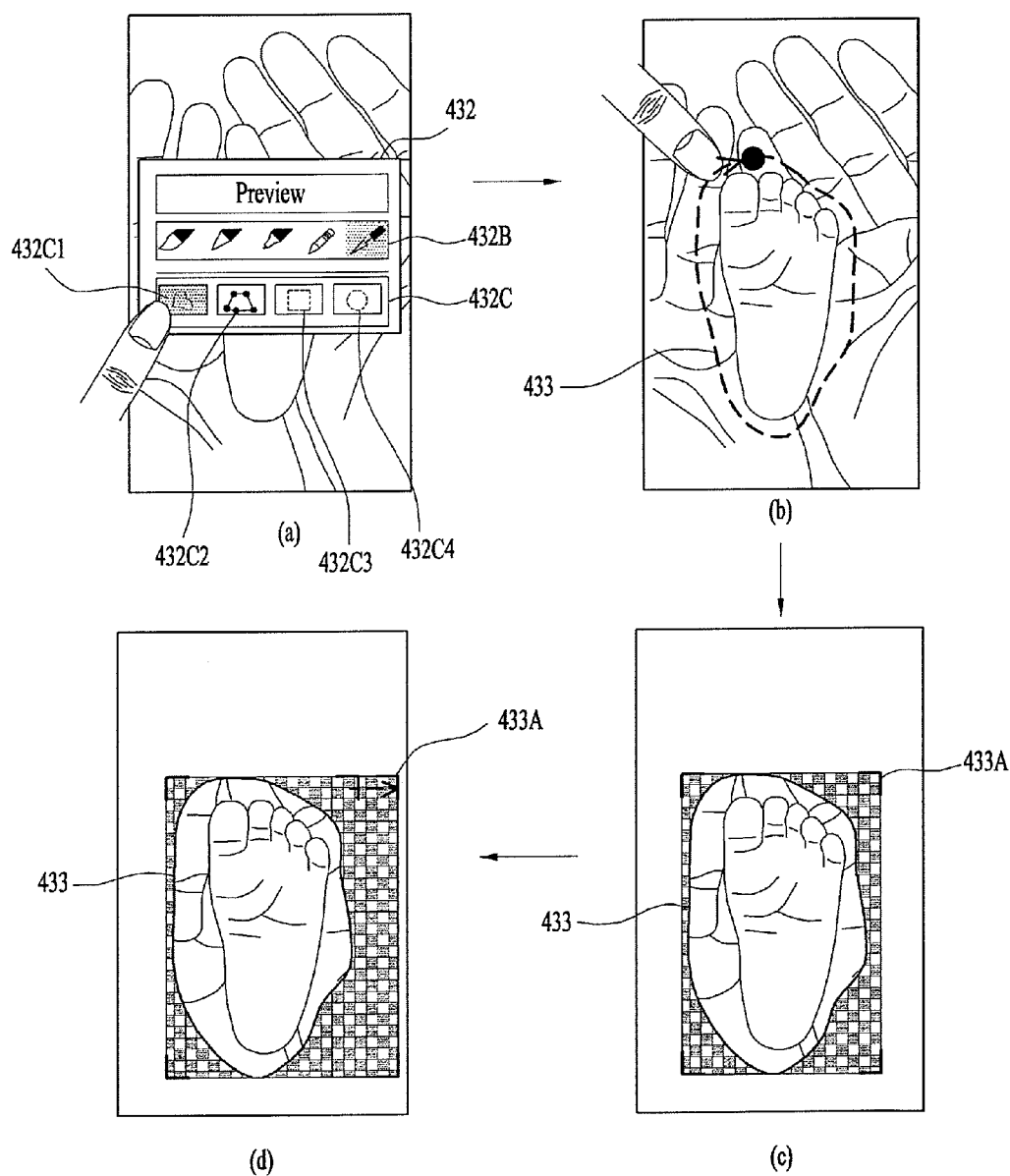

For instance, referring to FIG. 29, if the $1^{st}$ designation type 432C1 is selected from the designation type setting window 432C [FIG. 29 (a)], the controller 180 provides the lasso tool designation type for freely drawing a desired region within the image [FIG. 29 (b)].

In particular, referring to FIG. 29 (b), as a user draws a boundary of a desired region 433 on the image, the drawn region 433 is designated.

Once the region 433 is designated in the image, referring to FIG. 29 (c), the controller 180 crops the designated region 433 in the image and then displays a corner line 433A indicating a boundary part of the cropped region 433.

Subsequently, referring to FIG. 29 (d), if the corner line 433A of the cropped region 433 is extended by a user's drag touch action, the controller 180 can enlarge a display size of the cropped region 433 by an extended portion of the corner line 433A.

Figure 30:
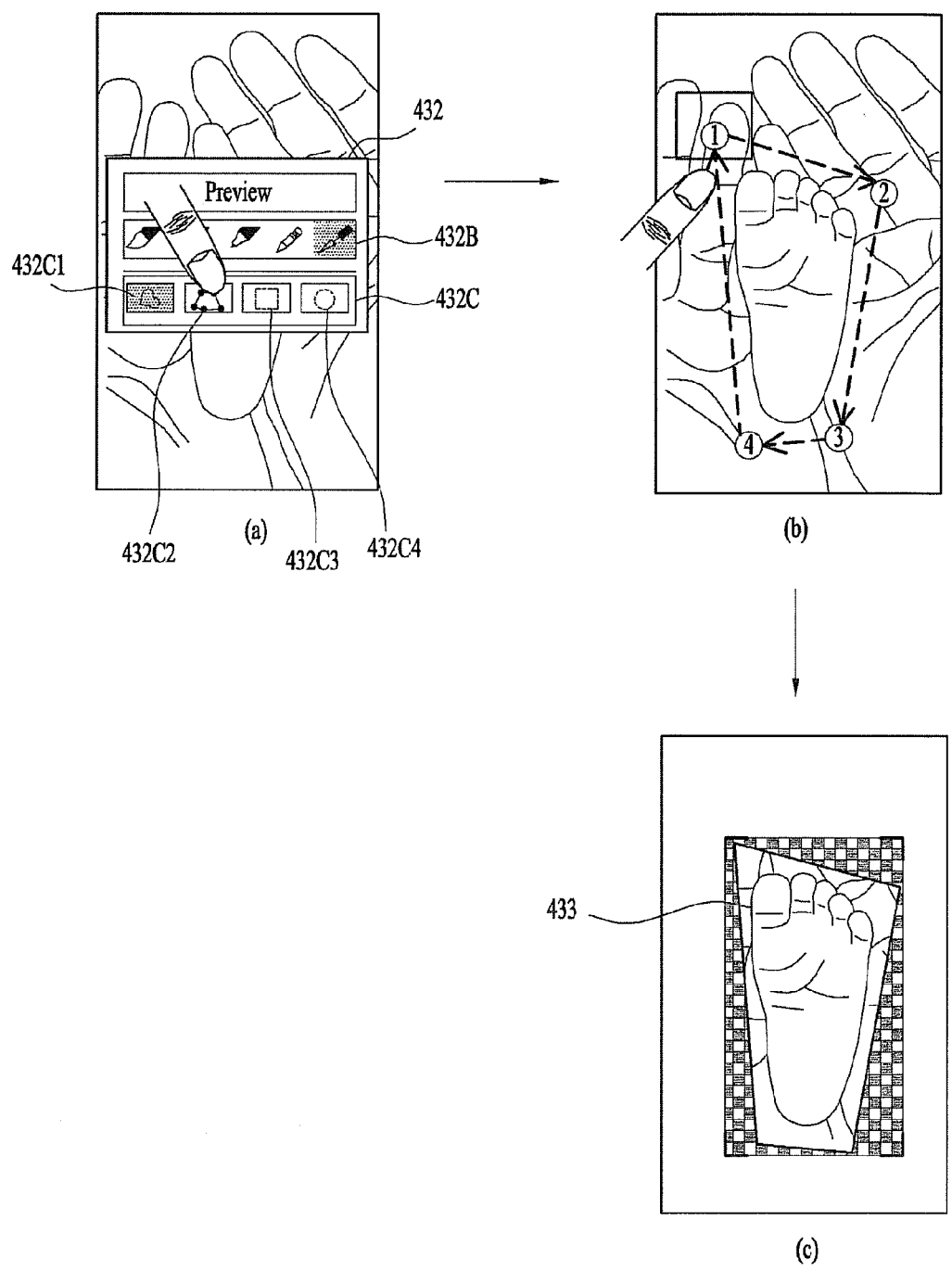

Referring to FIG. 30, if the $2^{nd}$ designation type 432C2 is selected from the designation type setting window 432C [FIG. 30 (a)], the controller 180 provides the polygonal lasso tool designation type for designating a desired region 433 by continuing to connect a start point and an end point to each other in the image [FIG. 30 (b)].

In particular, referring to FIG. 30 (b), as a user sequentially touches $1^{st}$ to $4^{th}$ points in the image, the desired region 433 is designated in a manner of sequentially connecting the touched $1^{st}$ to $4^{th}$ points to one another. Once the region 433 is designated in the image, referring to FIG. 30 (c), the controller 180 crops the designated region 433 in the image.

Figure 31:
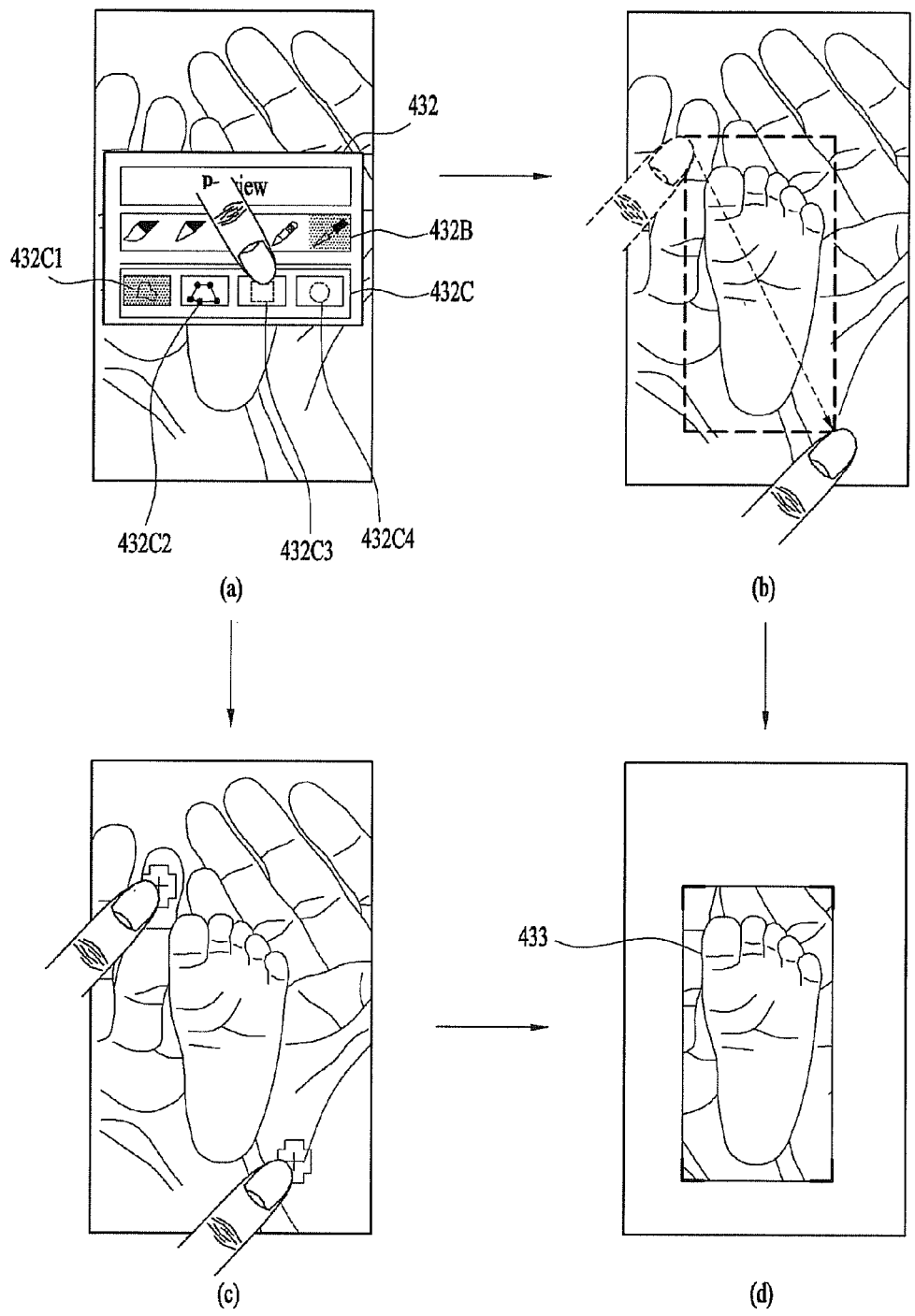

Referring to FIG. 31, if the $3^{rd}$ designation type 432C3 is selected from the designation type setting window 432C [FIG. 31 (a)], the controller 180 provides the rectangular marquee tool designation type for designating a desired region 433 in a rectangular shape within the image [FIG. 31 (b)].

In particular, referring to FIG. 31 (b), as a user touches a specific $1^{st}$ point in the image and then drags it to a $2^{nd}$ point in a diagonal direction, a region 433 in a rectangular shape having a diagonal line generated by the drag from the $1^{st}$ point to the $2^{nd}$ point. Once the region 433 is designated in the image, referring to FIG. 31 (d), the controller 180 crops the designated region 433 in the image.

In particular, referring to FIG. 31 (c), as a user multi-touches a specific $1^{st}$ point and a $2^{nd}$ point in the image, a region 433 in a rectangular shape having a diagonal line generated by the multi-touched $1^{st}$ and $2^{nd}$ points. Once the region 433 is designated in the image, referring to FIG. 31 (d), the controller 180 crops the designated region 433 in the image.

Figure 32:
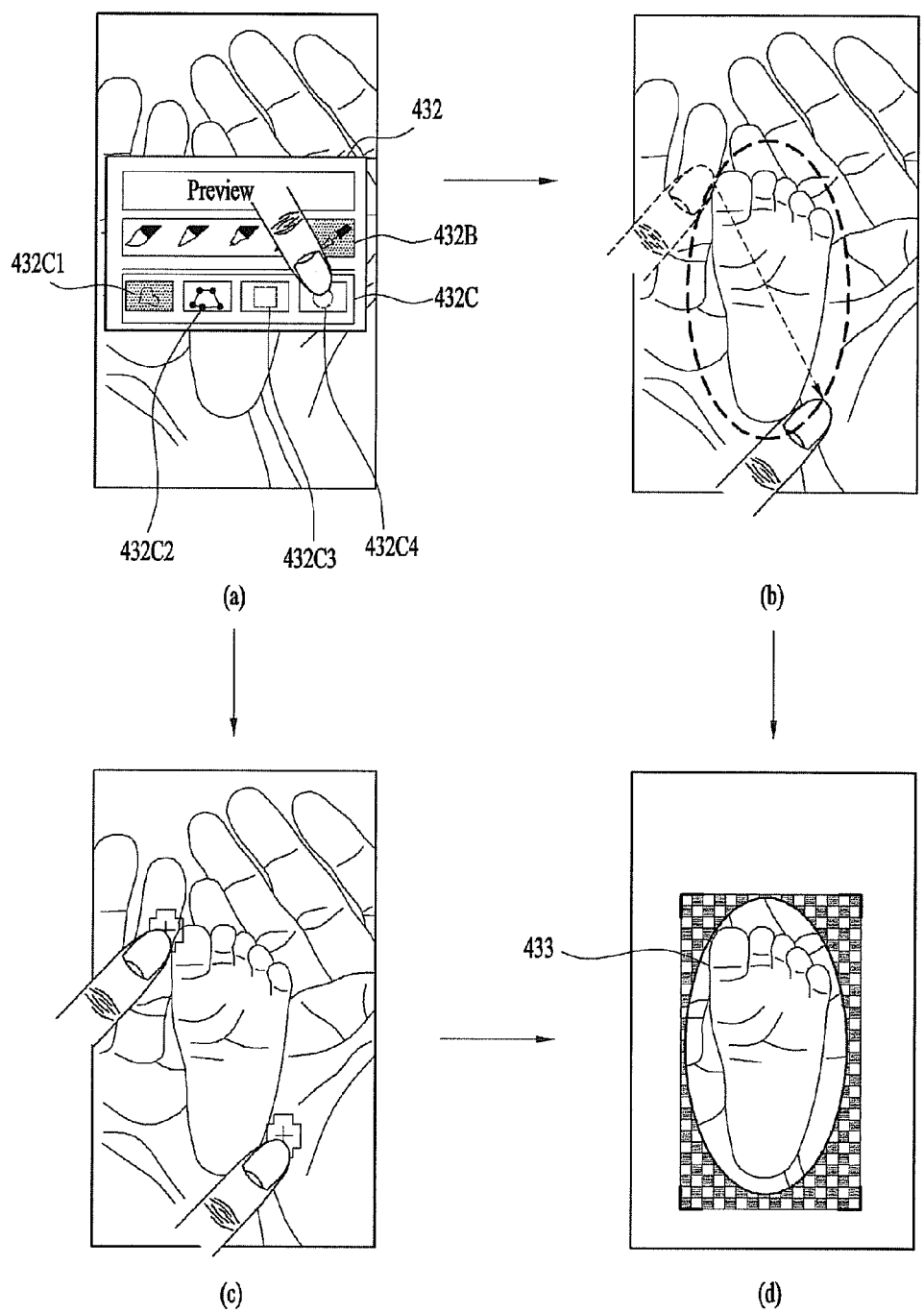

Referring to FIG. 32, if the $4^{th}$ designation type 432C4 is selected from the designation type setting window 432C [FIG. 32 (a)], the controller 180 provides the elliptical marquee tool designation type for designating a desired region 433 in an elliptical shape within the image [FIG. 32 (b)].

In particular, referring to FIG. 32 (b), as a user touches a specific $1^{st}$ point in the image and then drags it to a $2^{nd}$ point in a diagonal direction, a region 433 in an elliptical shape having a diameter set to a diagonal line generated by the drag from the $1^{st}$ point to the $2^{nd}$ point. Once the region 433 is designated in the image, referring to FIG. 32 (d), the controller 180 crops the designated region 433 in the image.

In particular, referring to FIG. 32 (c), as a user multi-touches a specific $1^{st}$ point and a $2^{nd}$ point in the image, a region 433 in an elliptical shape having a diameter set to a diagonal line generated by the multi-touched $1^{st}$ and $2^{nd}$ points. Once the region 433 is designated in the image, referring to FIG. 32 (d), the controller 180 crops the designated region 433 in the image.

Referring to FIG. 33, a user designates a desired region 433 in the image by one of the processes described with reference to FIGS. 28 to 32 [FIG. 33 (a)], crops the designated region 433, and then inputs a desired memo substance 434 [FIG. 33 (b)]. Alternatively, the user inputs a desired memo substance 434 to the designated region 433 and is then able to crop the region 433 containing the memo substance 434.

In particular, if the region 433 is designated in the image, the controller 180 crops the region 433. If the memo substance 434 is inputted to the cropped region 433, the controller 180 displays the inputted memo substance 434 on the cropped region 433 and is then able to save an image of the region 233 containing the memo substance 434.

After the region 433 has been designated in the image, if a memo substance 434 is inputted to the designated region 433, the controller 180 displays the inputted memo substance 434 on the designated region 433, crops the region 433 containing the memo substance 434, and is then able to save the cropped region 433.

Referring to FIG. 34, while a user designates a desired region 433 in the image by one of the processes described with reference to FIGS. 28 to 32 [FIG. 34 (a)], if the designated region 433 is dragged to a different location in the image, the controller 180 shifts a location of the designated region 433 to the dragged different location [FIG. 34 (b)].

Moreover, while a user designates a desired region 433 in the image by one of the processes described with reference to FIGS. 28 to 32 [FIG. 34 (c)], if a corner line 433A indicating a boundary of the designated region 433 is extended by a user's drag touch action, the controller 180 enlarges a size of the designated region 433 by an extended portion of the corner line 433A.

Referring to FIG. 35, while a user designates a desired region 433 in the image by one of the processes described with reference to FIGS. 28 to 32 [FIG. 35 (a)], if a point other than the designated region 433 is touched in the image, the controller 180 can cancel the designation of the designated region 433 [FIG. 35 (b)].

So far, the slice tool UI (user interface) 432 of the present disclosure is described in detail with reference to FIGS. 28 to 35.

In the following description the steps S260 to S280 are explained in detail.

Referring now to FIG. 23, while the floating window is displayed, the controller 180 determines whether a command for reducing and displaying the floating window is inputted [S260]. If the reduced display command is inputted [S270], the controller 180 reduces the floating window into an icon and then displays the icon on the screen [S280].

Figure 36:
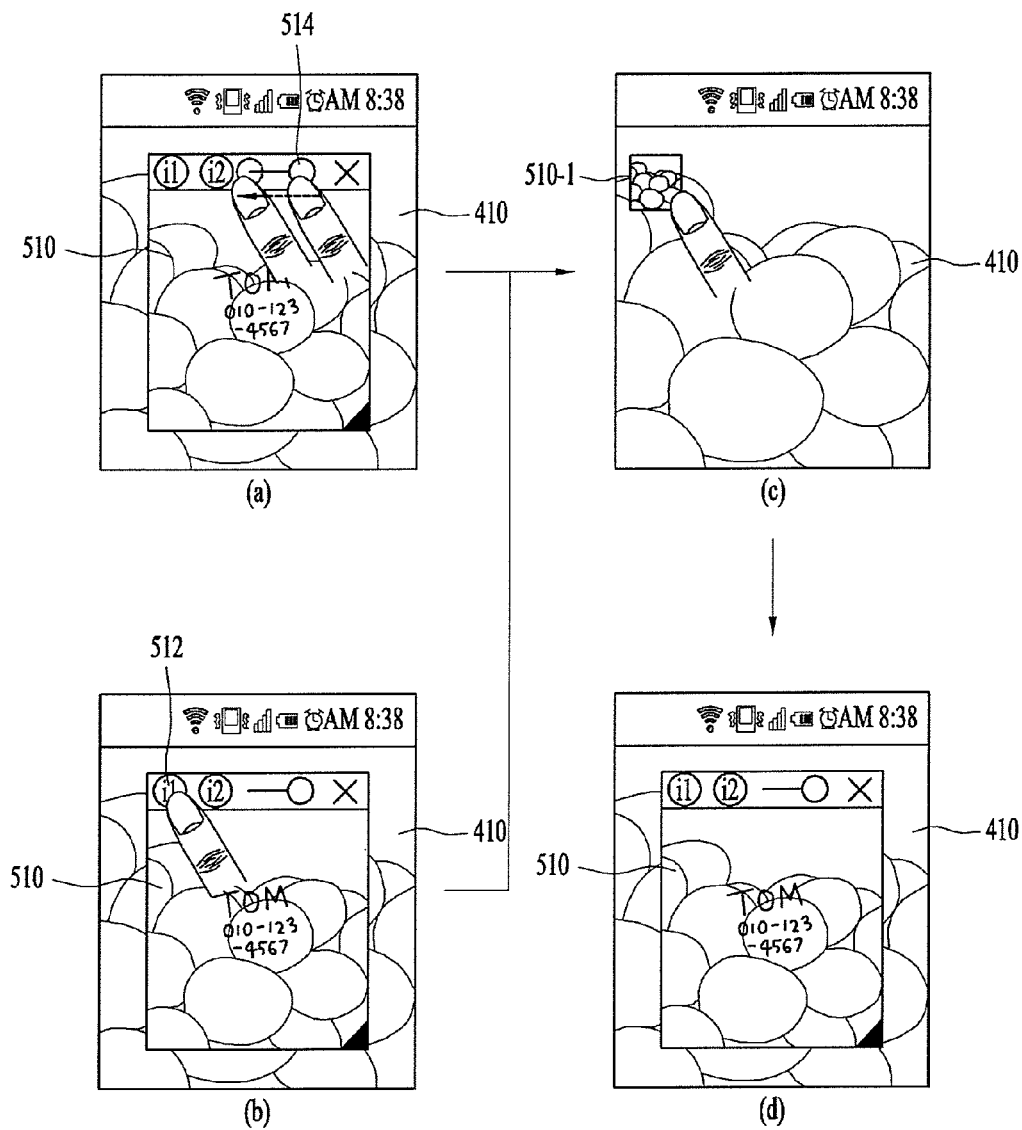
Figure 37:
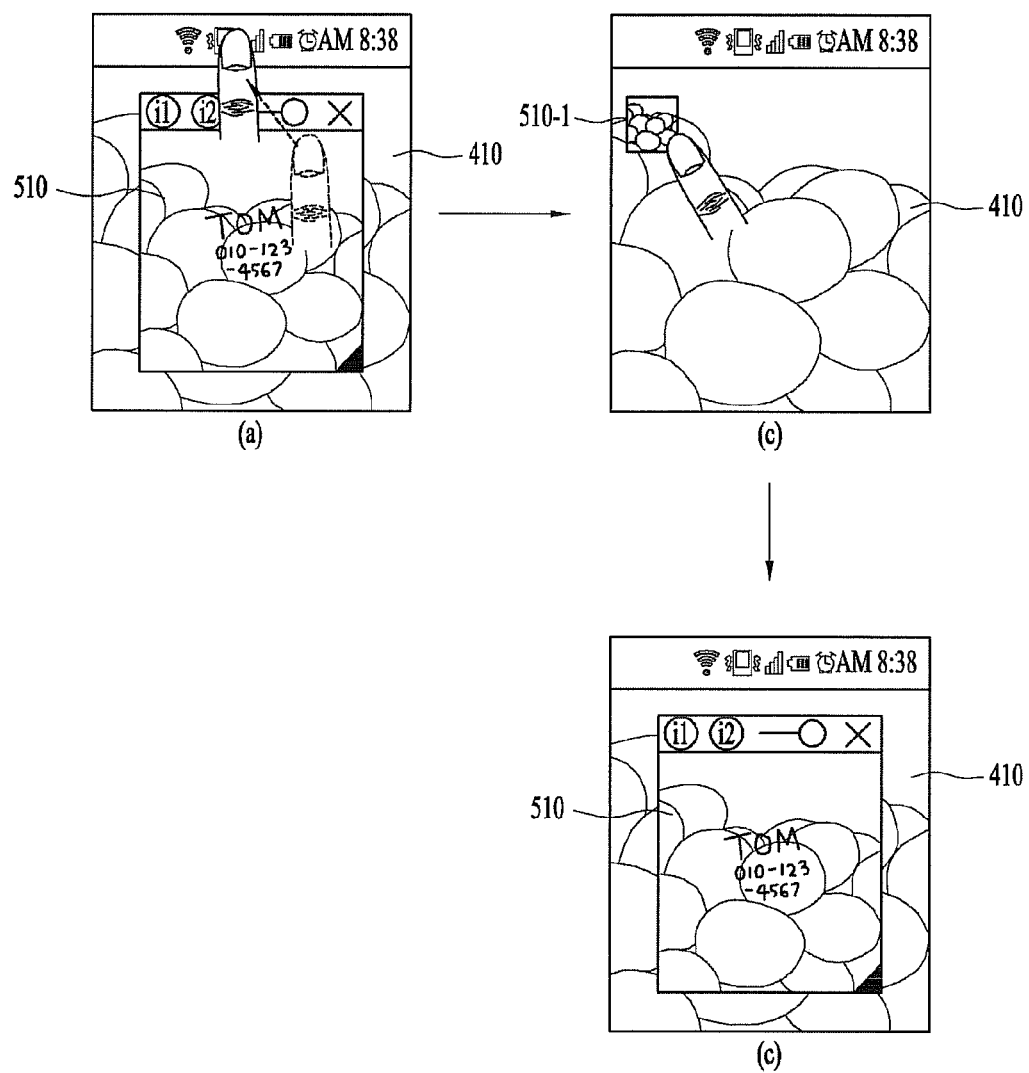
Figure 38:
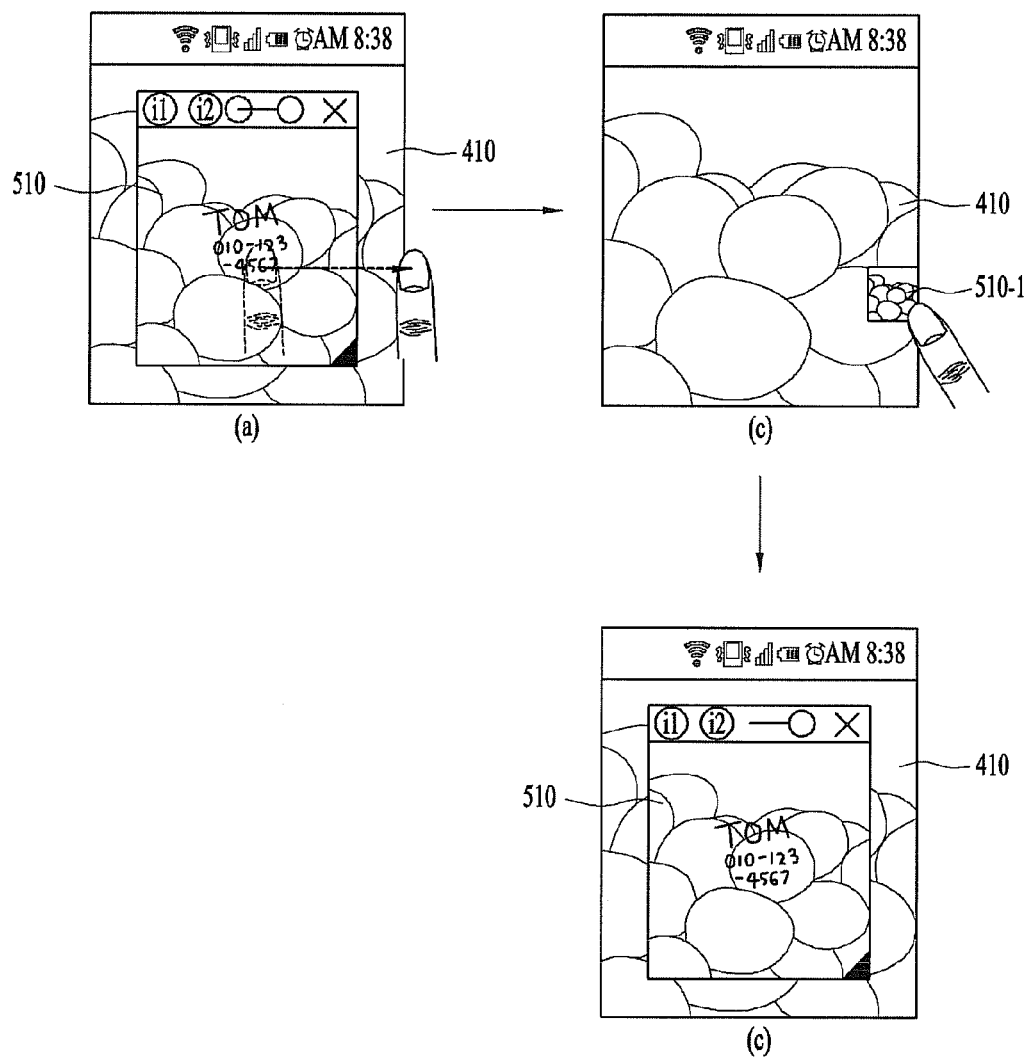

FIGS. 36 to 38 show that the floating window is displayed as an icon by being reduced in response to one of various reduced display commands.

First of all, referring to FIG. 36, if the controller 180 detects that a transparency of the floating window 510 is changed into a preset transparency [FIG. 36 (a)], the controller 180 reduces the floating window 510 into an icon 510-1 and then displays the icon 510-1 [FIG. 36 (c)].

For instance, if a transparency of the floating window 510 is changed into a maximum or a minimum through the $4^{th}$ UI 514 for transparency adjustment within the floating window 510, the controller 180 reduces the floating window 510 into the icon 510-1 and is then able to display the corresponding icon 510-1.

In doing so, before the icon 510-1 is displayed by being reduced from the floating window 510, the controller 180 saves information on a display location of the floating window 510 and information on a size of the floating window 510 in the memory 160. Thereafter, if the icon 510-1 is touched [FIG. 36 (c)], the controller 180 displays the floating window 510 at an original display location and an original size on the screen again based on the saved informations [FIG. 36 (d)].

Moreover, if the $2^{nd}$ UI 512 among the UIs included in the floating window 510 is touched [FIG. 36 (b)], the controller 180 switches the floating memo mode to the memo mode and is also able to reduce the floating window 510 into the icon 510-1 and display the corresponding icon 510-1 [FIG. 36 (c)].

Referring to FIG. 37, if the controller 180 detects that the floating window 510 moves into an indicator region located at a top end of the screen in response to a user's drag touch [FIG. 37 (a)], the controller 180 reduces the floating window 510 into an icon 510-1 and displays the corresponding icon 510-1 [FIG. 37 (b)]. If the icon 510-1 is touched, the controller 180 can display the floating window 510 at an original display location in an original size on the screen again [FIG. 37 (c)].

In this case, the indicator region may mean a region in which indicators indicating multiple operating states (e.g., a remaining level of a battery, a current hour, a Wi-Fi reception, an antenna reception, an alarm, etc.) of the mobile terminal are displayed.

Referring to FIG. 38, if the controller 180 detects that the floating window 510 moves in a direction toward a specific outline side within the screen in response to a user's drag touch [FIG. 38 (a)], the controller 180 reduces the floating window 510 into an icon 510-1 and displays the corresponding icon 510-1 at a location of the specific side to which the floating window 510 has moved [FIG. 38 (b)]. If the icon 510-1 is touched, the controller 180 can display the floating window 510 at an original display location in an original size on the screen again [FIG. 38 (c)].

Meanwhile, an image displayed on the corresponding floating window 510 can be displayed as a thumbnail within the icon 510-1. And, referring to FIG. 39, the icon 510-1 can indicate a category, type and/or primary color of a specific information displayed on the corresponding floating window 510.

Referring to FIG. 39 (a), if an image of a specific information displayed on a $1^{st}$ floating window 510 is an image displayed on a home screen and a primary color of the image is a $1^{st}$ color, the controller 180 can control an initial 'H', which indicates the home screen, to be displayed in the $1^{st}$ color within a $1^{st}$ icon 510-1 corresponding to the $1^{st}$ floating window 510.

Referring to FIG. 39 (b), if an image of a specific information displayed on a $2^{nd}$ floating window 520 is an image of a specific web browser and a primary color indicating the web browser is a $2^{nd}$ color, the controller 180 can control an initial 'R', which indicates the web browser, to be displayed in the $1^{st}$ color within a $2^{nd}$ icon 520-1 corresponding to the $2^{nd}$ floating window 520.

Referring to FIG. 39 (c), if an image of a specific information displayed on a $3^{rd}$ floating window 530 is a gallery image and a primary color indicating the gallery image is a $3^{rd}$ color, the controller 180 can control an initial 'G', which indicates the gallery image, to be displayed in the $3^{rd}$ color within a $3^{rd}$ icon 530-1 corresponding to the $3^{rd}$ floating window 530.

In particular, a user can recognize a category and type of a specific information displayed on the corresponding floating window in advance by watching an initial and color of the corresponding icon without watching the floating windows corresponding to the icons, respectively.

Meanwhile, referring to FIG. 40, when a plurality of floating windows are displayed on a screen by the process described with reference to FIG. 23, the controller 180 can control the floating windows to be collectively displayed as icons in response to a user's touch action.

Referring to FIG. 40 (a), a plurality of windows 510, 520 and 530 are displayed on a screen by the process shown in FIG. 23.

In doing so, if the floating windows 510, 520 and 530 are simultaneously multi-touched, referring to FIG. 40 (b), the controller 180 can display $1^{st}$ to $3^{rd}$ icons 510-1, 520-1 and 530-1 for reducing and displaying the floating windows 510, 520 and 530, respectively.

If the controller 180 detects that each of the floating windows 510, 520 and 530 moves to a specific side on a screen in response to a user's drag touch, referring to FIG. 40 (b), the controller 180 can control the $1^{st}$ to $3^{rd}$ icons 510-1, 520-1 and 530-1 for reducing and displaying the floating windows 510, 520 and 530 to be displayed at locations of the sides to which the floating windows 510, 520 and 530 have moved, respectively.

Referring to FIGS. 41 to 44, after a plurality of floating windows have been displayed on a screen by the process described with reference to FIG. 23, the controller 180 configures a single integrated floating window generated from integrating the displayed floating windows into one and is then able to display the configured floating window on the screen in response to a user's touch action.

In particular, referring to FIG. 41 (a), a $1^{st}$ floating window 510 and a $2^{nd}$ floating window 520 are displayed on a screen by the process described with reference to FIG. 23. If the $2^{nd}$ floating window 520 is shifted to a location at which the $1^{st}$ floating window 510 is displayed in response to a user's touch, referring to FIG. 41 (b), the controller 180 configures a floating window by integrating the $1^{st}$ floating window 510 and the $2^{nd}$ floating window 520 into one and then displays the integrated floating window.

In doing so, the integrated floating window may include a tap key 441 for displaying the $1^{st}$ floating window 510 and a tap key 442 for displaying the $2^{nd}$ floating window 520. And, an image displayed one of the $1^{st}$ floating window 510 and the $2^{nd}$ floating window 520 is displayed within the integrated floating window.

For instance, referring to FIG. 41 (b), an image of the $1^{st}$ floating window 510 is displayed within the integrated floating window. If the $2^{nd}$ tap key 442 for displaying an image of the $2^{nd}$ floating window 520 is touched, the controller 180 switches the image of the $1^{st}$ floating window 510 displayed within the integrated floating window to the image of the $2^{nd}$ floating window 520 corresponding to the $2^{nd}$ tap key 442 and then displays the switched image.

FIG. 42 shows a process for determining a floating window, which is to be displayed within the floating window, by selecting one of the $1^{st}$ floating window 510 and the $2^{nd}$ floating window 520 depending on a location to which the $2^{nd}$ floating window 520 is dragged to the $1^{st}$ floating window 510.

For instance, referring to FIG. 42 (a), if the $2^{nd}$ floating window 520 is dragged to a left top part 451L of the $1^{st}$ floating window 510, the controller 180 controls an image of the $2^{nd}$ floating window 520 to be displayed within the integrated floating window and is then able to assign a display of the $1^{st}$ floating window 510 to the $2^{nd}$ tap key 442.

For another instance, referring to FIG. 42 (b), if the $2^{nd}$ floating window 520 is dragged to a right top part 451R of the $1^{st}$ floating window 510, the controller 180 controls an image of the $1^{st}$ floating window 510 to be displayed within the integrated floating window and is then able to assign a display of the $2^{nd}$ floating window 520 to the $2^{nd}$ tap key 442.

Referring to FIG. 43, if the $2^{nd}$ floating window 520 is dragged to the $1^{st}$ floating window 510 [FIG. 42 (a)], the controller 180 synthesizes the image of the $1^{st}$ floating window 510 and the image of the $2^{nd}$ floating window 520 into a single image and then controls the synthesized image to be displayed within the integrated floating window [FIG. 43 (b)].

In doing so, referring to FIG. 44, the controller 180 can determine to synthesize the images of the $1^{st}$ and $2^{nd}$ floating windows 510 and 520 by placing which one of the images on a top end of the screen depending on a location of the $1^{st}$ floating window 510 to which the $2^{nd}$ floating window 520 is dragged.

For instance, referring to FIG. 44 (a), if the $2^{nd}$ floating window 520 is moved via an upper part of the $1^{st}$ floating window 510, the controller 180 can control the images of the $1^{st}$ and $2^{nd}$ floating windows 510 and 520 to be synthesized into a single image in a manner that the image of the $2^{nd}$ floating window 520 is located on an upper part of the synthesized image.

For another instance, referring to FIG. 44 (b), if the $2^{nd}$ floating window 520 is moved via a lower part of the $1^{st}$ floating window 510, the controller 180 can control the images of the $1^{st}$ and $2^{nd}$ floating windows 510 and 520 to be synthesized into a single image in a manner that the image of the $2^{nd}$ floating window 520 is located on a lower part of the synthesized image.

FIG. 45 shows a following process. First of all, while the floating window is displayed on the screen by the process described with reference to FIG. 23, if a function of attaching an image displayed on the floating window is selected from the screen, the selected function is executed and an image displayed on the floating window is attached to the executed function.

Referring to FIG. 45 (a), a floating window 510 is displayed on a screen. And, a plurality of function icons for executing a plurality of functions are displayed on the screen.

For instance, if a message icon 461 is selected from the function icons, referring to FIG. 45 (b), the controller 180 displays a message writing window corresponding to the message icon 461 and then attaches a file of an image displayed on the floating window 510 to a file attach window within the message writing window automatically.

In doing so, if the file of the image displayed on the floating window 510 is attached to the file attach window, the controller 180 can reduce the floating window 510 into an icon and display the corresponding icon 510-1.

Figure 46:
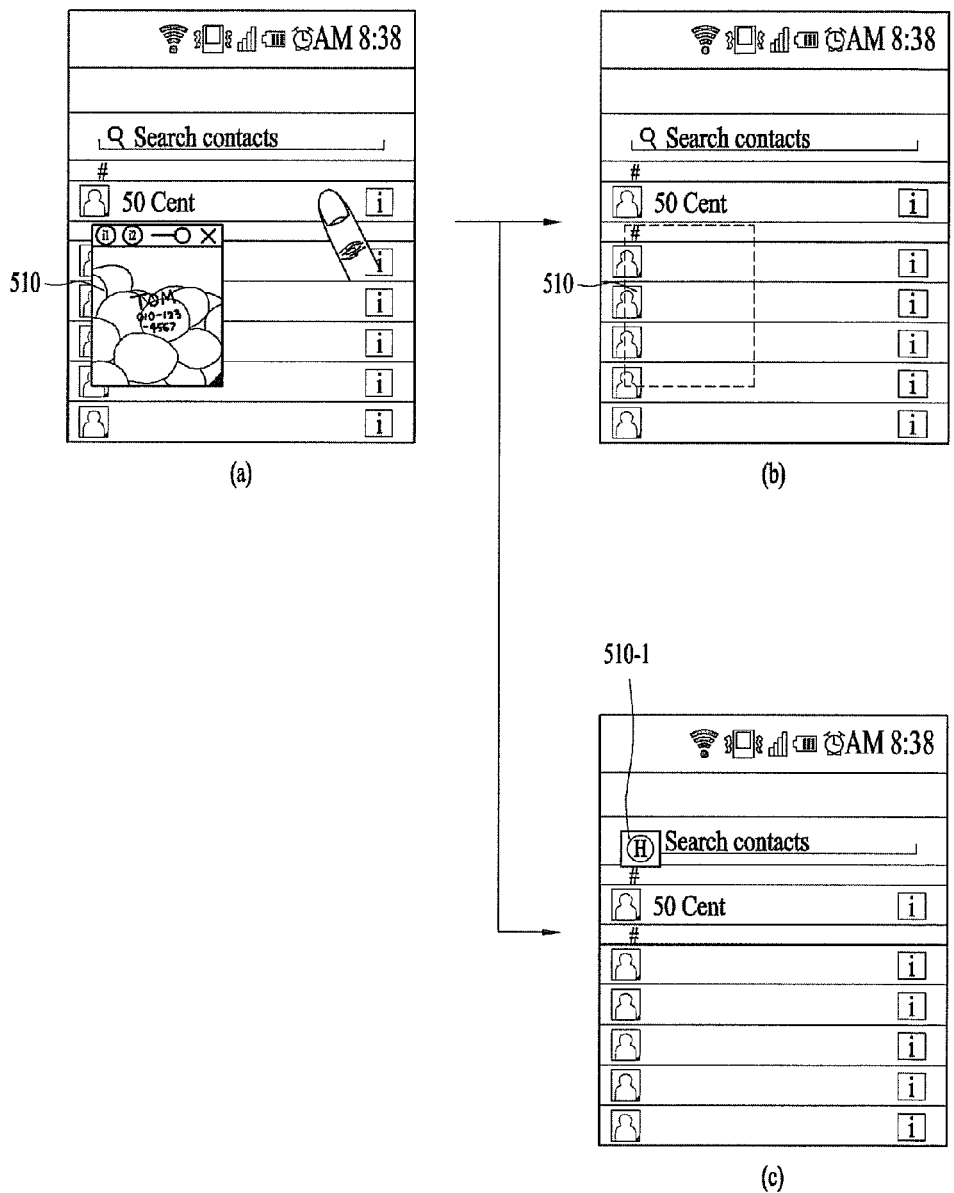

FIG. 46 shows a following process. First of all, while the floating window is displayed on the screen by the process described with reference to FIG. 23, if a region except the floating window on the screen is touched, the controller 180 controls the floating window to be displayed transparently or in a manner of being reduced into an icon.

For instance, referring to FIG. 46 (a), a floating window 510 is displayed on a screen having a contact list displayed thereon. Of course, a prescribed one of all information screens displayable on the mobile terminal 100 can be displayed on the screen as well as the contact list. In particular, the prescribed information screen may include one of an executed screen of a specific content, an executed screen of a specific application, an image viewer screen, a broadcast play screen, a video play screen, an internet web browser screen, a calendar screen, a calculator screen, a call screen and the like.

If the contact list is touched on the screen except the floating window 510, referring to FIG. 46 (b), the controller 180 recognizes the touch as an intention for a user to use the contact list and is then able to control the floating window 510 to be hidden from the screen or displayed transparently on the screen.

In doing so, while the floating window 510 is hidden from the screen or displayed transparently on the screen, if a touch input is not applied to the screen for a preset duration, the controller 180 controls the floating window 510 to be displayed on the contact list again. Alternatively, only while the touch inputted to the contact list is maintained, the controller 180 controls the floating window 510 to be hidden from the screen or displayed transparently on the screen. If the maintained touch is released, the controller 180 can control the floating window 510 to be displayed on the contact list again.

Moreover, if the contact list is touched on the screen except the floating window 510, referring to FIG. 46 (c), the controller 180 recognizes the touch as an intention for a user to use the contact list and is then able to control the floating window 510 to be displayed as an icon 510-1 in a manner of being reduced into the icon 510-1.

In doing so, while the floating window 510 is displayed as the icon 510-1, if a touch input is not applied to the screen for a preset duration, the controller 180 controls the floating window 510 to be displayed on the contact list again. Alternatively, only while the touch inputted to the contact list is maintained, the controller 180 controls the floating window 510 to be displayed as an icon 510-1 in a manner of being reduced into the icon 510-1. If the maintained touch is released, the controller 180 can control the floating window 510 to be displayed on the contact list again.

Figure 47:
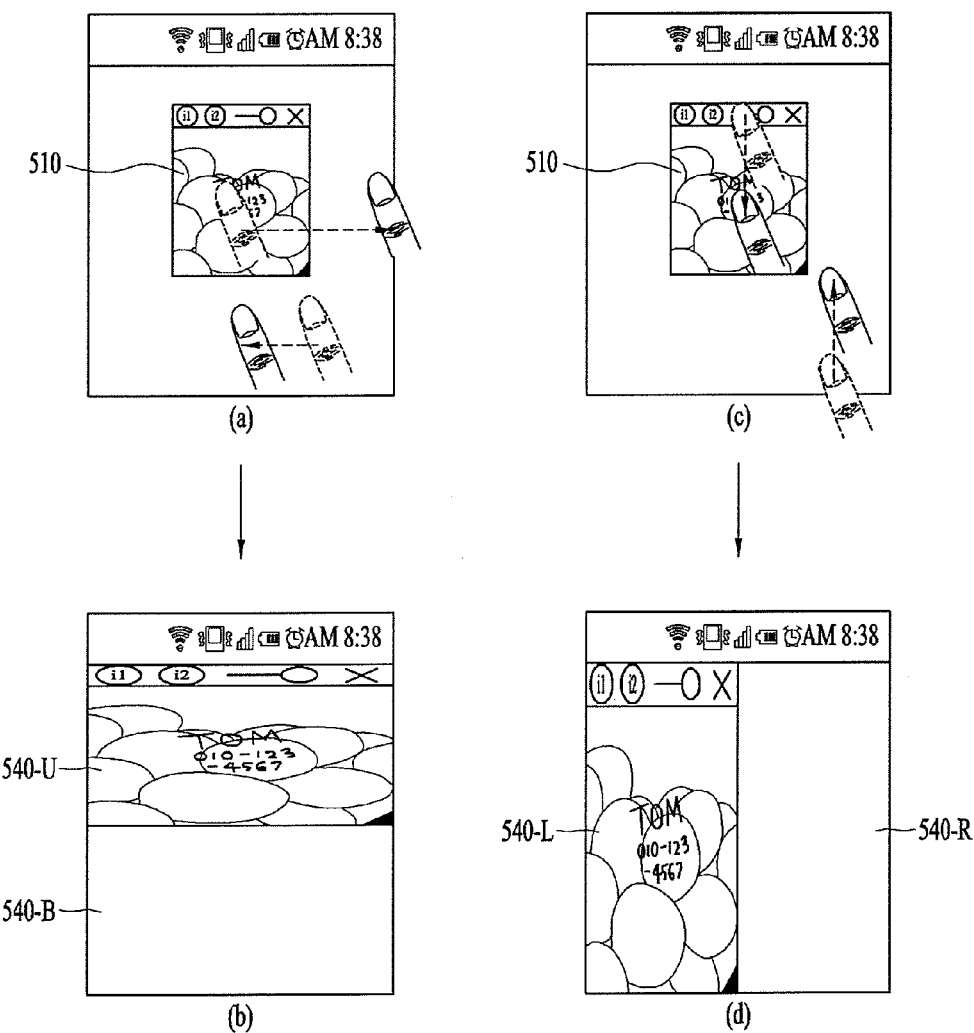

Referring to FIG. 47, if the floating window 510 is dragged in a specific direction on the screen [FIG. 47 (a)], the controller 180 partitions the screen into a $1^{st}$ region 540-U and a $2^{nd}$ region 540-B with reference to the dragged point and then controls the floating window 510 and an image of the screen to be displayed on the $1^{st}$ region 540-U and the $2^{nd}$ region 540-B, respectively [FIG. 47 (b)].

For instance, referring to FIG. 47 (a), if a user applies a drag touch to the floating window 510 in a landscape direction of the screen, the screen can be partitioned into the $1^{st}$ region 540-U and the $2^{nd}$ region 540-B with reference to the landscape direction of the drag-touched point.

For another instance, if a region of the screen except the floating window 510 is touched and dragged in a specific direction, the controller 180 can partition the screen into the $1^{st}$ region 540-U and the $2^{nd}$ region 540-B with reference to the landscape direction of the drag-touched point.

For further instance, if the floating window 510 is drag-touched in a specific $1^{st}$ direction of the screen and a region except the floating window 510 on the screen is also drag-touched in a $2^{nd}$ direction opposite to the specific $1^{st}$ direction, the controller 180 can partition the screen into the $1^{st}$ region 540-U and the $2^{nd}$ region 540-B with reference to drag-touched point of the $1^{st}$ direction and the drag-touched point of the $2^{nd}$ direction.

Referring to FIG. 47 (c) and FIG. 47 (d), like FIG. 47 (a) and FIG. 47 (b), if the floating window 510 is drag-touched in a portrait direction, a region except the floating window 510 on the screen is drag-touched in the portrait direction, or the floating window 510 is drag-touched in a specific $1^{st}$ portrait direction of the screen and a region except the floating window 510 on the screen is drag-touched in a $2^{nd}$ portrait direction opposite to the specific $1^{st}$ portrait direction, the screen can be partitioned into a $1^{st}$ region 540-L and a $2^{nd}$ region 540-R with reference to the drag-touched point of the $1^{st}$ direction and the drag-touched point of the $2^{nd}$ direction.

Figure 48:
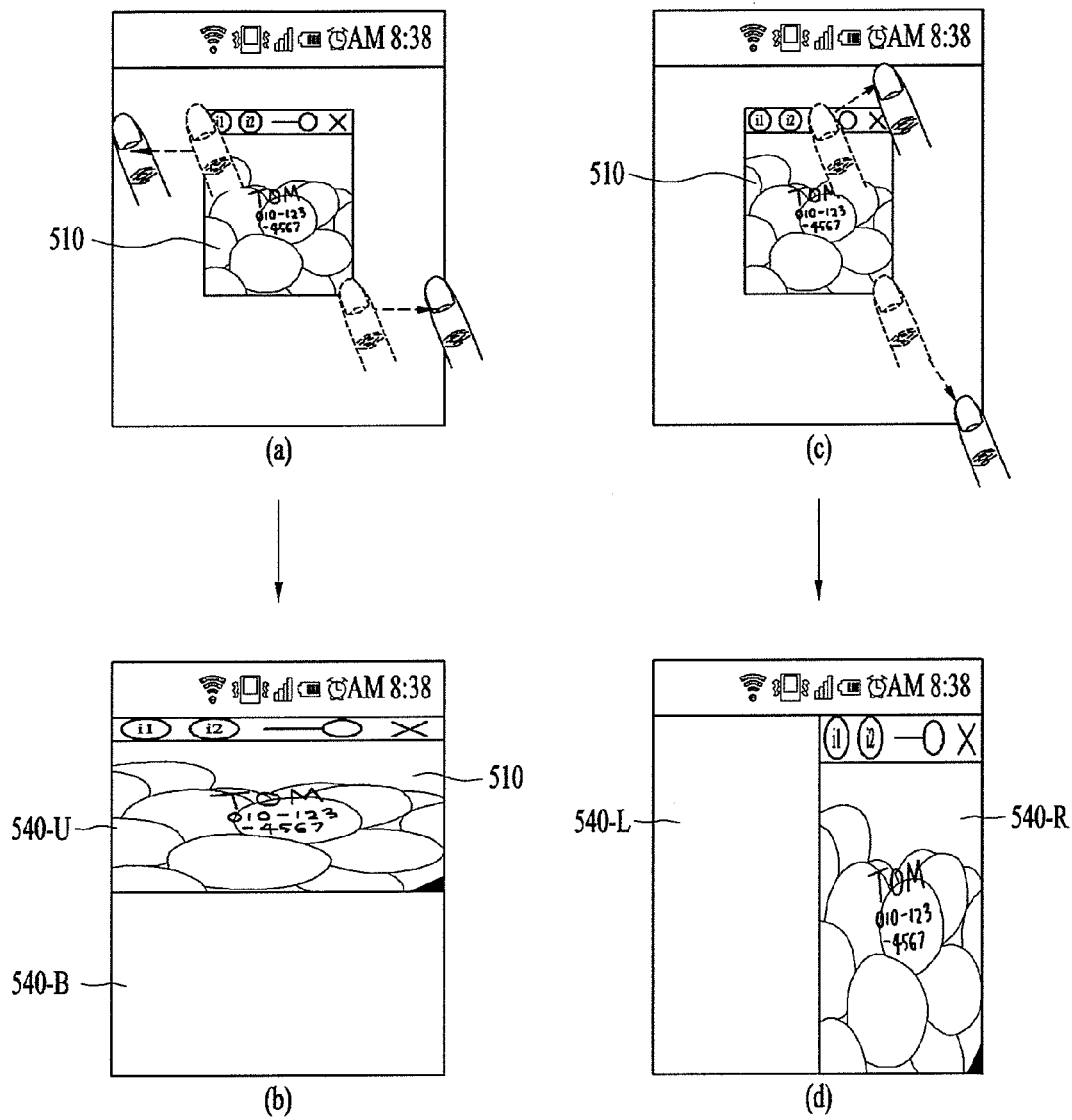

Referring to FIG. 48, if a $1^{st}$ corner of the floating window 510 is drag-touched in a specific $1^{st}$ direction of a screen and a $2^{nd}$ corner of the floating window 510 is drag-touched in a $2^{nd}$ direction opposite to the $1^{st}$ direction of the screen [FIG. 48 (a)], the controller 180 partitions the screen into a $1^{st}$ region 540-U and a $2^{nd}$ region 540-B with reference to the drag-touched points of the $1^{st}$ and $2^{nd}$ directions and can control the floating window 510 and an image of the screen to be displayed on the $1^{st}$ region 540-U and the $2^{nd}$ region 540-B, respectively [FIG. 48 (b)].

Moreover, if a specific point of a top side of the floating window 510 is drag-touched to a specific point of a top side of a screen and a corner of a bottom side of the floating window 510 is drag-touched to a specific point of a top side of the screen [FIG. 48 (c)], the controller 180 partitions the screen into a $1^{st}$ region 540-L and a $2^{nd}$ region 540-R with reference to the specific top and side points of the screen and can control the floating window 510 and an image of the screen to be displayed on the $1^{st}$ region 540-L and the $2^{nd}$ region 540-R, respectively [FIG. 48 (d)].

Figure 49:
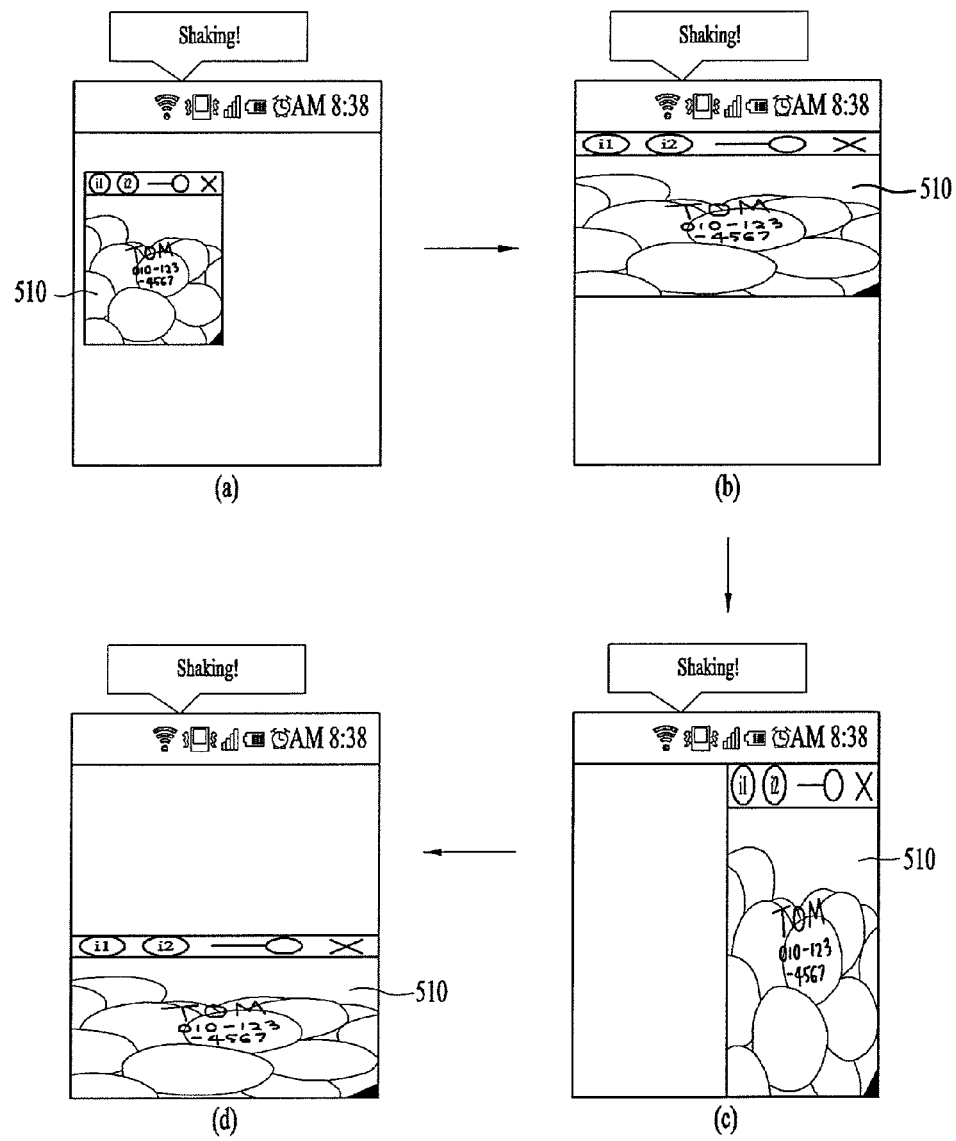

Referring to FIG. 49, a motion sensor (not shown in the drawing) is provided to the sensing unit 140 of the mobile terminal 100 to detect a motion of the mobile terminal 100. While a floating window 510 is displayed on a screen, if a motion of shaking the mobile terminal 100 by a preset motion quantity is detected through the motion sensor [FIG. 49 (a)], the controller 180 partitions the screen into a top region and a bottom region and can control the floating window 510 and an image of the screen to be displayed on the top region and the bottom region, respectively [FIG. 49 (b)].

Subsequently, while the floating window 510 and the image of the screen are displayed on the top region and the bottom region, respectively, if a motion of shaking the mobile terminal 100 by a preset quantity is detected again through the motion sensor, referring to FIG. 49 (c), the controller 180 partitions the screen into a left region and a right region again and can control the floating window 510 and an image of the screen to be displayed on the right region and the left region, respectively.

Subsequently, while the floating window 510 and the image of the screen are displayed on the right region and the left region, respectively, if a motion of shaking the mobile terminal 100 by a preset quantity is detected once again through the motion sensor, referring to FIG. 49 (d), the controller 180 partitions the screen into a top region and a bottom region again and can control the floating window 510 and an image of the screen to be displayed on the bottom region and the top region, respectively.

Referring to FIG. 50, while the floating window 510 is displayed on a screen, if a pinching-out touch gesture is inputted to the floating window 510 [FIG. 50 (a)], the controller 180 can control the floating window 510 to be displayed on the screen in a manner of being enlarged to correspond to a pinching-out level of the inputted pinching-out touch gesture [FIG. 50 (b)].

In particular, while a specific $1^{st}$ point and a specific $2^{nd}$ point on the floating window 510 are touched, if a distance between the touched $1^{st}$ point and the touched $2^{nd}$ point increases, the controller 180 controls the floating window 510 to be displayed on the screen in a manner of being enlarged in proportion to the increasing distance.

Moreover, while the floating window 510 is displayed on a screen, if a pinching-in touch gesture is inputted onto the floating window 510, referring to FIG. 50 (b), the controller 180 can control the floating window 510 to be displayed on the screen in a manner of being reduced to correspond to a pinching-in level of the inputted pinching-in touch gesture.

In particular, while a specific $1^{st}$ point and a specific $2^{nd}$ point on the floating window 510 are touched, if a distance between the touched $1^{st}$ point and the touched $2^{nd}$ point decreases, the controller 180 controls the floating window 510 to be displayed on the screen in a manner of being reduced in proportion to the decreasing distance.

Finally, a process for the controller 180 to selectively display a memo substance 420 within the floating window 510 on a screen is described with reference to FIGS. 51 to 54 as follows.

First of all, while an image of a specific information containing a memo substance 420 is displayed within a floating window 510 [FIG. 51 (a)], if a command for selectively displaying the memo substance 420 within the floating window 510 is inputted, the controller 180 controls the image of the specific information to be displayed within the floating window 510 in a manner of being processed transparently, thereby enabling the memo substance 420 to be viewed within the floating window 510 only [FIG. 51 (b)].

For instance, if a region, in which the memo substance 420 is displayed, within the floating window 510 is double or long touched, the controller 180 can control the memo substance 420 to be viewable within the floating window 510 only in a manner that the image of the specific information is displayed transparently within the floating window 510.

Moreover, if a transparency within the floating window 510 is adjusted into a maximum level, the controller 180 can control the memo substance 420 to be viewable within the floating window 510 only in a manner that the image of the specific information is displayed transparently within the floating window 510.

In doing so, when the memo substance 420 is displayed within the floating window 510 only, a location shift and size adjustment is available for the memo substance 420 in response to a user' touch to the floating window 510 or the screen.

In particular, if the memo substance 420 is dragged in a specific direction within the floating window 510, the controller 180 can shift the memo substance 420 in the dragged direction. Moreover, if the memo substance 420 is dragged in a specific direction within the screen, the controller 180 can shift the memo substance 420 in the dragged direction.

If the pinching-out touch gesture, as shown in FIG. 50, is inputted onto the memo substance 420, the controller 180 controls the memo substance 420 to be displayed in a manner of being enlarged to correspond to a pinching-out level of the touch gesture. If the pinching-in touch gesture, as shown in FIG. 50, is inputted onto the memo substance 420, the controller 180 controls the memo substance 420 to be displayed in a manner of being reduced to correspond to a pinching-in level of the touch gesture.

Referring to FIG. 52, while an image of a specific information containing a memo substance 420 is displayed within a floating window 510 [FIG. 52 (a)], if a command for displaying the memo substance 420 within the floating window 510 only is inputted, the controller 180 controls the floating window 510 to be displayed in a manner of being reduced into an icon 510-1 and also controls the memo substance 420 within the floating window 510 to be displayed on the screen only [FIG. 52 (b)].

If the icon 510-1 is selected, the controller 180 controls the image of the specific information containing the memo substance 420 to be displayed within the floating window 510 again.

Figure 53:
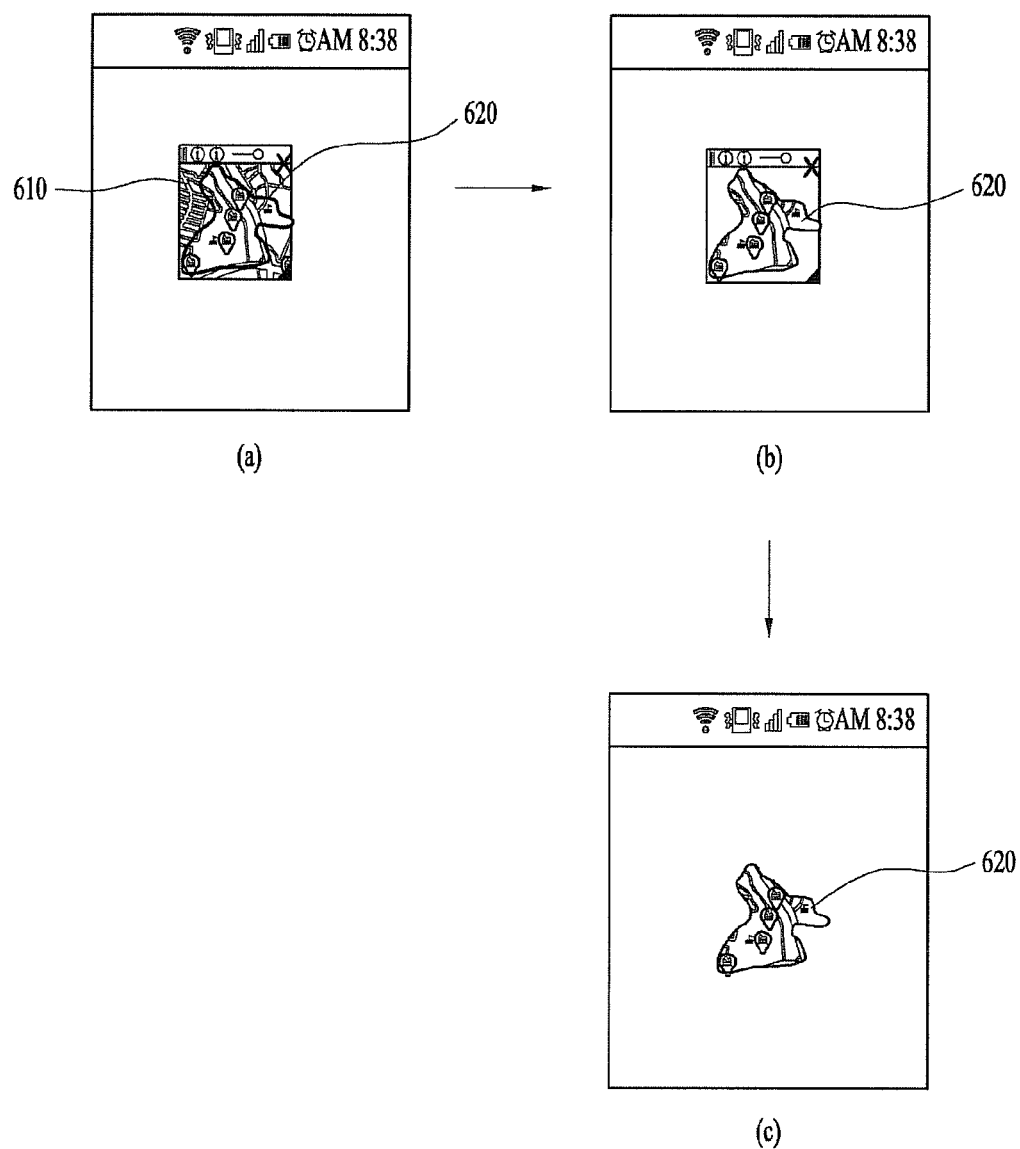

FIG. 53 shows that an image of a specific information displayed within the floating window includes a map image 610 and that a memo substance contained in the image of the specific information includes a specific section 620 within the map image 610.

Referring to FIG. 53, while the map image 610 containing the specific section 620 is displayed within the floating window, if a command for selectively displaying the specific section 620 only within the floating window is inputted [FIG. 53 (a)], the controller 180 controls the rest of the map image 610, which is displayed within the floating window, except the specific section 620 to be displayed in a manner of being processed transparently, thereby enabling the specific section 620 to be viewable within the floating window.

For instance, if the specific section 620 within the map image 610 is double or long touched, the controller 180 can control the specific section 620 to be viewable within the floating window 510 or the screen. If the specific section 620 is double or long touched again, the controller 180 can control the map image 610 containing the specific section 620 to be displayed within the floating window again.

In doing so, when the specific section 420 is displayed within the floating window or on the screen only, as shown in FIG. 53, a location shift, a size adjustment and rotation of the specific section 420 can be performed within the floating window 510 or the screen.

Figure 54:
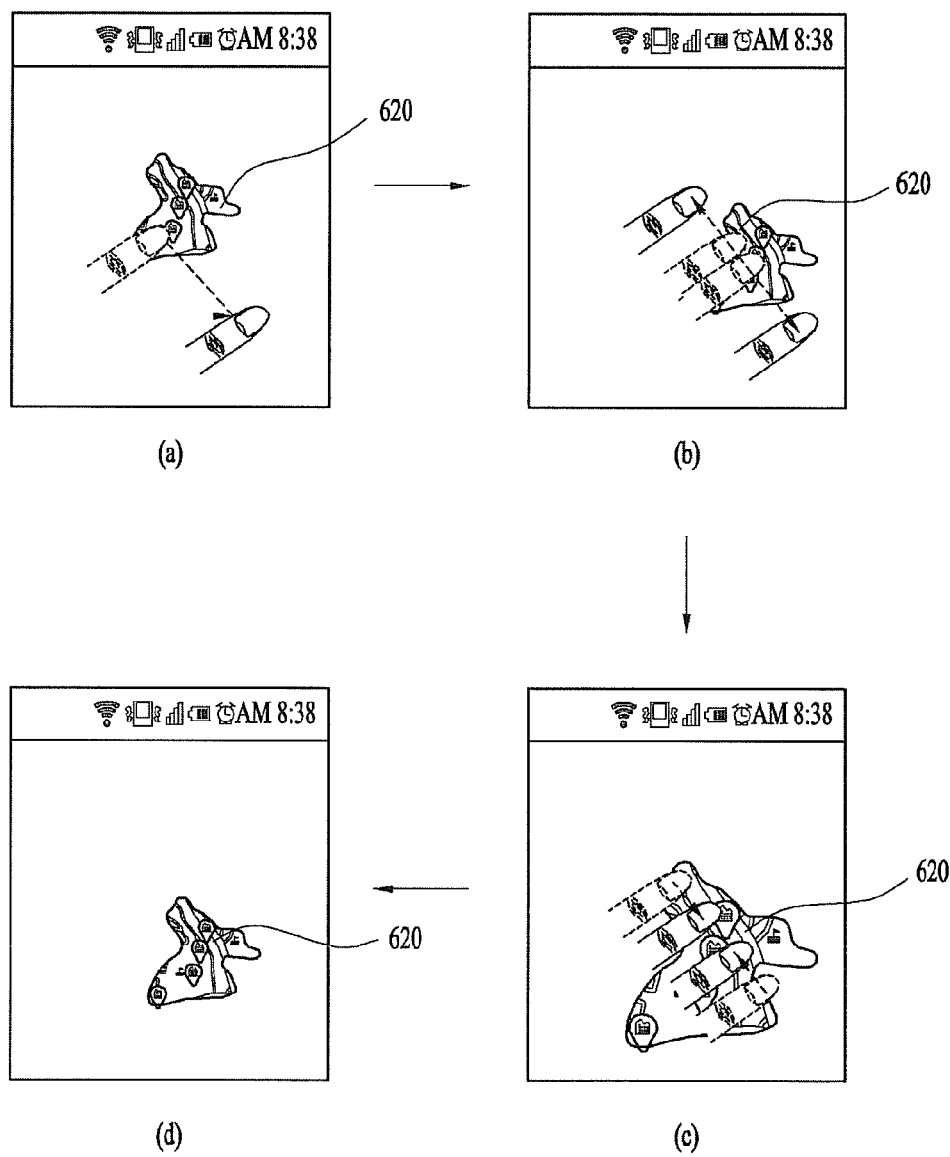

In particular, referring to FIG. 54, if the specific section 620 is dragged in a specific direction within the floating window or on the screen [FIG. 54 (a)], the controller 180 can control the specific section 620 to be shifted in the dragged direction [FIG. 54 (b)].

If a pinching-out touch gesture or a pinching-in touch gesture, as shown in FIG. 50, is inputted to the specific section 620 [FIG. 54 (b)], the controller 180 can control the specific section 620 to be displayed in a manner of being enlarged to correspond to a pinching-out level of the touch gesture or being reduced to correspond to a pinching-in level of the touch gesture.

So far, the en embodiment of the present disclosure has been described in detail with reference to FIGS. 23 to 54.

According to the $2^{nd}$ embodiment of the present disclosure, if a memo substance is inputted to a screen having a specific information displayed thereon, an image of the specific information containing the memo substance is displayed as a new memo window on the screen. Although information displayed on the screen is changed, if the memo window keep being displayed, the memo window can continue to be used on the screen despite that the information displayed for a user on the screen is changed.

It will be appreciated by those skilled in the art that the present disclosure can be specified into other form(s) without departing from the spirit or scope of the disclosures.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

Embodiments of the present disclosure are directed to a mobile terminal and controlling method thereof that substantially obviate one or more problems due to limitations and disadvantages of the related art.

One object of the present disclosure is to provide a mobile terminal and controlling method thereof as follows. First of all, after an executed window of an application has been displayed on a screen, if the executed window is shifted into a specific region within the screen, the executed window is displayed in a manner of being reduced and transformed into an icon.

Another object of the present disclosure is to provide a mobile terminal and controlling method thereof as follows. First of all, if a memo substance is inputted to a screen having a specific information displayed thereon, an image of the specific information containing the memo substance is displayed as a new memo window on the screen.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a mobile terminal according to the present disclosure may include a touchscreen configured to display a window of an application on a screen and a controller, when the window is shifted into a specific region of the screen, reducing and transforming the window into an icon and controlling the touchscreen to display the icon within the specific region.

In another aspect of the present disclosure, a method of controlling a mobile terminal according to the present disclosure may include the steps of displaying a window of an application on a screen, when the window is shifted into a specific region of the screen, reducing and transforming the window into an icon, and displaying the icon within the specific region.

Effects obtainable from the present disclosure may be non-limited by the above mentioned effect. And, other unmentioned effects can be clearly understood from the following description by those having ordinary skill in the technical field to which the present disclosure pertains.

It is to be understood that both the foregoing general description and the following detailed description of the present disclosure are exemplary and explanatory and are intended to provide further explanation of the disclosure as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a touchscreen configured to display, on a screen, a window of an application; and
   a controller configured to:
   when the window is shifted into a prescribed region in the screen, reduce and transform the window into an icon, and
   cause the touchscreen to display the icon within the prescribed region,
   wherein the controller is further configured to:
   when a call is received from a specific counterpart terminal while the window is displayed on the screen, cause the touchscreen to display a notification window indicating that the call is received from a specific counterpart terminal,
   when the notification window is displayed on a display location of the window and the notification window is displayed to overlap the window by a size greater than a preset size without a user touch input via the touchscreen, automatically reduce and transform the window into the icon,
   when the notification window is disappeared from the screen, automatically transform the icon into the window, and
   cause the touchscreen to display the transformed window on the screen.

2. The mobile terminal of claim 1, wherein, the window displays an executed screen of the application when the application is executed.

3. The mobile terminal of claim 1, wherein, when the icon is shifted out of the prescribed region, the icon is transformed into the window.

4. The mobile terminal of claim 1, wherein, when the icon is selected, the icon is transformed into the window.

5. The mobile terminal of claim 1, wherein, when the window is touched and stroked at a speed greater than or equal to a preset speed in a direction toward the prescribed region, the window is transformed into the icon.

6. The mobile terminal of claim 1, wherein, when the window is shifted proximate to the prescribed region or a preset area of the window is shifted into the prescribed region, the window is transformed into the icon.

7. The mobile terminal of claim 1, wherein at least one of information indicating a function of the application or a representative image of the application are displayed within the icon.

8. The mobile terminal of claim 1, wherein the prescribed region includes at least one side region in the touchscreen, and wherein the icon is displayed to be attached to the at least one side region.

9. The mobile terminal of claim 8, wherein, after the icon has been shifted to the prescribed region by a drag touch input, when the touch input to the icon is released, a position of the icon is automatically adjusted at the side region relative to the drag touch input location.

10. The mobile terminal of claim 1, wherein the icon is controlled to be displayed at a location corresponding to a top edge of the shifted active window at the prescribed region.

11. The mobile terminal of claim 1, wherein, while a different icon is displayed at the prescribed region, when the window is shifted to a location at which the different icon is displayed at the prescribed region, a display location of one of the icon or the different icon is changed in order to prevent the icon for the window and the different icon from overlapping each other.

12. The mobile terminal of claim 1, wherein a keypad associated with the window is displayed on the touchscreen, and when the window is transformed into the icon, the keypad is not displayed, and when the icon is transformed into the window, the keypad is re-displayed.

13. The mobile terminal of claim 1, wherein, while the window is displayed, when an event occurs in the mobile terminal, the window is transformed into the icon.

14. The mobile terminal of claim 1, wherein the window includes a memo window including content displayed in the memo window and a memo inputted on the content, wherein, when a display command for the memo window is inputted, the memo window including the content and the memo inputted onto the content is displayed on the touchscreen, and wherein, when a reduced display command for the memo window is inputted, the memo window is transformed to be displayed as the icon.

15. The mobile terminal of claim 14, wherein, after a prescribed area that includes at least one portion of the memo has been designated on the touchscreen, when the memo window display command is inputted, an image displayed on the designated prescribed area is cropped and the memo window including the cropped image is displayed on the touchscreen.

16. The mobile terminal of claim 15, wherein a UI (user interface) for designation of the prescribed area is displayed on the touchscreen, and when the prescribed area is designated through the UI, the image is cropped for display on the designated prescribed area.

17. The mobile terminal of claim 14, wherein the memo window includes a UI (user interface) for adjusting a transparency of the memo window, and when the transparency of the memo window is changed into a preset transparency through the UI, the memo window is transformed into the icon.

18. The mobile terminal of claim 14, wherein the touchscreen includes an indicator region on which indicators that indicate a plurality of operating states of the mobile terminal are displayed, and when the memo window is shifted in a direction toward the indicator region, the memo window is transformed into the icon.

19. The mobile terminal of claim 14, wherein a category of the content is obtained, and when the memo window is transformed into the icon, the icon is displayed to represent the category of the content.

20. The mobile terminal of claim 14, wherein, when at least two memo windows including a first memo window and a second memo window are displayed on the touchscreen, when the first memo window is shifted to a location at which the second memo window is located, the first memo window and the second memo window are combined into a single integrated memo window for display on the touchscreen.

21. The mobile terminal of claim 14, wherein, while the memo window is displayed, when a function for attaching an image displayed on the memo window is selected on the touchscreen, the selected function is activated and the image displayed on the memo window is attached to the activated function.

22. The mobile terminal of claim 21, wherein, when the image displayed on the memo window is attached to the activated window, the memo window is transformed into the icon.

23. The mobile terminal of claim 14, wherein, when the memo window is displayed on the touchscreen, when a region outside the memo window on the touchscreen is touched, the memo window is displayed to be transparent or the memo window transformed into the icon.

24. A method of displaying a window of an application of a mobile terminal, the method comprising:
  displaying, on a screen of a touchscreen of the mobile terminal, the window of the application;
  when a call is received from a specific counterpart terminal while the window is displayed on the screen, displaying a notification window indicating that the call is received from a specific counterpart terminal;
  when the notification window is displayed on a display location of the window, and when the notification window is displayed, without a user touch input to the touchscreen, to overlap the window by a size greater than a preset size, automatically reducing and transforming the window into the icon;
  when the notification window is disappeared from the screen, automatically transforming the icon into the window; and
  displaying the transformed window on the screen.

* * * * *